(12) United States Patent
Futa et al.

(10) Patent No.: US 8,800,038 B2
(45) Date of Patent: Aug. 5, 2014

(54) TAMPERING MONITORING SYSTEM, CONTROL DEVICE, AND TAMPERING CONTROL METHOD

(75) Inventors: Yuichi Futa, Osaka (JP); Yuji Unagami, Osaka (JP); Natsume Matsuzaki, Osaka (JP); Hiroki Shizuya, Miyagi (JP); Masao Sakai, Miyagi (JP); Shuji Isobe, Miyagi (JP); Eisuke Koizumi, Miyagi (JP); Shingo Hasegawa, Miyagi (JP)

(73) Assignee: Panasonic Corporation, Osaka (JP)

( * ) Notice: Subject to any disclaimer, the term of this patent is extended or adjusted under 35 U.S.C. 154(b) by 264 days.

(21) Appl. No.: 13/375,912

(22) PCT Filed: Apr. 15, 2011

(86) PCT No.: PCT/JP2011/002242
§ 371 (c)(1),
(2), (4) Date: Dec. 2, 2011

(87) PCT Pub. No.: WO2011/135797
PCT Pub. Date: Nov. 3, 2011

(65) Prior Publication Data
US 2012/0084557 A1    Apr. 5, 2012

(30) Foreign Application Priority Data

Apr. 26, 2010    (JP) .................................. 2010-100612

(51) Int. Cl.
*G06F 11/00*    (2006.01)
*G06F 21/55*    (2013.01)
(52) U.S. Cl.
CPC ..................................... *G06F 21/55* (2013.01)
USPC ............... 726/23; 726/24; 713/164; 713/165; 713/168; 713/175
(58) Field of Classification Search
USPC ............... 726/23, 24; 713/164, 165, 168, 175
See application file for complete search history.

(56) References Cited

U.S. PATENT DOCUMENTS 8,464,347 B2* 6/2013 Maeda et al. ................... 726/25
2010/0180343 A1 7/2010 Maeda et al.

FOREIGN PATENT DOCUMENTS

JP    2008-123262    5/2008
WO    2009/118800    10/2009

OTHER PUBLICATIONS

David Aucsmith, "Tamper Resistant Software: An Implementation", Information Hiding, International Workshop Proceedings, Jan. 1, 1996, pp. 317-333.*
International Search Report issued Jul. 12, 2011 in International (PCT) Application No. PCT/JP2011/002242.

* cited by examiner

*Primary Examiner* — Eleni Shiferaw
*Assistant Examiner* — Paul Callahan
(74) *Attorney, Agent, or Firm* — Wenderoth, Lind & Ponack, L.L.P.

(57) ABSTRACT

Provided is a tampering monitoring system that can identify a monitoring module that has been tampered with among a plurality of monitoring modules. A management apparatus is provided with an acquisition unit that acquires a new monitoring module that has not been tampered with, a generation unit that generates a decoy monitoring module by modifying the acquired monitoring module, a transmission unit that transmits the decoy monitoring module to the information security device and causes the information security device to install the decoy monitoring module therein, a reception unit that receives from the information security device, after the decoy monitoring module has been installed, monitoring results generated by the monitoring modules monitoring other monitoring modules, and a determination unit that identifies, by referring to the received monitoring results, a monitoring module that determines the decoy monitoring module to be valid and determines the identified monitoring module to be invalid.

10 Claims, 64 Drawing Sheets

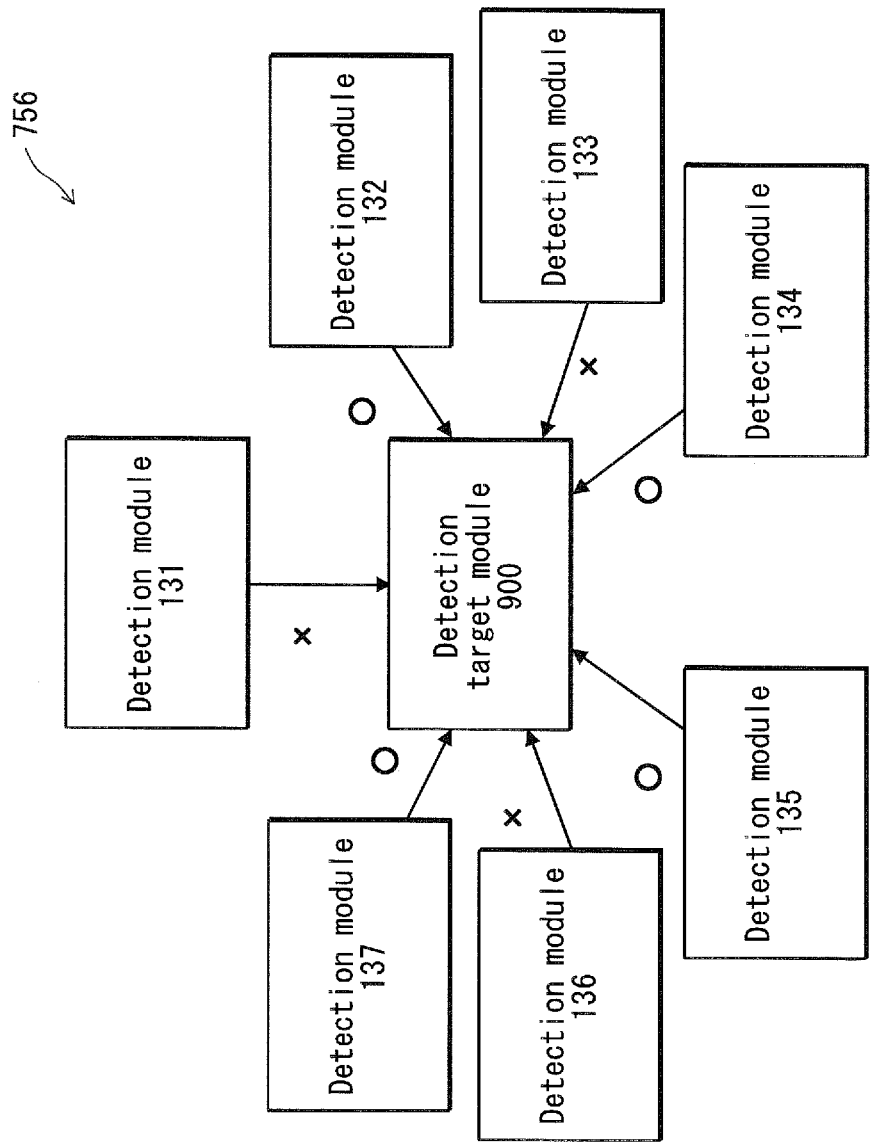

FIG. 59

| Identification information | Module status (Valid: ○, Invalid: ×, Unknown: ?) |
|---|---|
| Identification information on detection module 131 | ? |
| Identification information on detection module 132 | × |
| Identification information on detection module 133 | ? |
| Identification information on detection module 134 | × |
| Identification information on detection module 135 | × |
| Identification information on detection module 136 | ? |
| Identification information on detection module 137 | × |

| Identification information | Module status (Valid: ○, Invalid: ×, Unknown: ?) |
|---|---|
| Identification information on detection module 131 | ? |
| Identification information on detection module 132 | × |
| Identification information on detection module 133 | × |
| Identification information on detection module 134 | × |
| Identification information on detection module 135 | × |
| Identification information on detection module 136 | × |
| Identification information on detection module 137 | × |

651

652
653
654
655
656
657
658

TAMPERING MONITORING SYSTEM, CONTROL DEVICE, AND TAMPERING CONTROL METHOD

TECHNICAL FIELD

The present invention relates to management technology that monitors tampering in modules or the like that operate inside devices such as information security apparatuses.

BACKGROUND ART

A conventionally known method of ensuring that an application program that stores confidential data, such as an authentication key, is not analyzed by a malicious third party (hereinafter, "attacker"), is to protect the application program with a tamper resistant module. The tamper resistant module is normally provided on the device as hardware and protects application programs. However, in light of how new attack methods are continually being proposed these days, it is preferable to protect application programs with software, i.e. with a computer program that can easily be updated to respond flexibly to new attack methods.

Technology to protect application programs via software includes verification of tampering using hash values. Another example is a decryption loading function, whereby application programs are encrypted and stored when not in use. Encrypted application programs are decrypted and loaded into memory only when used.

Even when using such technology, however, the software that is used to protect application programs (hereinafter, a "protection control module") may itself be subject to attack. If the protection control module is tampered with, application programs are also exposed to attack.

Patent Literature 1 discloses technology for preventing changes to a program that reliably precludes execution of a program that has been tampered with even when changes occur in a check program that checks whether another program has changed. With this technology, a plurality of check programs that monitor changes in other programs are provided in a computer program, with each check program monitoring one or more of the other check programs. The following is a brief description of this technology.

With this technology, two monitoring modules A and B monitor each other. The monitoring modules A and B respectively include programs that are to be protected from tampering by an attacker (main programs A and B), programs for detecting tampering in other modules (check programs A and B), and information necessary for the check programs to detect tampering (check information A and B). Check program A uses check information A to detect whether the main program B and the check program B in the monitoring module B have been tampered with. Furthermore, check program B uses check information B to detect whether the main program A and the check program A in the monitoring module A have been tampered with. The monitoring modules thereby detect whether each other's main program and check program have been tampered with.

CITATION LIST

Patent Literature

Patent Literature 1: Japanese Patent No. 3056732
Patent Literature 2: WO2008/099682
Patent Literature 3: WO2009/118800

Non-Patent Literature

Non-Patent Literature 1: Tatsuaki OKAMOTO and Hirosuke YAMAMOTO, "Gendai Ango" (Modern Encryption), Sangyo Tosho, 1997.
Non-Patent Literature 2: ITU-T Recommendation X.509 (1997 E): Information Technology—Open Systems Interconnection—The Directory: Authentication Framework, 1997.
Non-Patent Literature 3: F. Preparata, G. Metze and R. T. Chien, "On the Connection Assignment Problem of Diagnosable Systems," IEEE Trans. Electronic Computers, vol. 16, pp. 848-854, 1968.

SUMMARY OF INVENTION

Technical Problem

As described in Patent Literature 1, by setting up a plurality of monitoring modules to monitor each other, if one of the monitoring modules is tampered with, the remaining monitoring modules that have not been tampered with can be used to detect the tampering, thus improving safety in the computer system.

However, as technology for tampering detection continues to advance, techniques for tampering with modules are also advancing. In order to combat new tampering techniques, there is a demand for the development of technology for various forms of tampering detection.

To respond to this demand, it is an object of the present invention to provide a tampering monitoring system, a management apparatus, a management method, an integrated circuit, a program, and a recording medium that can identify a monitoring module that has been tampered with.

Solution to Problem

In order to fulfill the above object, an aspect of the present invention is a management apparatus for managing an information security device that includes a plurality of monitoring modules that monitor for tampering, the management apparatus comprising: an acquisition unit configured to acquire a new monitoring module that has not been tampered with; a generation unit configured to generate a decoy monitoring module by modifying the acquired monitoring module; a transmission unit configured to transmit the decoy monitoring module to the information security device and cause the information security device to install the decoy monitoring module therein; a reception unit configured to receive from the information security device, after the decoy monitoring module has been installed, monitoring results generated by the monitoring modules monitoring other monitoring modules; and a determination unit configured to identify, by referring to the received monitoring results, a monitoring module that determines the decoy monitoring module to be valid and to determine the identified monitoring module to be invalid.

Advantageous Effects of Invention

With this structure, each monitoring module monitors the decoy monitoring module, and the management apparatus makes a determination using the monitoring results. This structure thus achieves the advantageous effect of allowing for detection of an invalid monitoring module.

BRIEF DESCRIPTION OF DRAWINGS

FIG. 58 shows an example of monitoring results 756 by detection modules for the detection target module 900*a* in Modification (23).

FIG. 59 illustrates an example of module identification information 641 in Modification (23).

FIG. 61 illustrates an example of module identification information 651 in Modification (23).

DESCRIPTION OF EMBODIMENTS

Figure 1:
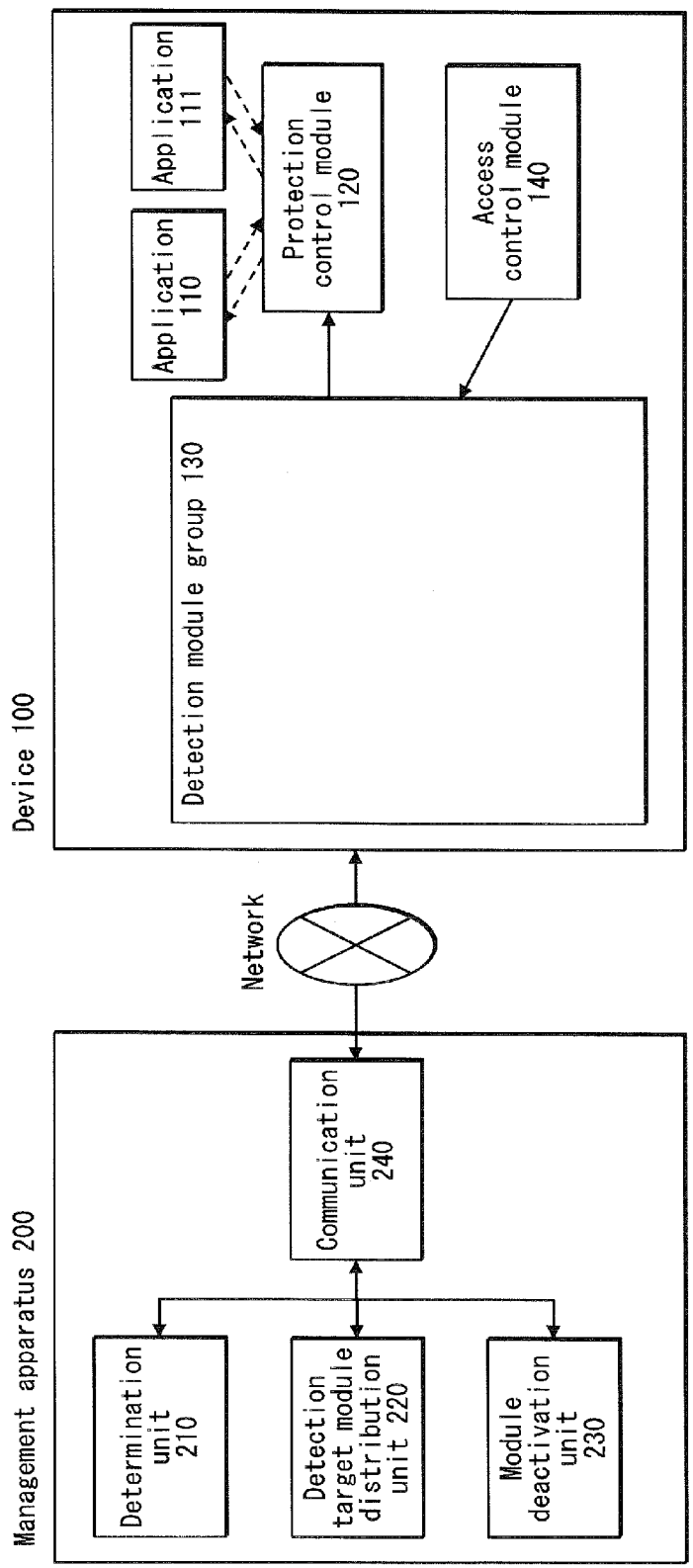
FIG. 1 is an overall structure diagram of a detection system 10 according to Embodiment 1.

An aspect of the present invention is a management apparatus for managing an information security device that includes a plurality of monitoring modules that monitor for tampering, the management apparatus comprising: an acquisition unit configured to acquire a new monitoring module that has not been tampered with; a generation unit configured to generate a decoy monitoring module by modifying the acquired monitoring module; a transmission unit configured to transmit the decoy monitoring module to the information security device and cause the information security device to install the decoy monitoring module therein; a reception unit configured to receive from the information security device, after the decoy monitoring module has been installed, monitoring results generated by the monitoring modules monitoring other monitoring modules; and a determination unit configured to identify, by referring to the received monitoring results, a monitoring module that determines the decoy monitoring module to be valid and to determine the identified monitoring module to be invalid.

The acquired monitoring module may include a verification certificate that certifies authenticity of the acquired monitoring module. The generation unit may generate the decoy monitoring module by modifying the verification certificate included in the acquired monitoring module to generate a modified verification certificate and including the modified verification certificate in the acquired monitoring module. The transmission unit may transmit the decoy monitoring module that includes the modified verification certificate to the information security device and cause the information security device to install the decoy monitoring module therein. Each monitoring module in the information security device may determine whether the decoy monitoring module has been tampered with by referring to the verification certificate included in the decoy monitoring module.

The generation unit may generate random data and set the random data to be the modified verification certificate.

The generation unit may generate the modified verification certificate by generating random data and overwriting a part of the verification certificate included in the acquired monitoring module with the generated random data.

The management apparatus may further comprise: a detection unit configured to detect whether any valid monitoring module that has not been tampered with exists by referring to the received monitoring results; a first assumption unit configured to select, when the detection unit detects the existence, a monitoring module among the plurality of monitoring modules and to assume that the selected monitoring module has been tampered with; a second assumption unit configured to apply a procedure in a chained sequence to monitoring modules other than the selected monitoring module by referring to the monitoring results, starting from the selected monitoring module, the procedure being to assume that any monitoring module determining that a monitoring module assumed to have been tampered with is valid has also been tampered with; and a determination unit configured to determine whether, as a result of the procedure by the second assumption unit, all of the monitoring modules are assumed to have been tampered with, and when determining that all of the monitoring modules are assumed to have been tampered with, to determine the selected monitoring module to be a valid monitoring module that has not been tampered with.

The management apparatus may further comprise: a deactivation unit configured to output a deactivation instruction for the monitoring module determined to be invalid.

Another aspect of the present invention is a tampering monitoring system formed by an information security device and a management apparatus, the information security device including a plurality of monitoring modules that monitor for tampering, and the management apparatus managing the information security device, the management apparatus comprising: an acquisition unit configured to acquire a new monitoring module that has not been tampered with; a generation unit configured to generate a decoy monitoring module by modifying the acquired monitoring module; a transmission unit configured to transmit the decoy monitoring module to the information security device and cause the information security device to install the decoy monitoring module therein; a reception unit configured to receive from the information security device, after the decoy monitoring module has been installed, monitoring results generated by the monitoring modules monitoring other monitoring modules; and a determination unit configured to identify, by referring to the received monitoring results, a monitoring module that determines the decoy monitoring module to be valid and to determine the identified monitoring module to be invalid.

Another aspect of the present invention is an integrated circuit for managing an information security device that includes a plurality of monitoring modules that monitor for tampering, the integrated circuit comprising: an acquisition unit configured to acquire a new monitoring module that has not been tampered with; a generation unit configured to generate a decoy monitoring module by modifying the acquired monitoring module; a transmission unit configured to transmit the decoy monitoring module to the information security device and cause the information security device to install the decoy monitoring module therein; a reception unit configured to receive from the information security device, after the decoy monitoring module has been installed, monitoring results generated by the monitoring modules monitoring other monitoring modules; and a determination unit configured to identify, by referring to the received monitoring results, a monitoring module that determines the decoy monitoring module to be valid and to determine the identified monitoring module to be invalid.

Another aspect of the present invention is a management method used in a management apparatus for managing an information security device that includes a plurality of monitoring modules that monitor for tampering, the management method comprising the steps of: acquiring a new monitoring module that has not been tampered with; generating a decoy monitoring module by modifying the acquired monitoring module; transmitting the decoy monitoring module to the information security device and causing the information security device to install the decoy monitoring module therein; receiving from the information security device, after the decoy monitoring module has been installed, monitoring results generated by the monitoring modules monitoring other monitoring modules; and identifying, by referring to the received monitoring results, a monitoring module that determines the decoy monitoring module to be valid and to determine the identified monitoring module to be invalid.

Another aspect of the present invention is a computer-readable recording medium having recorded thereon a computer program used in a management apparatus for managing an information security device that includes a plurality of monitoring modules that monitor for tampering, the computer program causing a computer, which is the management apparatus, to execute the steps of: acquiring a new monitoring module that has not been tampered with; generating a decoy monitoring module by modifying the acquired monitoring module; transmitting the decoy monitoring module to the information security device and causing the information security device to install the decoy monitoring module therein; receiving from the information security device, after the decoy monitoring module has been installed, monitoring results generated by the monitoring modules monitoring other monitoring modules; and identifying, by referring to the received monitoring results, a monitoring module that determines the decoy monitoring module to be valid and to determine the identified monitoring module to be invalid.

Another aspect of the present invention is a computer program used in a management apparatus for managing an information security device that includes a plurality of monitoring modules that monitor for tampering, the computer program causing a computer, which is the management apparatus, to perform the steps of: acquiring a new monitoring module that has not been tampered with; generating a decoy monitoring module by modifying the acquired monitoring module; transmitting the decoy monitoring module to the information security device and causing the information security device to install the decoy monitoring module therein; receiving from the information security device, after the decoy monitoring module has been installed, monitoring results generated by the monitoring modules monitoring other monitoring modules; and identifying, by referring to the received monitoring results, a monitoring module that determines the decoy monitoring module to be valid and to determine the identified monitoring module to be invalid.

1. Embodiment 1

With reference to the drawings, the following describes a detection system 10 as Embodiment 1 of the present invention.

1.1 Structure of Detection System 10

(1) Overall Structure

FIG. 1 is an overall structure diagram of the detection system 10. As shown in FIG. 1, the detection system 10 includes a device 100, which is an information processing apparatus, and a management apparatus 200, which is a monitoring apparatus. The device 100 and the management apparatus 200 are connected via a network.

(2) Structure of Device 100

Next, the device 100 is described.

The device 100 provides a variety of services to a user via the network. For example, the device 100 accesses a content delivery server for purchasing of music, video, or other content and plays back the content, or accesses the system of a financial institution to perform Internet banking (balance inquiries, transfers, etc.), etc.

(a) Software Structure of Device 100

As shown in FIG. 1, the device 100 includes application software (hereinafter, an "application") 110, an application 111, a protection control module 120, a detection module group 130, and an access control module 140.

The applications 110 and 11 are software for providing a variety of functions to the user of the device 100 via the network. For example, the applications 110 and 111 are software for purchasing music, video, or other content from a content delivery server (not shown in the figures) on the network and playing back the purchased content, or software for accessing the system of a financial institution (not shown in the figures) on the network to perform Internet banking such as balance inquiries, transfers, etc.

The applications 110 and 111 store confidential data such as an authentication key for performing authentication with the content delivery server or the system of the financial institution. It is necessary to protect this confidential data from being extracted from the application by a malicious third party (hereinafter, "attacker") and used fraudulently.

Since the device 100 handles confidential data, the device 100 is also referred to as an information security apparatus.

The protection control module 120 controls functions for protecting the applications 110 and 111 so that an attacker cannot analyze the applications 110 and 111 to extract the confidential data, such as the authentication key. An example of the function to protect the applications is a decryption loading function, whereby application programs are encrypted and stored when not in use. Encrypted application programs are decrypted and loaded into memory only when used. Other examples include a tampering detection function to check whether an application has been tampered with, and an analysis tool detection function to check whether an analysis tool, such as a debugger, is operating.

The protection control module 120 controls the operations of these functions in order to check whether an attacker has analyzed the applications 110 and 111. Upon detecting an attack, the protection control module 120 prevents the confidential data from being divulged by performing processes such as stopping operations of the applications 110 and 111 and clearing the memory areas used by the applications 110 and 111, in particular the memory areas in which the confidential data was stored.

Figure 3:
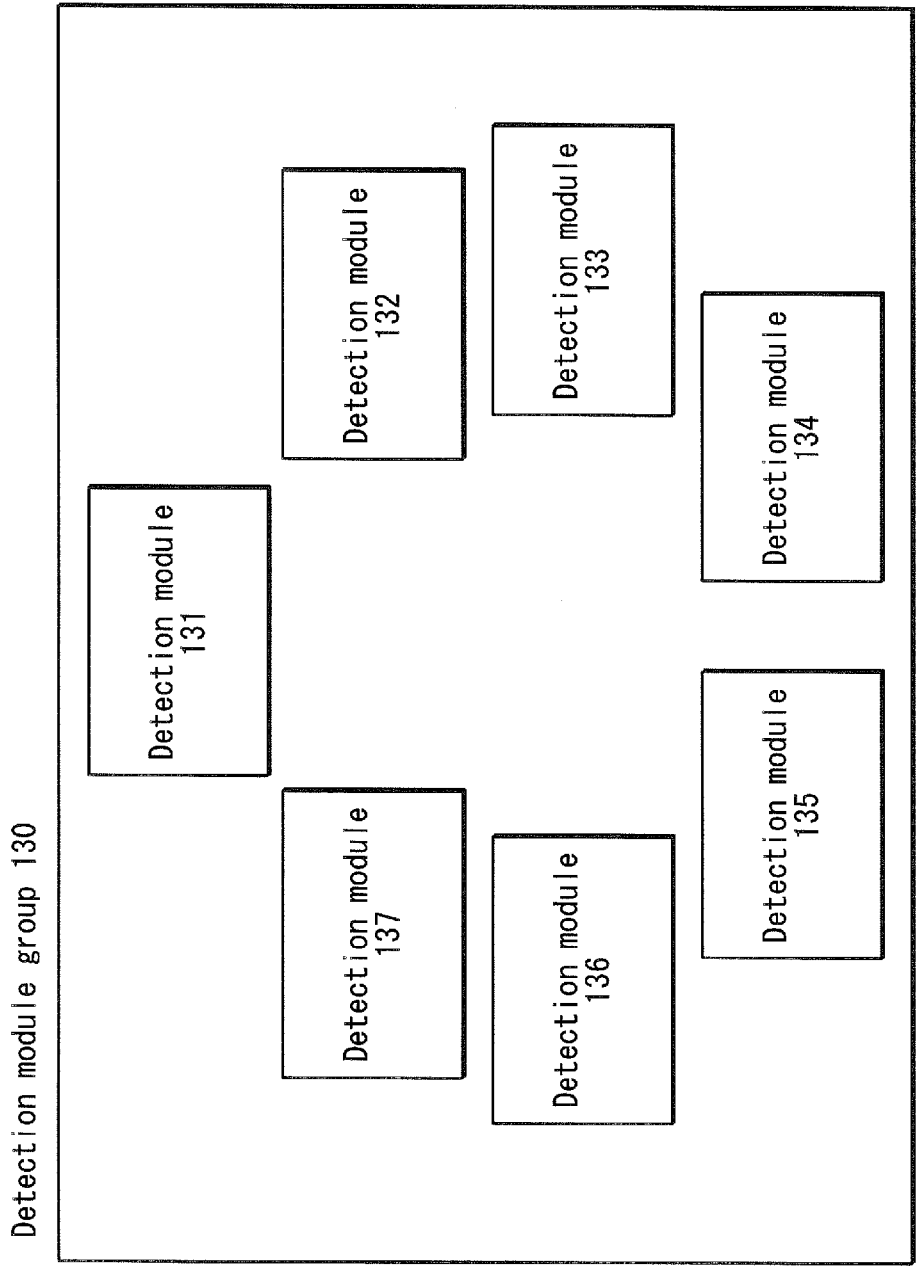
FIG. 3 is a block diagram showing the structure of a detection module group 130.

The detection module group 130 is composed of a plurality of detection modules. In Embodiment 1, the detection module group 130 is composed of seven detection modules, as shown in FIG. 3: detection module 131, detection module 132, ..., and detection module 137.

The detection modules 131, 132, ..., and 137 each detect whether the protection control module 120 has been tampered with. When the protection control module 120 has been tampered with, each of the detection modules notifies the management apparatus 200.

The detection modules 131, 132, ..., and 137 may also have the function of updating the applications 110 and 111.

The detection modules in the detection module group 130 perform tampering detection on each other in order to prevent the detection modules from being tampered with by an attacker and used maliciously. The detection modules transmit the tampering detection results to the management apparatus 200. When determining that a detection module has been tampered with, the management apparatus 200 transmits a deactivation instruction to a different, valid detection module. Upon receiving this deactivation instruction, the other detection module deactivates the detection module that has been tampered with.

When one of the detection modules included in the detection module group 130 is attacked and tampered with, the above structure allows for detection of the tampering and response to the attack.

When determining from the mutual tampering detection results by the detection modules that a detection module has been tampered with, the management apparatus 200 transmits a detection target module 900 to the device 100 in order to confirm the status of the detection modules in greater detail. The device 100 incorporates the detection target module 900 therein. The detection modules 131, 132, ..., and 137 perform tampering detection on the detection target module 900 and transmit the tampering detection results to the management apparatus 200. When determining that a detection module has been tampered with, the management apparatus 200 transmits a deactivation instruction to a different, valid detection module. Upon receiving this deactivation instruction, the other detection module deactivates the detection module that has been tampered with.

In this way, a detection module that has been tampered with is detected early, allowing for a response to the attack.

An access control module 140 stores access information necessary for the detection modules to remove other modules. The access information is, for example, an address assigned to the module that is to be removed, or a manual listing steps necessary for removal. Note that the access information is encrypted with an access information acquisition key that differs each time a module is to be removed.

(b) Structure of Detection Modules

The following describes the detection modules 131, 132, ..., and 137 in detail.

Figure 4:
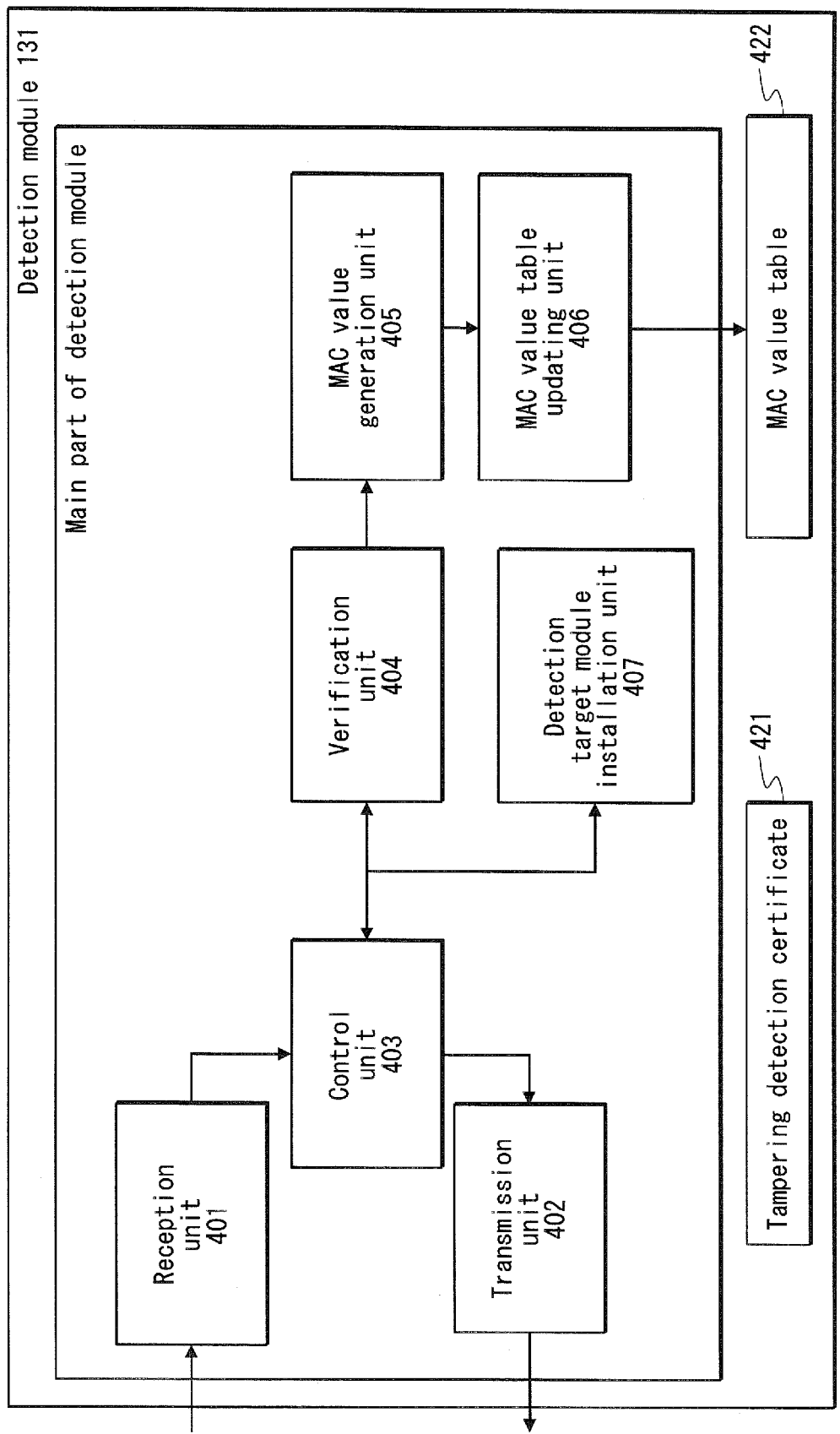
FIG. 4 is a block diagram showing the structure of a detection module 131.

FIG. 4 is a functional block diagram showing the functional structure of the detection module 131. The detection modules 132, ..., and 137 have a similar structure. The detection module 131 includes a main part, a tampering detection certificate 421, and a MAC value table 422. The tampering detection certificate 421 is a certificate for detecting tampering in the main part of the detection module and is generated using a signature private key stored by a detection target module distribution unit 220 in the management apparatus 200.

Specifically, a digital signature is provided for the main body of the detection module using the signature private key, thus generating signature data. The generated signature data is set as the tampering detection certificate 421.

The main part of the detection module includes a reception unit 401, a transmission unit 402, a control unit 403, a verification unit 404, a MAC value generation unit 405, a MAC value table updating unit 406, and a detection target module installation unit 407.

The reception unit 401 receives a variety of instructions, as well as the detection target module 900, from the management apparatus 200. The reception unit 401 also receives, from other detection modules, the main part of each detection module, the detection module verification certificate, and the like, which are necessary for mutual monitoring. Furthermore, the reception unit 401 receives, from other detection modules, the result of requested processing, the result of monitoring of the protection control module 120 by the other detection modules, etc.

The transmission unit 402 transmits data, such as a variety of processing results, certificates, and the like, to the management apparatus 200, the protection control module 120, the other detection modules, and the access control module 140.

The control unit 403 executes a variety of processes to control the verification unit 404 and the detection target module installation unit 407 based on the instructions and notifications received by the reception unit 401.

Specifically, the control unit 403 performs processes such as the following: detection of tampering with the protection control module 120 and the detection modules 132, . . . , and 137; installation of the protection control module 120 and the detection target module 900; and updating of the monitoring pattern.

In response to control by the control unit 403, the verification unit 404 detects whether the protection control module 120, the detection modules 132, . . . , 137, and the detection target module 900 have been tampered with.

The verification unit 404 may detect tampering using the verification certificate attached to each module. The verification unit 404 may also use a Message Authentication Code (hereinafter, MAC value) calculated in advance. Note that the verification unit 404 performs tampering detection on the detection target module 900 using the verification certificate attached to the detection target module 900.

The management apparatus 200 provides the verification unit 404 in advance with information indicating when to perform tampering detection on which modules. When the management apparatus 200 indicates a change in the modules on which tampering detection is to be performed, or a change in the timing of tampering detection, the verification unit 404 operates in accordance with the indicated changes.

The MAC value generation unit 405 stores a verification key. When the verification unit 404 uses MAC values for tampering detection, the MAC value generation unit 405 generates a MAC value using the verification key.

The MAC value table updating unit 406 updates a MAC value table 422 that stores the MAC value for each module. The MAC value table 422 stores a module identifier for identifying one of the modules in correspondence with the MAC value corresponding to that module.

The MAC value generation unit 405 acquires a module that is the target of tampering detection and calculates the MAC value thereof. The verification unit 404 performs tampering detection by comparing the calculated MAC value with the MAC value stored in the MAC value table 422 for the target module.

In response to control by the control unit 403, the detection target module installation unit 407 installs the detection target module 900 transmitted from the management apparatus 200 in the device 100.

Note that Non-Patent Literature 1 provides a detailed explanation of a signature method. Non-Patent Literature 2 provides a detailed explanation of certificates.

(c) Structure of Protection Control Module 120

The following describes the protection control module 120 in detail.

Figure 2:
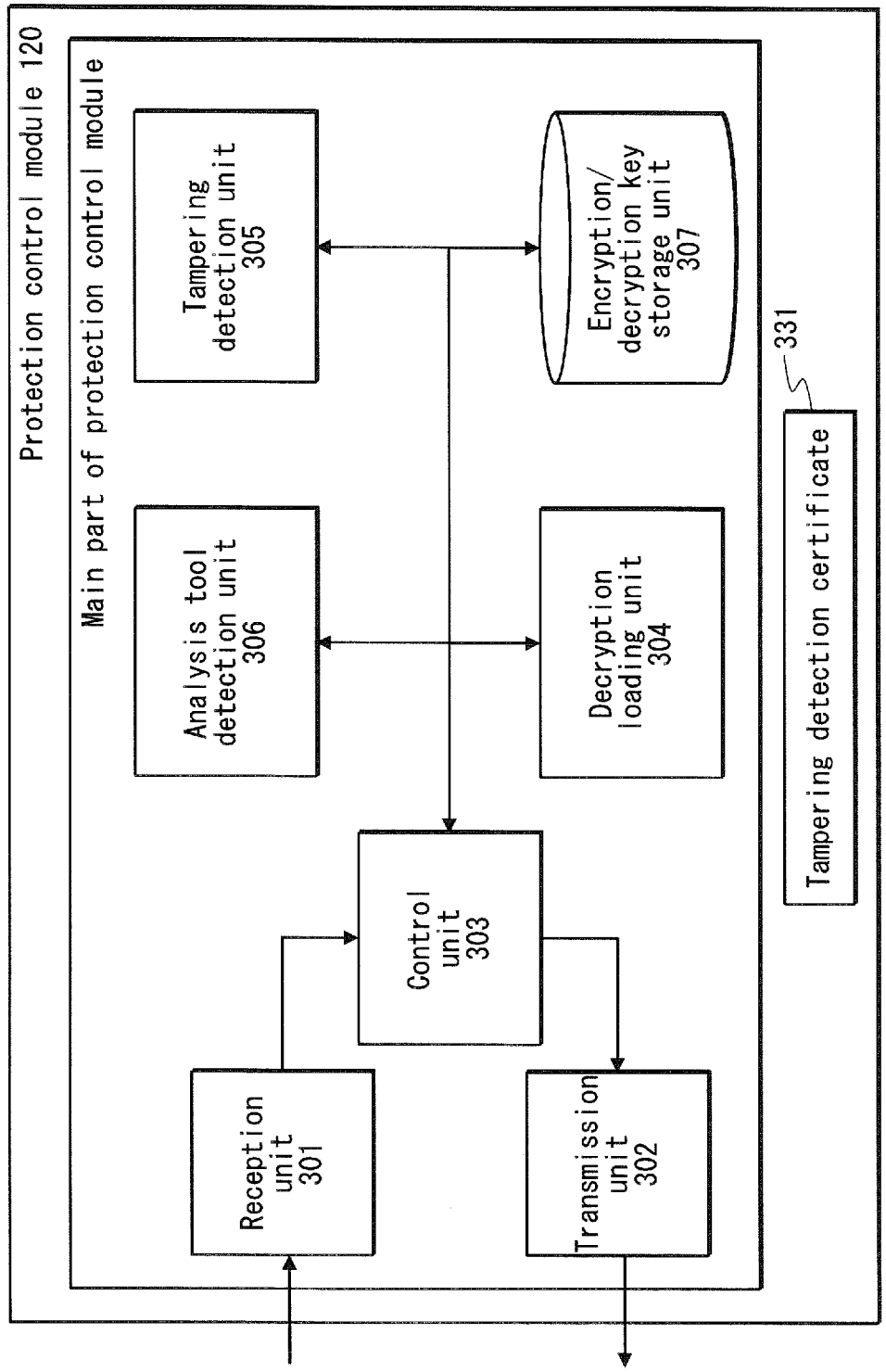
FIG. 2 is a block diagram showing the structure of a protection control module 120.

FIG. 2 is a functional block diagram showing the functional structure of the protection control module 120. The protection control module 120 includes a main part and a tampering detection certificate 331. The tampering detection certificate 331 is a certificate for detecting tampering in the main part of the protection control module 120 and is generated using a signature private key stored by the detection target module distribution unit 220 in the management apparatus 200.

As shown in FIG. 2, the protection control module 120 includes a reception unit 301, a transmission unit 302, a control unit 303, a decryption loading unit 304, a tampering detection unit 305, an analysis tool detection unit 306, and an encryption/decryption key storage unit 307.

The reception unit 301 receives a variety of requests from the detection modules 131, 132, . . . , and 137.

The transmission unit 302 transmits a variety of requests to the detection modules 131, 132, . . . , and 137.

By controlling the decryption loading unit 304, the tampering detection unit 305, and the analysis tool detection unit 306, the control unit 303 detects when the applications 110 and 111 have been attacked.

When the encrypted applications 110 and 111 are to be executed, the decryption loading unit 304 decrypts the applications 110 and 111 using the encryption/decryption key and loads them into memory. While the applications 110 and 111 are running and a context switch to another application occurs, the decryption loading unit 304 encrypts the data in memory with the encryption/decryption key. When a context switch occurs again to return to the applications 110 and 111, the decryption loading unit 304 decrypts the encrypted data. Note that the context switch refers to the process of saving and restoring the state (context) of the CPU so that a plurality of modules can share the same CPU.

The tampering detection unit 305 detects whether tampering has occurred in the applications 110 and 111. Methods for detecting tampering include using a verification certificate attached to the applications 110 and 111 and comparing MAC values.

The analysis tool detection unit 306 detects whether an analysis tool, such as a debugger or the like, has been installed and is operating. This is because it is assumed that, in order to attack the applications 110 and 111, a malicious attacker will install an analysis tool and cause the analysis tool to operate. The detection method may, for example, be to search for a file name, to check whether a special register used by a debugger is in use, or to detect an interrupt set by a debugger.

The encryption/decryption key storage unit 307 stores an encryption/decryption key for encrypting and decrypting the applications 110 and 111.

(d) Structure of the Access Control Module 140

Figure 5:
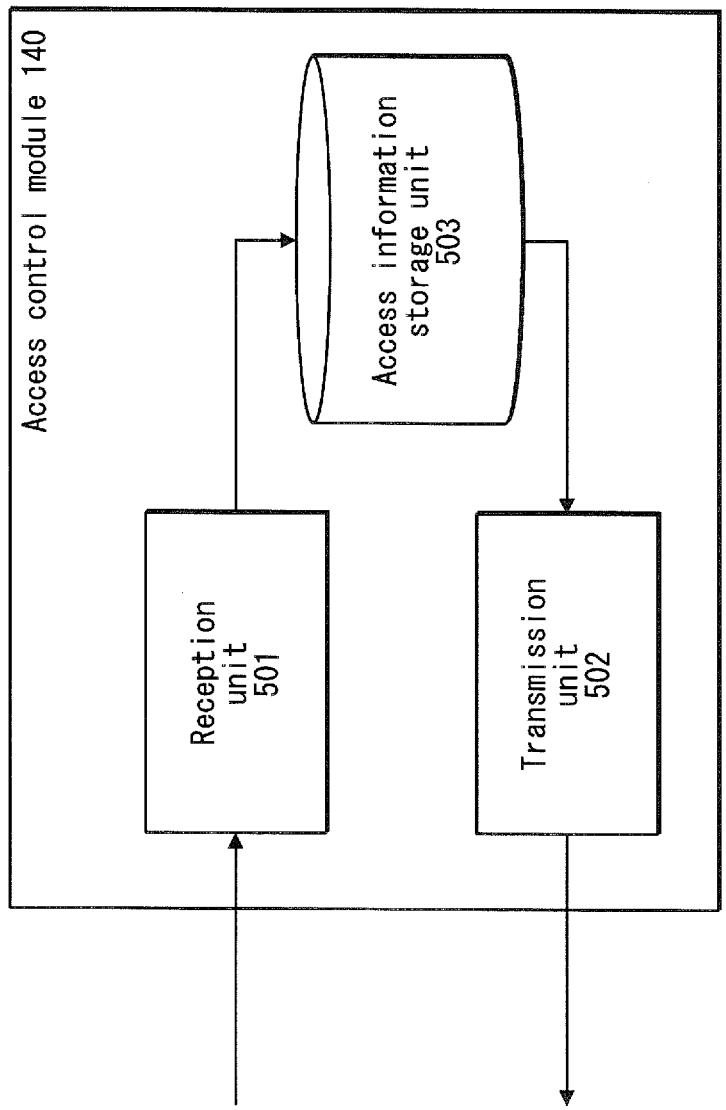
FIG. 5 is a block diagram showing the structure of an access control module 140.

FIG. 5 is a functional block diagram showing the functional structure of the access control module 140. As shown in FIG. 5, the access control module 140 includes a reception unit 501, a transmission unit 502, and an access information storage unit 503.

The reception unit 501 receives, from the detection modules 131, 132, ..., and 137, a request for acquisition of access information, which is information necessary to remove a detection module that has been tampered with.

In response to the access information acquisition request, the transmission unit 502 transmits access information to the detection module that issued the request.

The access information storage unit 503 stores pieces of access information respectively necessary to remove the detection modules 131, 132, ..., and 137.

A detection module identifier for identifying the detection module to be removed is attached to each piece of access information. Each piece of access information is encrypted with an access information acquisition key.

In response to the access information acquisition request from one of the detection modules 131, 132, ..., and 137, the access information storage unit 503 transmits, to the requesting detection module, the piece of access information to which is attached the identifier for the detection module that is to be removed.

(e) Hardware Structure of Device 100

Next, the hardware structure of the device 100 is described with reference to FIG. 9.

Figure 9:
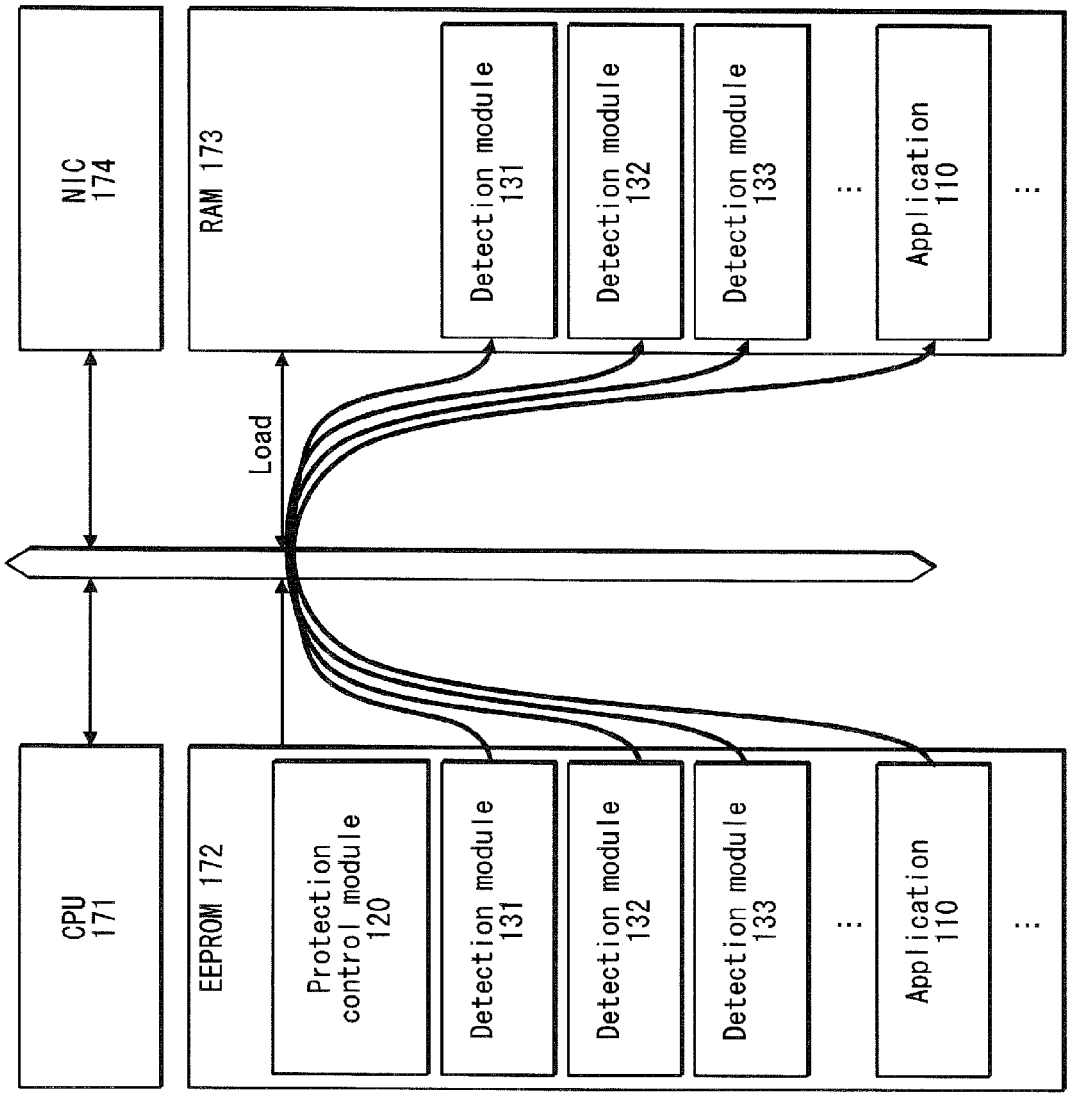
FIG. 9 is a hardware configuration diagram showing the structure of a device 100.

As shown in FIG. 9, the device 100 includes a Central Processing Unit (CPU) 171; an Electrically Erasable and Programmable Read Only Memory (EEPROM) 172, which is a non-volatile memory; a Random Access Memory (RAM) 173; a Network Interface Card (NIC) 174; and the like. These components are connected via a bus for inter-component communication.

The EEPROM 172 stores the protection control module 120, the detection modules 131, 132, ..., and 137, the applications 110 and 111, and the like.

The functional units of the modules stored in the EEPROM 172 are achieved by the CPU 171 executing the modules. Specifically, each functional unit is described as a computer program.

The RAM 173 is used by the CPU 171 as a work area. The detection modules 131, 132, ..., and 137 and the applications 110 and 111 are loaded into the RAM 173. The detection module that is the target of tampering detection or deactivation is one of the detection modules operating in the RAM 173. Note that while only three detection modules 131, 132, and 133 are shown in FIG. 9 due to space constraints in the figure, seven detection modules 131, 132, ..., and 137 actually exist in the EEPROM 172 and the RAM 173.

The NIC 174 is an extension card for connecting to the network.

(f) Software Hierarchy

Next, the software hierarchy of the device 100 is described with reference to FIG. 10.

Figure 10:
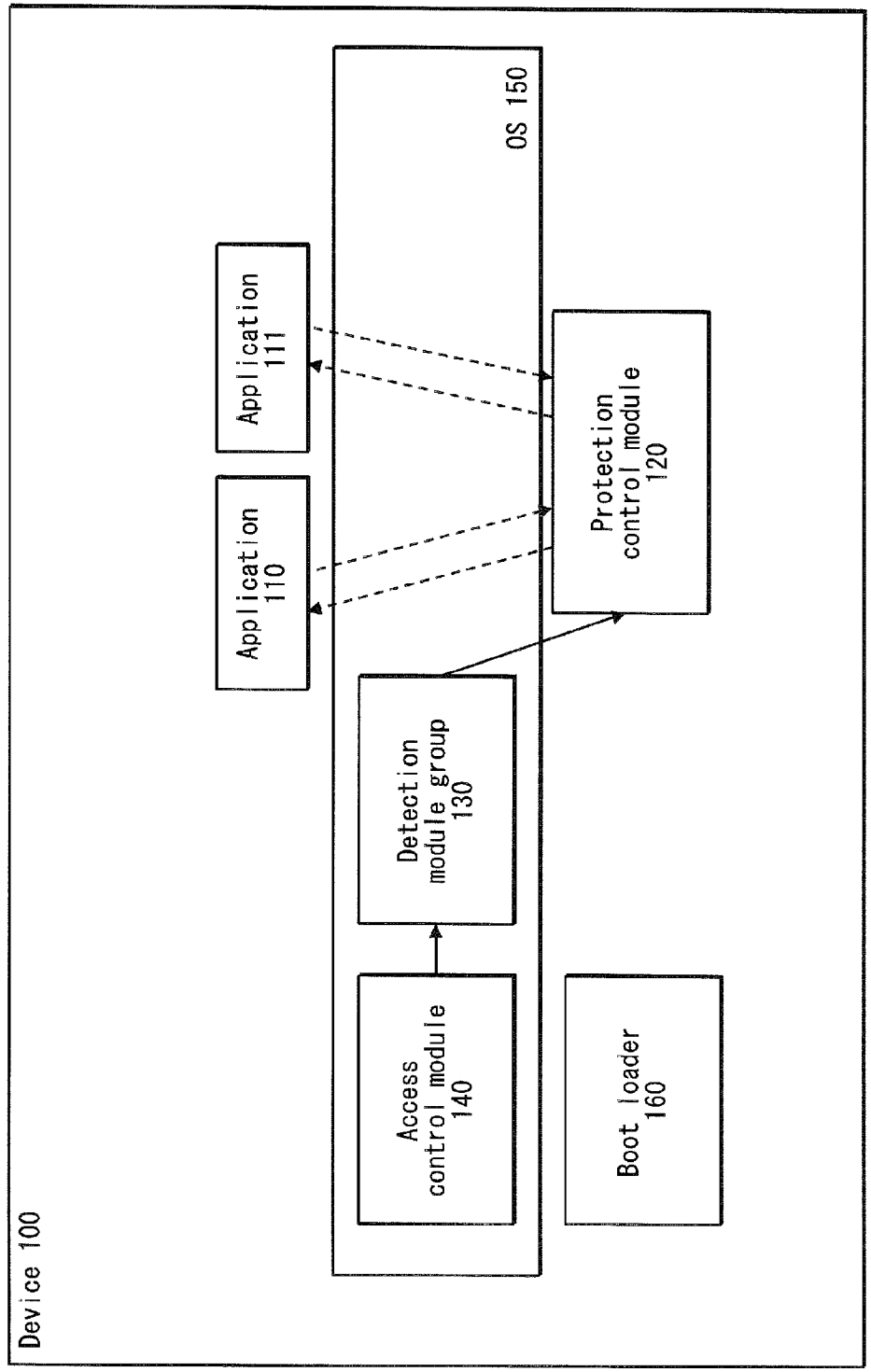
FIG. 10 is a configuration diagram showing the software configuration diagram of the device 100.

As shown in FIG. 10, the access control module 140 and the detection module group 130 are included in the OS 150. The applications 110 and 111 operate in the OS 150, whereas the protection control module 120 and a boot loader 160 are external to management by the OS 150.

When the device 100 boots, applications are executed after the protection control module 120 and the detection module group 130 boot.

(3) Structure of Management Apparatus 200

Next, the structure of the management apparatus 200 is described.

The management apparatus 200 functions as an invalid module identification device, receiving tampering detection results from the detection module group 130 in the device 100 and, based on the received tampering detection results, identifying an invalid detection module that is to be deactivated.

(a) Overall Structure

As shown in FIG. 1, the management apparatus 200 includes a determination unit 210, a detection target module distribution unit 220, a module deactivation unit 230, and a communication unit 240. The management apparatus 200 is, specifically, a computer system provided with a CPU, a ROM, a RAM, a hard disk unit, etc. The management apparatus 200 achieves the above functions by the CPU operating in accordance with computer programs stored in the ROM or on the hard disk unit.

The determination unit 210 receives tampering detection results from the detection module group 130 in the device 100 and, based on the received tampering detection results, identifies an invalid detection module that is to be deactivated.

When the tampering detection results from the detection module group 130 indicate that a detection module has been tampered with, the detection target module distribution unit 220 transmits the detection target module 900 to the device 100.

Upon receiving an acquisition request for an access information acquisition key from one of the detection modules 131, 132, ..., and 137, the module deactivation unit 230 transmits the access information acquisition key to the requesting detection module.

The communication unit 240 transmits information to and receives information from the device 100 and the units in the management apparatus 200. For example, the communication unit 240 transmits, to the determination unit 210, the tampering detection results received from the device 100. Note that for communication between the device 100 and the management apparatus 200, a secure communication channel may be used, for example by encrypting data.

Next, the components of the management apparatus 200 are each described.

(b) Structure of Determination Unit 210

Figure 6:
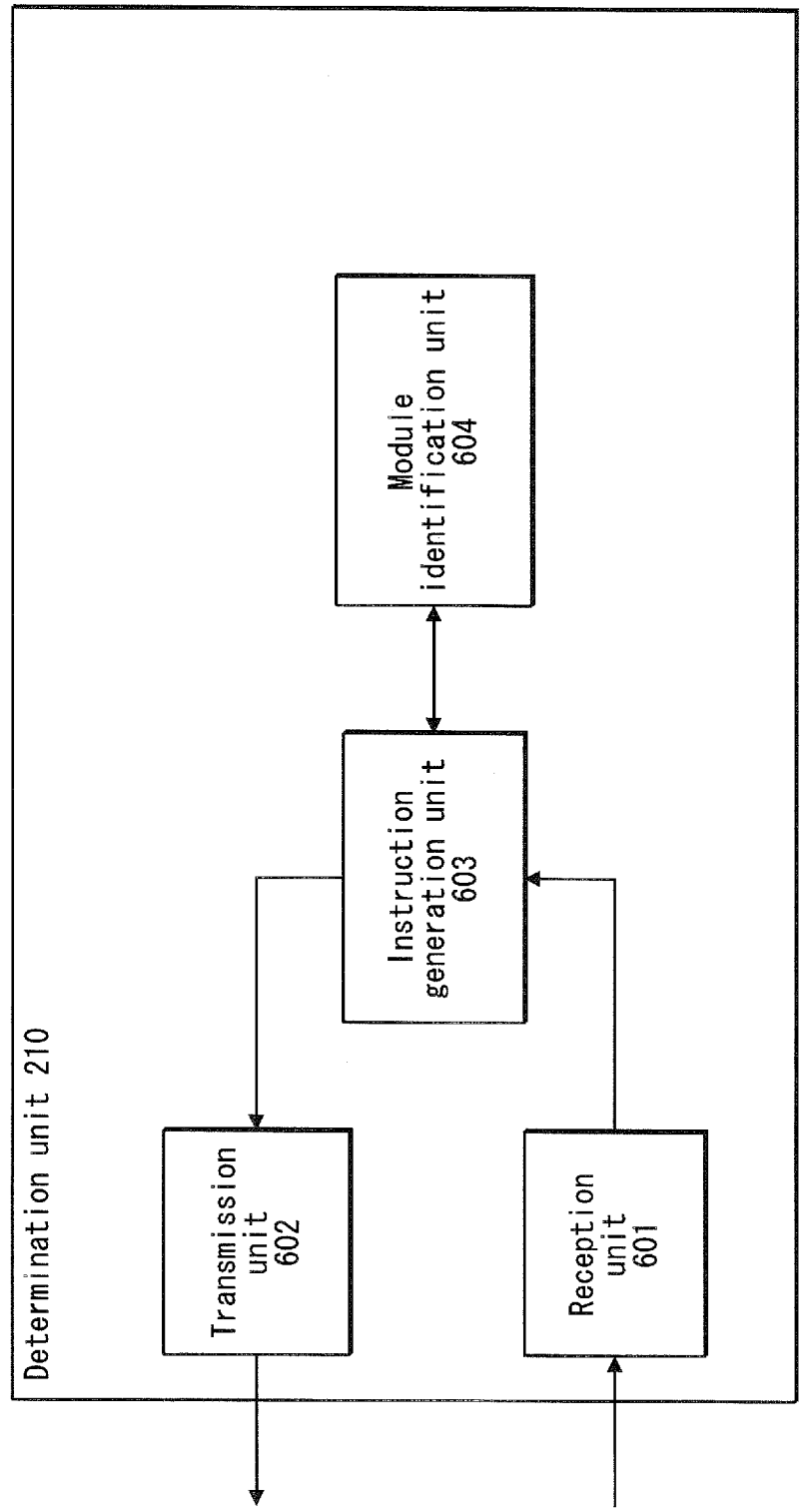
FIG. 6 is a block diagram showing the structure of a determination unit 210.

FIG. 6 is a functional block diagram showing the functional structure of the determination unit 210.

As shown in FIG. 6, the determination unit 210 includes a reception unit 601, a transmission unit 602, an instruction generation unit 603, and a module identification unit 604. An invalid-module identification unit 605 is provided in the module identification unit 604.

The reception unit 601 receives, from the detection modules 131, 132, ..., and 137, the tampering detection results, a variety of requests, and the like, and transmits these results, requests, etc. to the instruction generation unit 603. The reception unit 601 also receives notification that processing is complete from each of the units in the management apparatus 200 and transmits the notification to the instruction generation unit 603.

The transmission unit 602 transmits the instructions generated by the instruction generation unit 603 to the units in the management apparatus 200.

The instruction generation unit 603 transmits, to the module identification unit 604, the tampering detection results received from the detection modules 131, 132, ..., and 137 (hereinafter, also referred to as "inter-monitoring results", or simply "monitoring results"). The instruction generation unit 603 acquires, from the module identification unit 604, information identifying an invalid detection module that has been tampered with and, based on the acquired information, generates instructions for the units in the management apparatus 200.

In order to identify invalid detection modules that have been tampered with, the module identification unit 604 determines whether each of the detection modules has been tampered with by using the inter-monitoring results received from the detection modules 131, 132, . . . , and 137. Furthermore, in order to identify invalid detection modules that have been tampered with, the module identification unit 604 determines whether each of the detection modules has been tampered with by using the monitoring results received from the detection modules 131, 132, . . . , and 137 for the detection target module. The module identification unit 604 transmits the information identifying the invalid detection module to the instruction generation unit 603.

The invalid-module identification unit 605 determines whether each of the detection modules is invalid by using the tampering detection results (monitoring results) received from the detection modules for the detection target module 900. Specifically, the invalid-module identification unit 605 identifies as invalid any detection module determining the detection target module 900 to be "not tampered with", i.e. valid.

(c) Detection Target Module Distribution Unit 220

Figure 7:
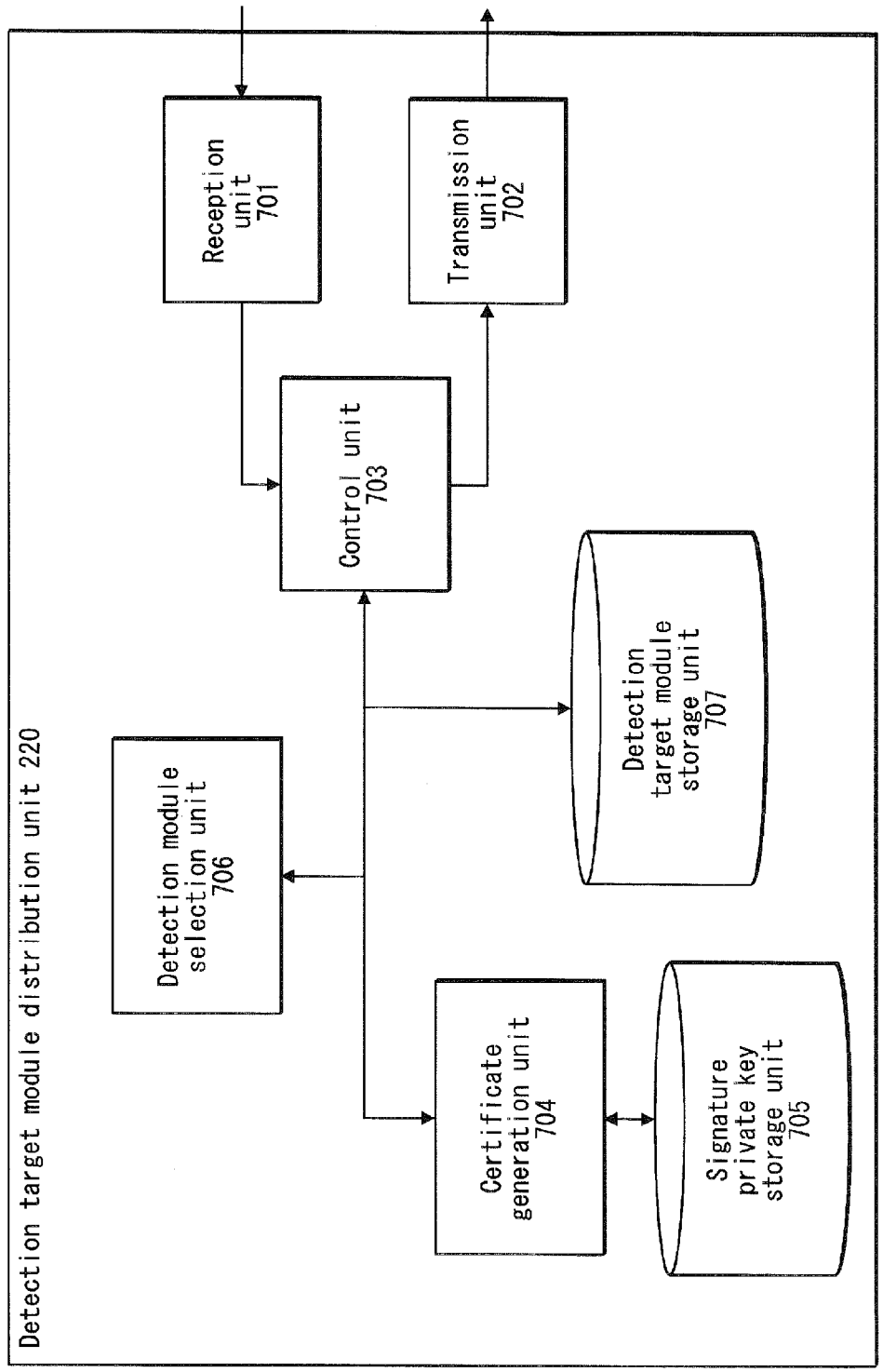
FIG. 7 is a block diagram showing the structure of a detection target module distribution unit 220.

FIG. 7 is a functional block diagram showing the functional structure of the detection target module distribution unit 220.

As shown in FIG. 7, the detection target module distribution unit 220 includes a reception unit 701, a transmission unit 702, a control unit 703, a certificate generation unit 704, a signature private key storage unit 705, a detection module selection unit 706, and a detection target module storage unit 707.

The reception unit 701 receives tampering detection results for the protection control module 120 from the detection modules 131, 132, . . . , and 137 and receives inter-monitoring results for monitoring between detection modules.

When it is necessary to update the applications 110 and 111 or the protection control module 120 in the device 100, the transmission unit 702 transmits data such as the detection target module 900, a request to install the detection target module 900, and a key necessary for decryption, to the detection modules 131, 132, . . . , and 137.

The control unit 703 controls each of the constituent elements in the detection target module distribution unit 220.

Figure 21:
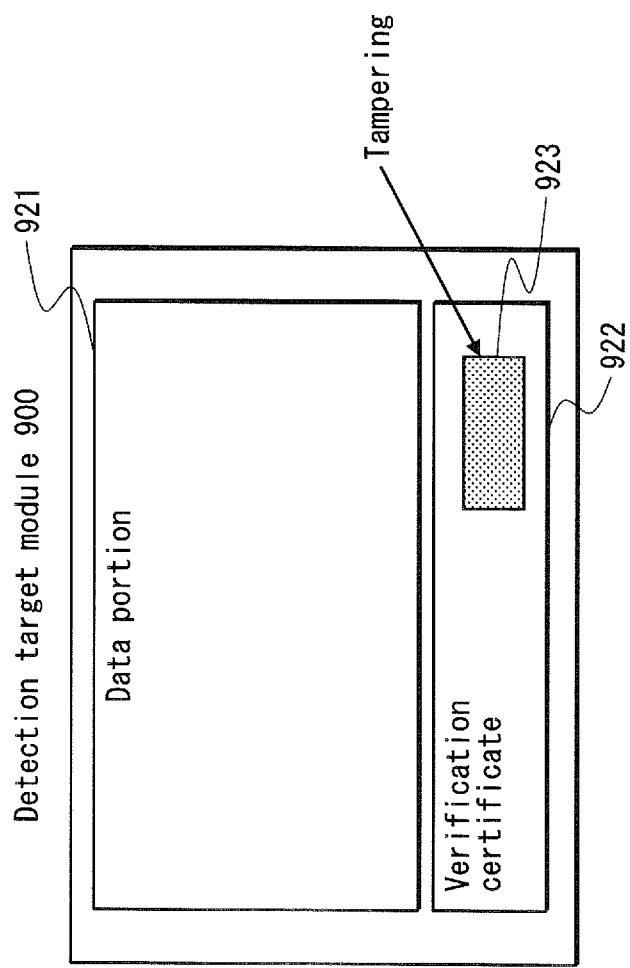
FIG. 21 illustrates the data structure of a detection target module 900.

The certificate generation unit 704 generates an authentication certificate for the authentication public key of the detection modules 131, 132, . . . , and 137 using a signature private key. The certificate generation unit 704 also generates tampering verification certificates for verifying tampering with the protection control module 120 and the detection modules 131, 132, . . . , and 137. Furthermore, the certificate generation unit 704 generates a verification certificate for the detection target module 900 using the signature private key, the verification certificate being used by the detection modules 131, 132, . . . , and 137 in the device 100 when performing tampering detection on the detection target module 900. Specifically, as shown in FIG. 21, the verification certificate is a signature for a data portion 921 of the detection target module 900. As shown in FIG. 21, the verification certificate generated here is an invalid certificate, as a portion 923 of the signature is tampered with. Note that instead of tampering with the signature, the data portion 921 may be tampered with. Furthermore, the verification certificate may be generated using a random or a predetermined number as the signature instead of using the signature private key. In such a case, it is not necessary to include the signature private key storage unit 705 in the detection target module distribution unit 220.

The signature private key storage unit 705 stores the signature private key used when the certificate generation unit 704 generates certificates.

When the detection target module 900 is to be distributed, the detection module selection unit 706 selects a detection module to use for detection target module distribution. The transmission unit 702 transmits the encryption key and the detection target module 900 to the detection module selected by the detection module selection unit 706.

The detection target module storage unit 707 stores the detection target module that is the target of tampering detection performed by the detection modules 131, 132, . . . , and 137 in the device 100.

(d) Module Deactivation Unit 230

Figure 8:
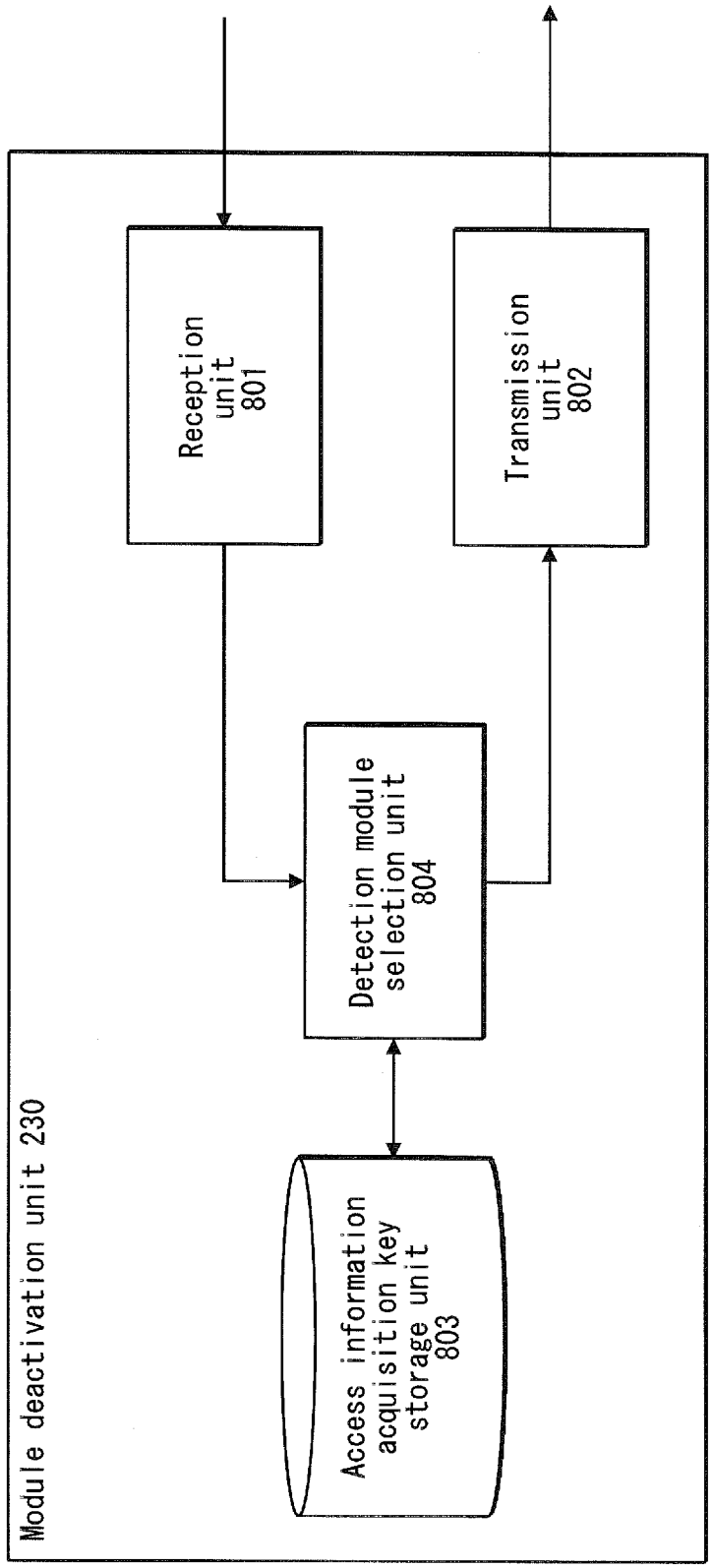
FIG. 8 is a block diagram showing the structure of a module deactivation unit 230.

FIG. 8 is a functional block diagram showing the functional structure of the module deactivation unit 230.

As shown in FIG. 8, the module deactivation unit 230 includes a reception unit 801, a transmission unit 802, an access information acquisition key storage unit 803, and a detection module selection unit 804.

The reception unit 801 receives an instruction from the determination unit 210 to deactivate an invalid detection module that has been tampered with. The reception unit 801 also receives, from the detection modules 131, 132, . . . , and 137, a request for acquisition of the access information acquisition key.

In response to the request for acquisition of the access information acquisition key, the transmission unit 802 transmits the access information acquisition key to the detection module that issued the request.

The access information acquisition key storage unit 803 stores the access information acquisition key for decrypting the access information stored by the access control module 140.

The detection module selection unit 804 selects a detection module to deactivate the invalid detection module that has been tampered with and issues, to the selected detection module, an instruction to deactivate the invalid detection module.

Note that when a request for acquisition of the access information acquisition key is received from the detection module selected by the detection module selection unit 804, the transmission unit 802 attaches, to the access information acquisition key, the identifier for the detection module to be removed and transmits the access information acquisition key to the selected detection module.

1.2 Operations of Detection System 10

Next, the operations of the detection system 10 are described.

(1) Overall Operations

Figure 11:
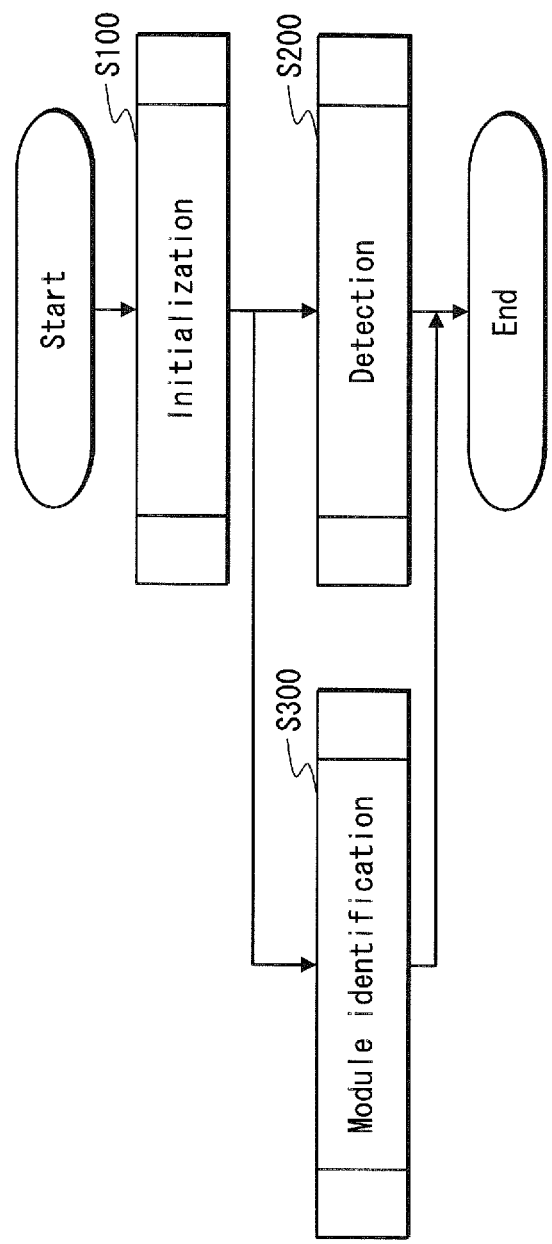
FIG. 11 is a flowchart showing overall operations of the detection system 10.

FIG. 11 is a flowchart showing the overall flow of processing in the detection system 10.

The detection system first performs initialization (S100).

Initialization refers to embedding a variety of data necessary for detection of the protection control module 120, data necessary for the detection modules 131, 132, . . . , and 137 to perform mutual monitoring, and the like in each of the detection modules 131, 132, . . . , and 137. Note that this initialization is performed when the device 100 is manufactured in a factory. Subsequently, the device 100 is shipped from the factory and provided to a user.

When the user uses the device 100, the protection control module 120 in the device 100 protects the applications 110 and 111 from attack.

At the same time, the detection modules 131, 132, . . . , and 137 detect whether the protection control module 120 has been tampered with in order to check whether the protection control module 120 has been attacked (S200).

In parallel with this processing, the detection modules 131, 132, . . . , and 137 perform mutual monitoring in order to identify an invalid module (S300).

Note that not all of the above processes are essential to the tampering monitoring system of the present invention. It suffices for the tampering monitoring system to include processing to identify an invalid module by mutual monitoring between a plurality of detection modules.

(2) Initialization Operations

Figure 12:
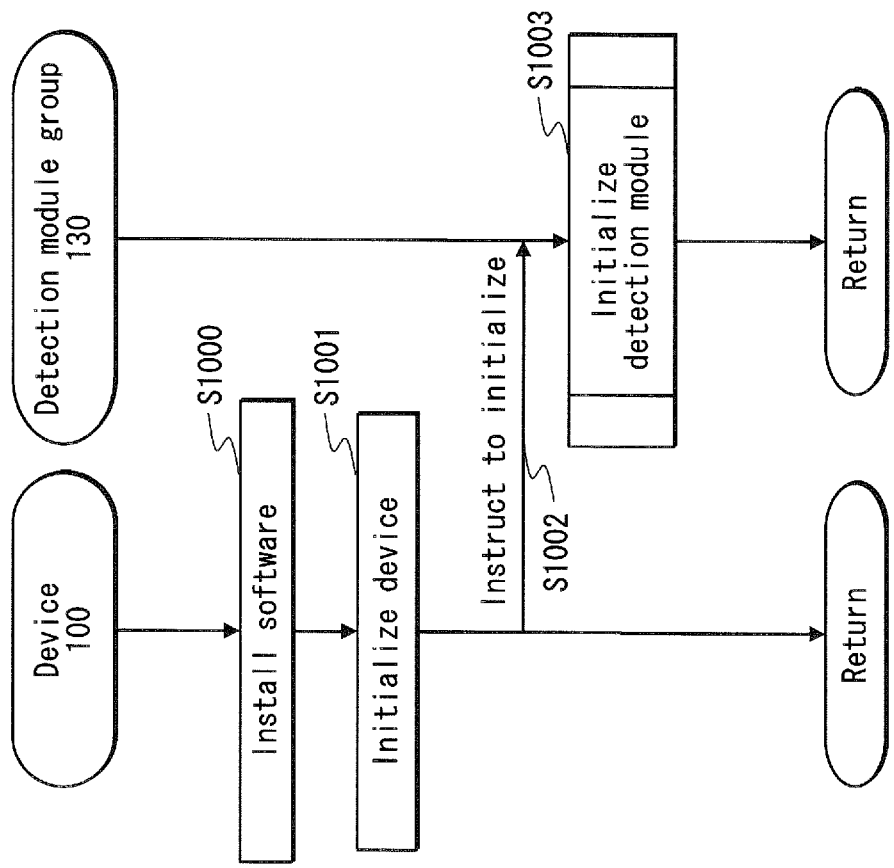
FIG. 12 is a sequence diagram showing initialization.
Figure 13:
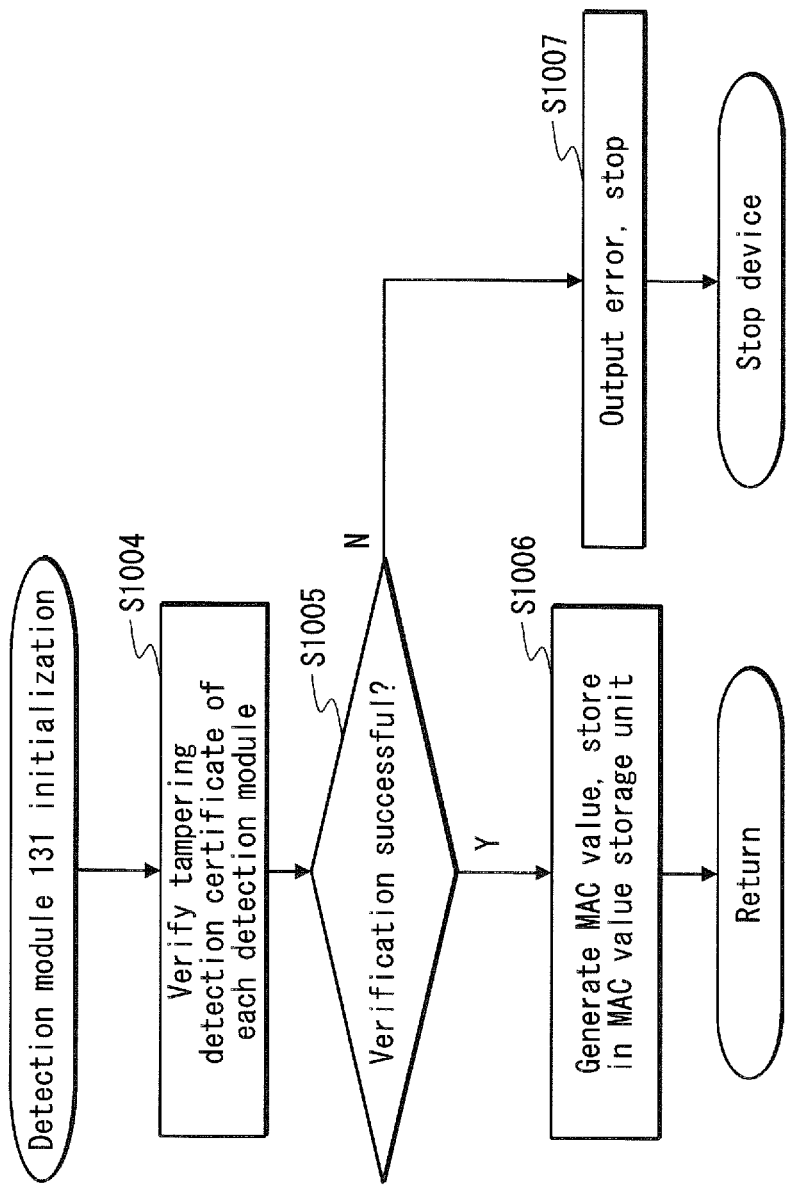
FIG. 13 is a flowchart showing detection module initialization.

The following describes initialization in the detection system 10 (S100 in FIG. 11) in detail with reference to FIGS. 12 and 13.

FIG. 12 is a sequence diagram showing initialization.

When the device 100 is manufactured in the factory, the detection system 10 is installed by installing the applications (110 and 111), the protection control module 120, the detection modules (131, 132, . . . , and 137), and the like in non-volatile memory of the device 100 (S1000).

A tampering detection certificate is attached to each of these pieces of software for verification of whether tampering has occurred in the software. This tampering detection certificate is signed with a signature private key stored by the detection target module distribution unit 220 of the management apparatus 200. Note that in step S1000, software necessary for operations of the device 100 other than the above software is also installed.

The following describes the keys embedded in the device 100 during initialization. The encryption/decryption key is embedded in the protection control module 120, and a signature public key, verification key, and authentication key pair are embedded in the detection modules 131, 132, . . . , and 137. Furthermore, the detection modules 131, 132, . . . , and 137 are installed in the device 100 with detection module identifiers for identifying the detection modules 131, 132, . . . , and 137 respectively embedded therein.

The encryption/decryption key of the protection control module 120 is a key for encrypting and decrypting the applications 110 and 111. The applications 110 and 111 are stored in non-volatile memory after encryption with the encryption/decryption key. The applications 110 and 111 are executed after decryption by the protection control module 120 with the encryption/decryption key.

When the device 100 executes a plurality of applications via context switching, data used by the applications 110 and 111 is encrypted and decrypted using the encryption/decryption key each time a context switch occurs in order to prevent data from being extracted by an analysis tool, such as a debugger, when the applications 110 and 111 are being executed.

Among the keys embedded in the detection modules 131, 132, . . . , and 137, the signature public key is shared by all of the detection modules. On the other hand, the verification key and authentication key pair are unique to each detection module.

This description now returns to FIG. 12. After installation of software in S1000, the device 100 initializes itself by executing software for initialization and software for testing whether the device 100 operates normally (S1001). The device 100 also transmits an initialization instruction to the detection modules 131, 132, . . . , and 137 (S1002). Each detection module performs detection module initialization (S1003).

(3) Detection Module Initialization

FIG. 13 is a flowchart showing operations for detection module initialization (S1003 in FIG. 12).

Note that only the detection module 131 is described in this flowchart. Operations of the detection modules 132, . . . , and 137 are basically the same as the detection module 131.

The detection module 131 verifies the tampering detection certificate of the detection modules 132, . . . , and 137, and the protection control module 120, which are the target of tampering detection (S1004). Verification is accomplished by performing a signature verification algorithm using the signature public key to determine whether the tampering detection certificate for each module is in fact signature data for the module data corresponding to the tampering detection certificate.

If generated hash values match the respective hash values listed in the tampering detection certificates (S1005: Y), then the detection module 131 generates MAC values for the detection modules 132, . . . , and 137 and for the protection control module 120. The detection module 131 stores the generated MAC values in a MAC value table (S1006).

If verification using the signature verification algorithm indicates that the tampering detection certificate is invalid (S1005: N), the detection module 131 outputs an error and stops the device (S1007).

(4) Detection Operations

Next, detection by the detection system 10 (S200 in FIG. 11) is described in detail with reference to the sequence diagram in FIG. 14.

When initialization is complete, the device 100 is shipped from the factory to the user, who uses the device 100.

When the applications 110 and 111 operate on the device 100, the protection control module 120 in the device 100 controls the decryption loading function, the tampering detection function, the analysis tool detection function, etc. to protect the applications 110 and 111 from an attack.

During detection, the detection modules 131, 132, . . . , and 137 first detect whether the protection control module 120 has been tampered with. For example, the detection module 131 performs tampering detection on the protection control module 120 (S2000). Tampering detection is performed by calculating the MAC value of the protection control module 120 using the verification key and comparing the calculated MAC value with the MAC value stored in the MAC value table. Note that while FIG. 14 shows an abbreviated listing, with only the detection modules 131, 132, and 133 shown due to space constraints, detection modules 134, . . . , and 137 also in fact exist.

When the MAC values match, the detection module 131 determines that the protection control module 120 has not been tampered with. On the other hand, when the MAC values do not match, the detection module 131 determines that the protection control module 120 has been tampered with.

Figure 14:
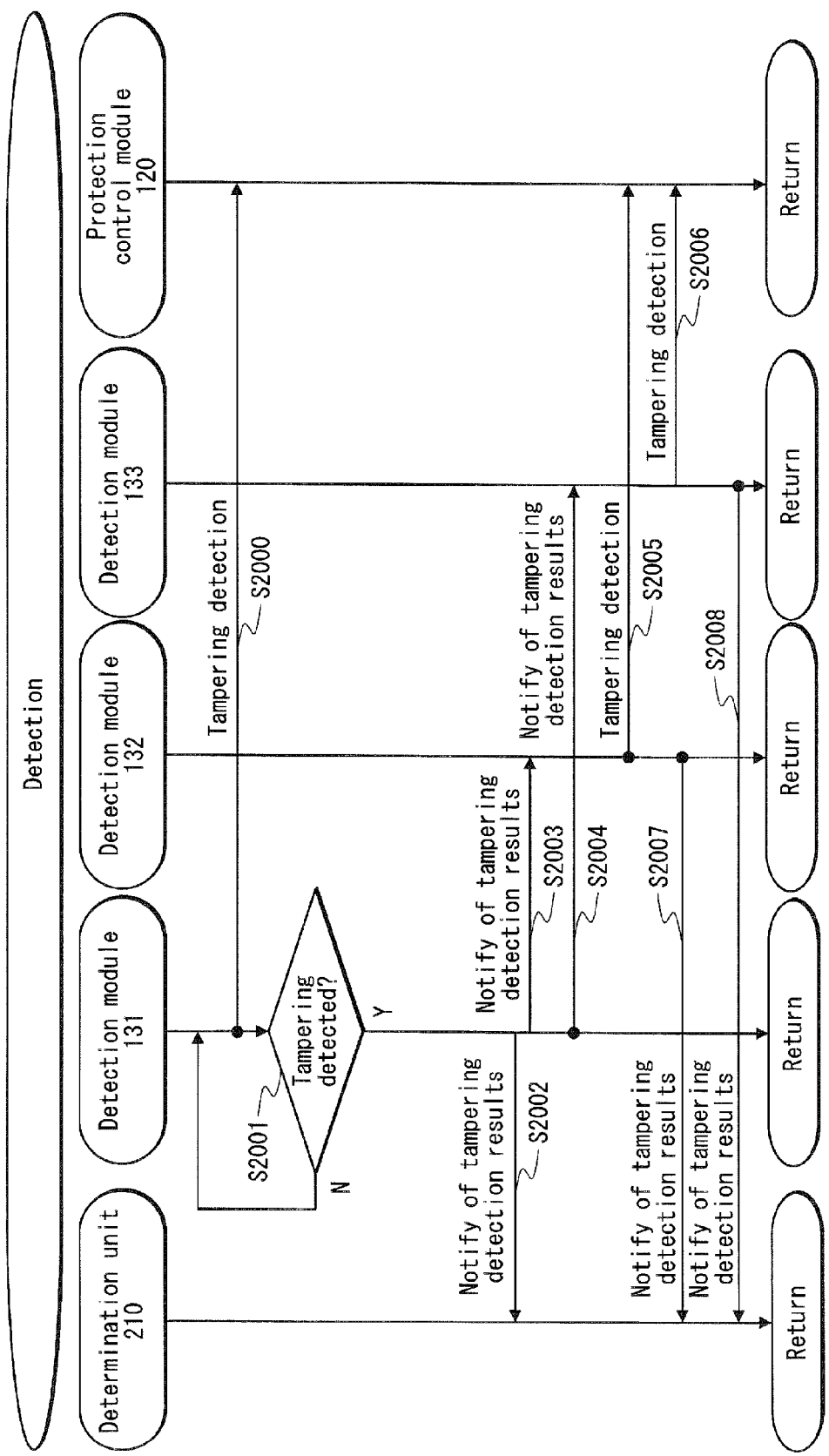
FIG. 14 is a sequence diagram showing detection.

Note that FIG. 14 has been simplified to show only the detection module 131 detecting whether the protection control module 120 has been tampered with. The detection modules 132, . . . , and 137 of course perform similar processing.

The description of subsequent processing also focuses on when the detection module 131 detects tampering in the protection control module 120. Processing is basically the same when the detection modules 132, . . . , and 137 detect tampering in the protection control module 120.

The detection module 131 determines whether the protection control module 120 has been tampered with, i.e. whether the MAC values match, and when determining positively (S2001: Y), notifies the determination unit 210 in the management apparatus 200 and the other detection modules (S2002, S2003, S2004).

When determining that the protection control module 120 has not been tampered with (S2001: N), the detection module 131 returns to tampering detection processing without issuing notification to the determination unit 210 or to other detection modules.

A detection module receiving notification from another detection module that the protection control module 120 has been tampered with uses the verification key and the MAC value to perform tampering detection on the protection control module 120 (S2005, S2006). The detection module notifies the determination unit 210 and the other detection modules of the tampering detection result (S2007, S2008).

The determination unit 210 receives tampering detection results from the detection modules 131, 132, . . . , and 137 (S2007, S2008).

(5) Operations for Module Identification

Figure 15:
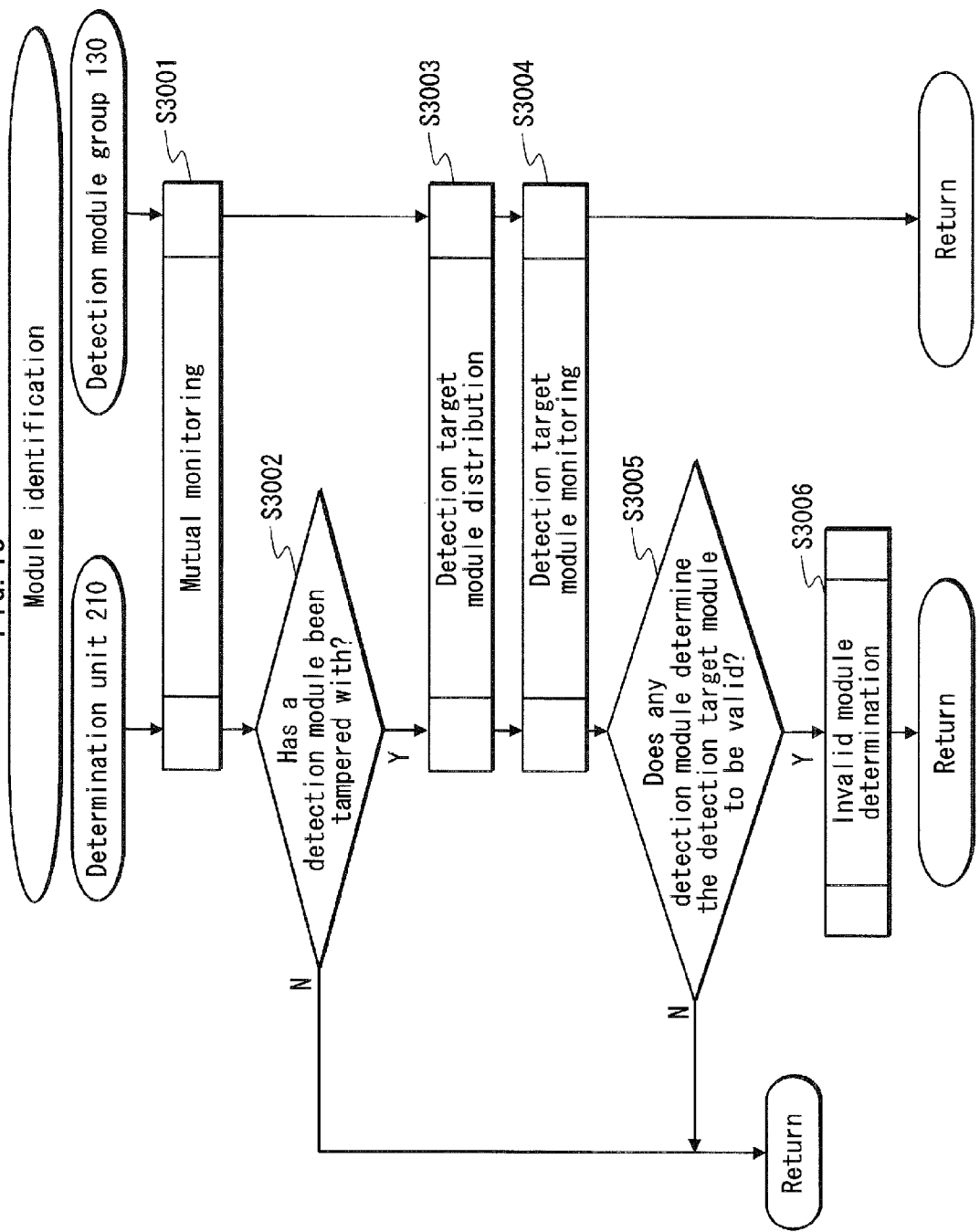
FIG. 15 is a sequence diagram showing module identification.

Next, module identification (S300 in FIG. 11) is described in detail with reference to the sequence diagram in FIG. 15. Note that FIG. 15 represents processing performed individually by the detection modules 131, 132, . . . , and 137 collectively as being performed by the detection module group 130.

The detection modules in the detection module group 130 perform mutual monitoring by performing tampering detection on each other (S3001).

Figure 16:
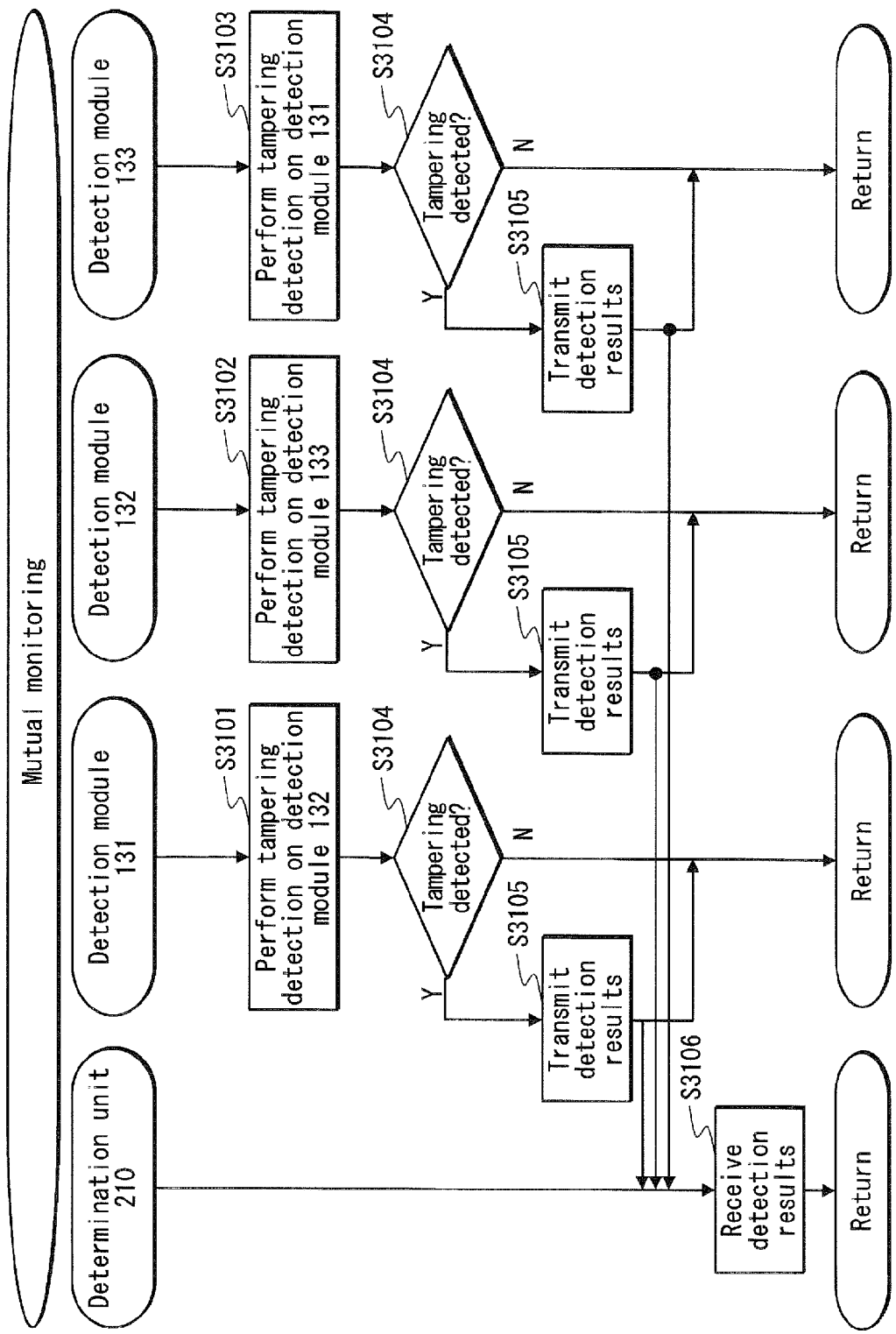
FIG. 16 is a sequence diagram showing mutual monitoring.

Specifically, as shown in FIG. 16, the detection module 131 performs detection monitoring on the detection module 132, the detection module 132 performs detection monitoring on the detection module 133, and the detection module 133 performs detection monitoring on the detection module 131 (S3101, S3102, S3103). Note that while FIG. 16 shows only the detection modules 131, 132, and 133 due to space constraints, detection modules 134, . . . , and 137 also in fact perform processing. Furthermore, while FIG. 16 shows the detection modules 131, 132, and 133 performing tampering detection on each other, the detection modules 134, . . . , 137 are actually included in inter-module tampering detection. Note that detection modules perform tampering detection in accordance with information (called a monitoring pattern) indicating which detection module performs tampering detection on which detection module.

Each detection module determines whether a detection module on which it performed tampering detection has indeed been tampered with (S3104). When determining that the detection module has been tampered with (S3104:Y), the detection module transmits the detection result to the determination unit 210 of the management apparatus 200 (S3105). When determining that the detection module has not been tampered with (S3104: N), the detection module simply continues processing without taking any other action. The determination unit 210 of the management apparatus 200 receives any detection results transmitted by the detection modules (S3106). This description now returns to FIG. 15.

In accordance with the detection results received from the detection modules, the determination unit 210 of the management apparatus 200 determines whether any detection modules have been tampered with (S3002). Specifically, when receiving a detection result from one or more detection module among the detection module group 130, the determination unit 210 determines that a detection module has been tampered with. When determining that no detection module has been tampered with (S3002: N), the determination unit 210 terminates module identification without taking any other action. If it is determined that a detection module has been tampered with (S3002: Y), the detection target module 900 is distributed via detection target module distribution processing (S3003).

Figure 17:
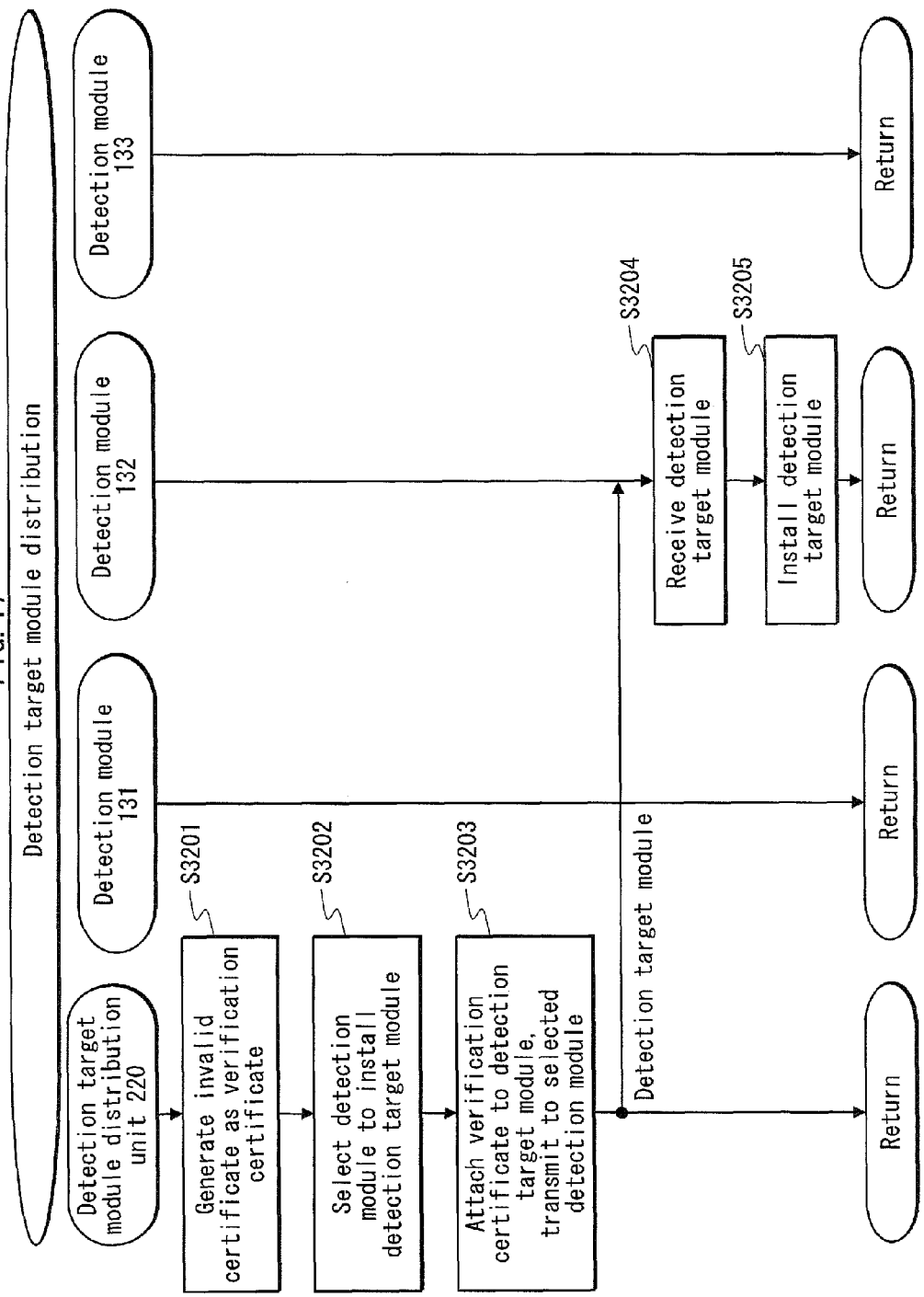
FIG. 17 is a sequence diagram showing detection target module distribution.

Specifically, as shown in FIG. 17, the detection target module distribution unit 220 of the management apparatus 200 first generates an invalid certificate as the verification certificate corresponding to the detection target module 900 (S3201). Next, the detection target module distribution unit 220 selects a detection module to install the detection target module 900 (S3202). The detection target module distribution unit 220 transmits the detection target module 900, with the generated verification certificate attached thereto, to the selected detection module (S3203).

FIG. 17 shows the case of the detection target module distribution unit 220 selecting the detection module 132. Operations are similar when a different detection module is selected. The selected detection module 132 receives the detection target module 900 from the detection target module distribution unit 220 (S3204). Furthermore, the detection module 132 installs the detection target module 900 in the device 100 (S3205). This description now returns to FIG. 15.

Next, each detection module performs detection target module monitoring by performing tampering detection on the detection target module 900 installed in the device 100 (S3004).

Figure 18:
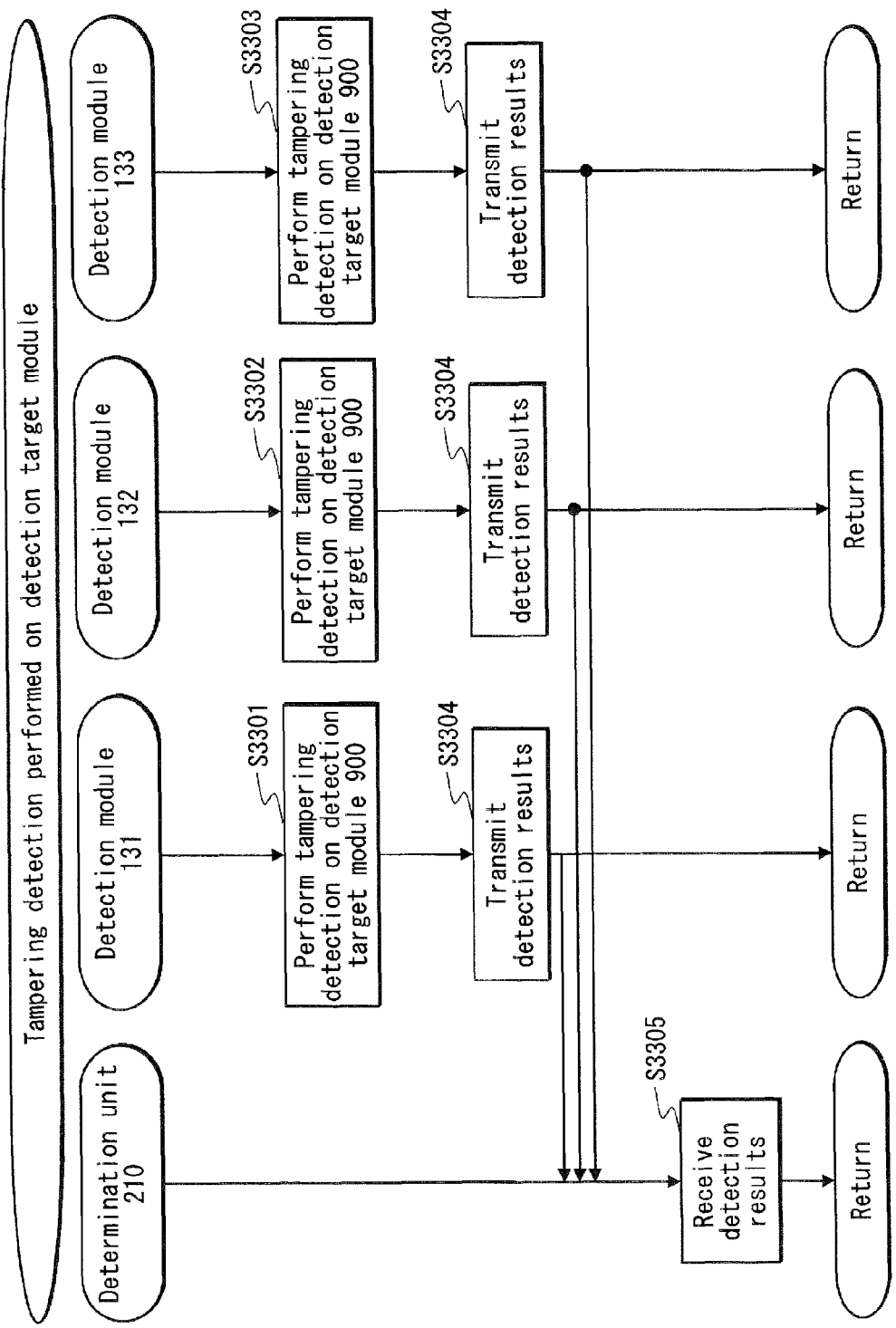
FIG. 18 is a sequence diagram showing detection target module monitoring.
Figure 22:
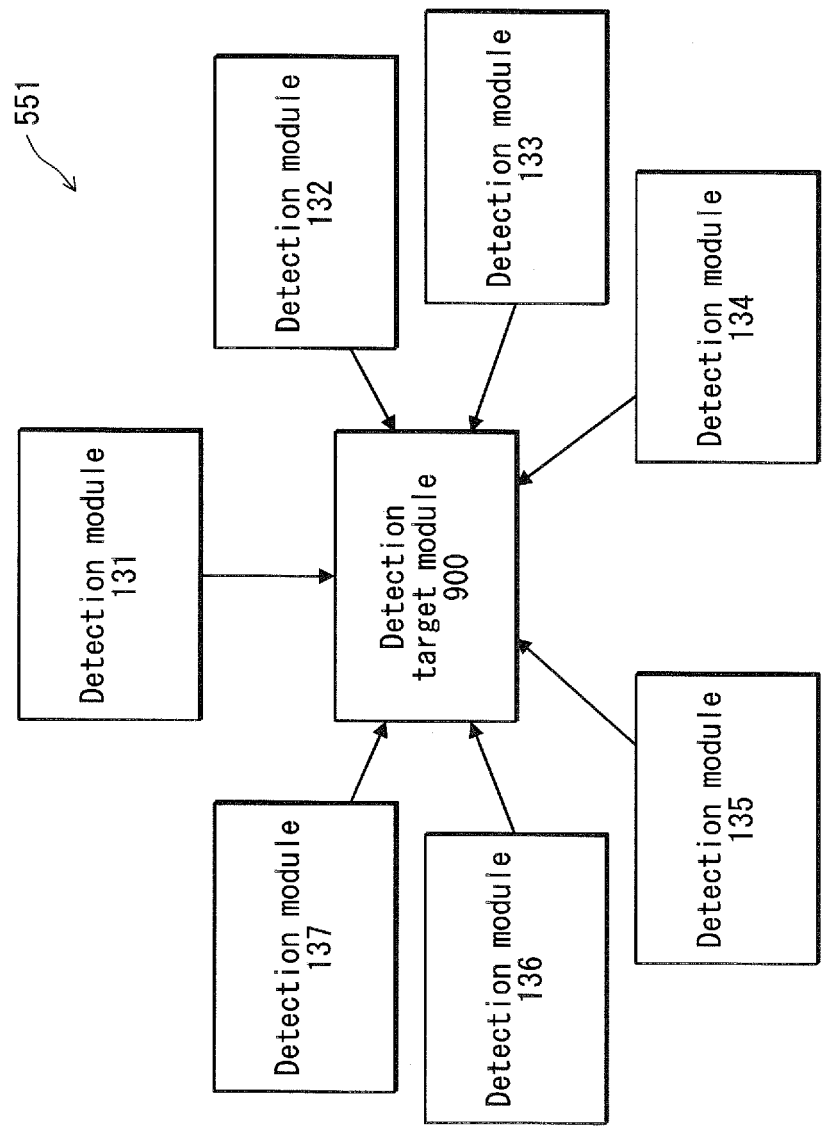
FIG. 22 illustrates monitoring of the detection target module 900 by detection modules.

Specifically, as shown in FIGS. 18 and 22, the detection modules 131, 132, . . . , and 137 first perform tampering detection on the detection target module 900 (S3301, S3302, S3303). Note that while FIG. 18 shows only the detection modules 131, 132, and 133, detection modules 134, . . . , and 137 also in fact perform similar processing. The detection modules transmit the tampering detection results to the detection target module distribution unit 220 (S3304). The determination unit 210 receives the detection results (S3305). This description now returns to FIG. 15.

Based on the results of detection target module monitoring, the determination unit 210 determines whether any detection module determines the detection target module to be valid (S3005). When determining that no detection module has determined the detection target module to be valid (S3005: N), the determination unit 210 terminates module identification without taking any other action. If it is determined that a detection module has determined the detection target module to be valid (S3005: Y), processing for invalid module determination is performed (S3006).

Figure 19:
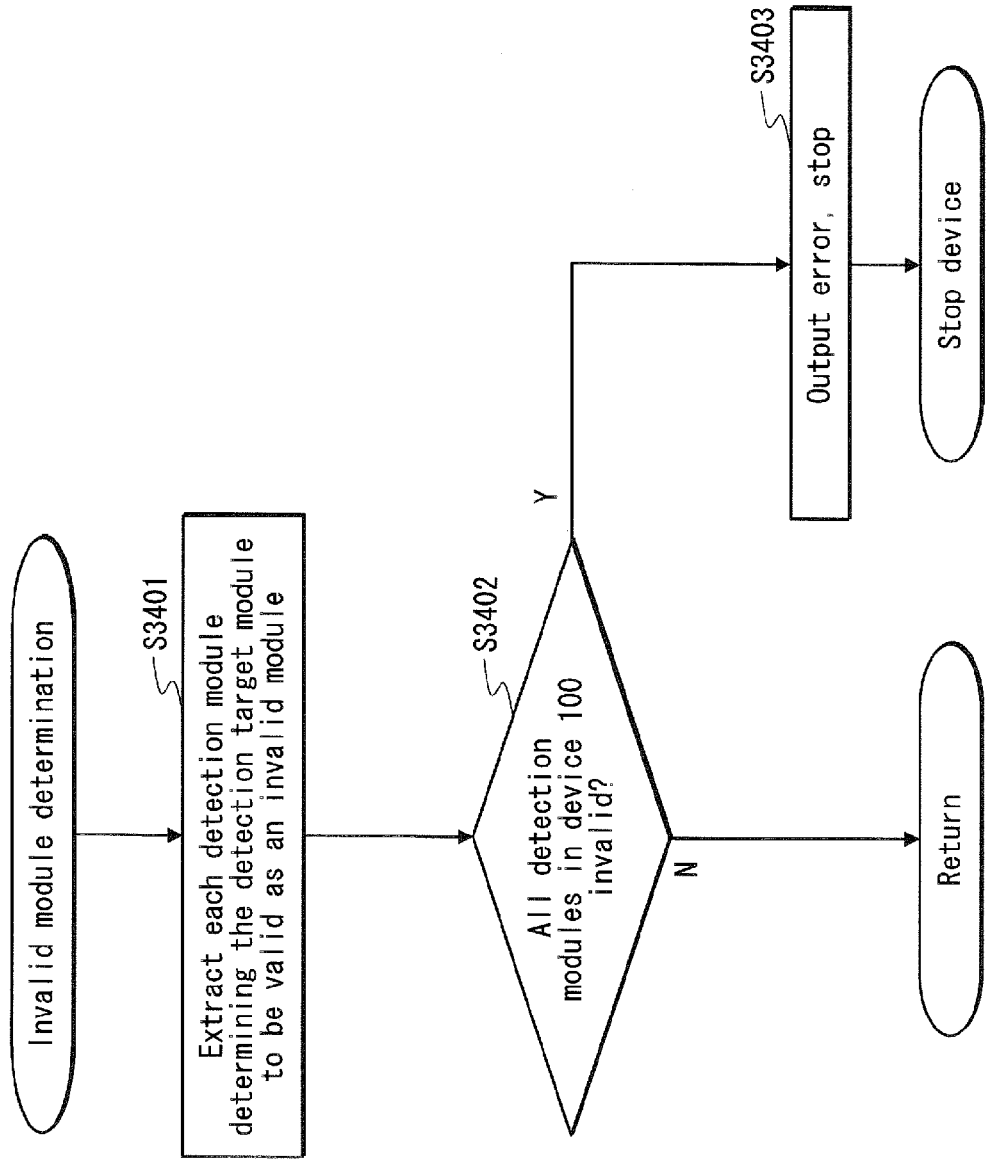
FIG. 19 is a flowchart showing invalid module determination.
Figure 23:
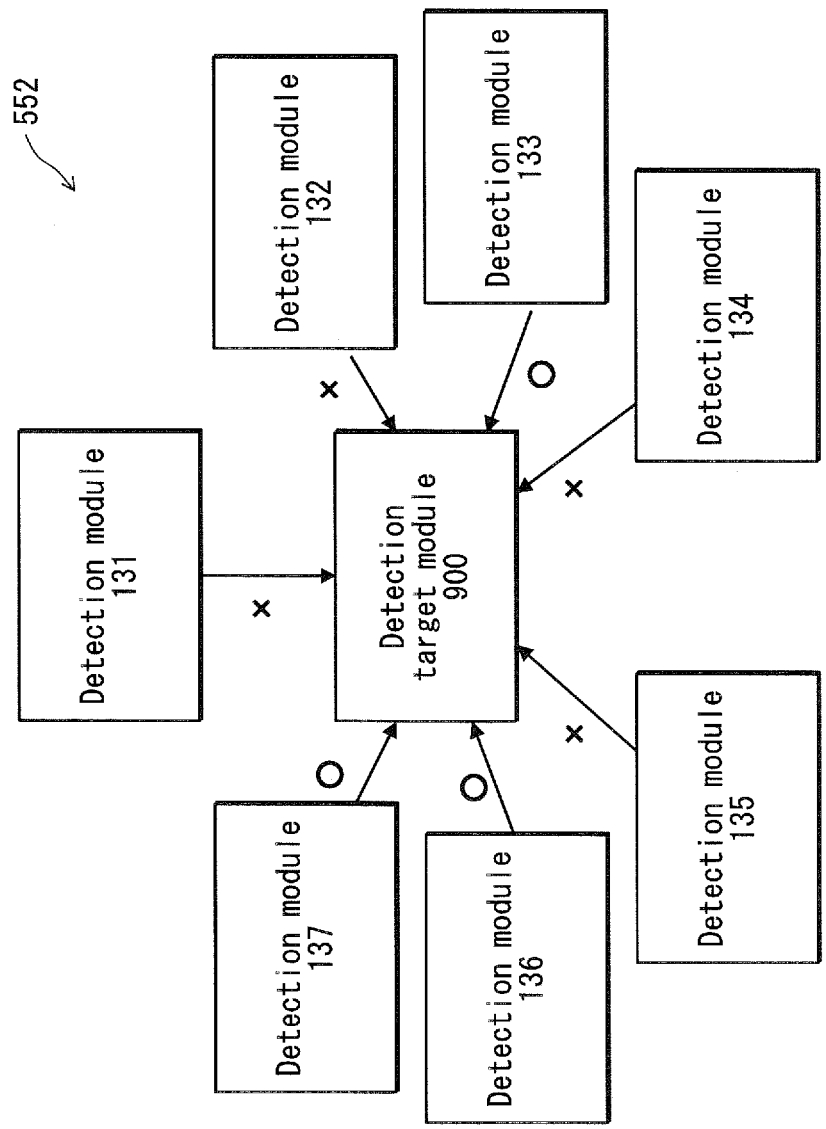
FIG. 23 illustrates an example of monitoring results by detection modules for the detection target module 900.

Specifically, as shown in FIG. 19, the determination unit 210 of the management apparatus 200 first extracts each module determining the detection target module to be valid as an invalid module (S3401). For example, as shown in FIG. 23, detection modules 133, 136, and 137 are extracted as invalid modules, since these modules determine the detection target module to be valid. Next, the determination unit 210 determines whether all of the detection modules in the device 100 are invalid modules (S3402). When determining that not all detection modules are invalid (S3402: N), the determination unit 210 terminates module identification without taking any other action. When determining that all detection modules are invalid (S3402: Y), the determination unit 210 outputs an error and terminates the device 100 (S3403).

(6) Deactivation Operations

Figure 20:
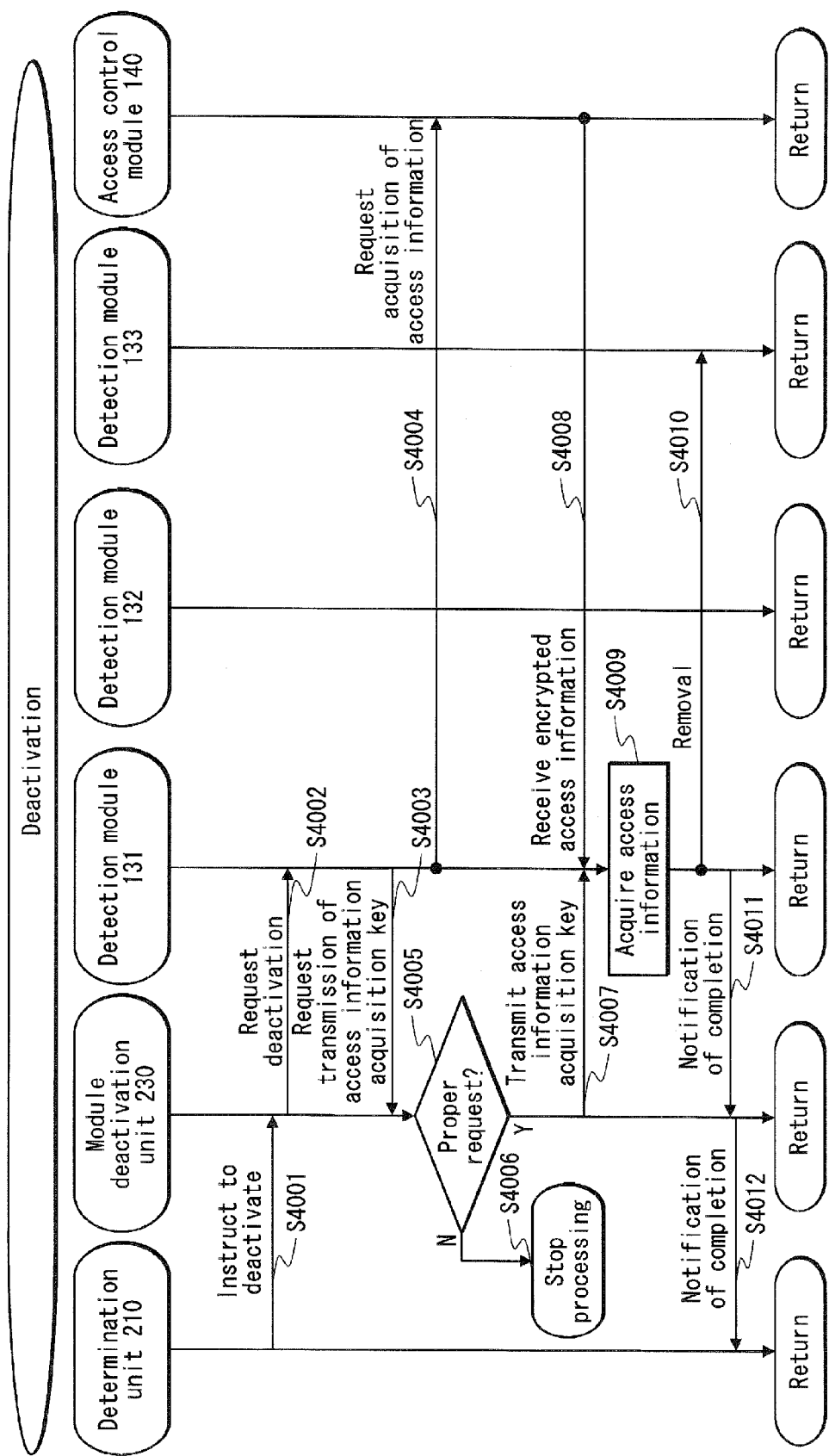
FIG. 20 is a sequence diagram showing deactivation.

Next, deactivation is described in detail with reference to the sequence diagram in FIG. 20.

Deactivation is processing to deactivate a module that has been tampered with (an invalid module) in the device 100 when a detection module that has been tampered with is detected during module identification.

Deactivation operations are described in detail for an example in which the detection module 133 has been tampered with, and the detection modules 131 and 132 have detected the tampering.

The determination unit 210 transmits the identifier for the invalid detection module extracted during module identification along with a deactivation instruction to the module deactivation unit 230 (S4001).

The module deactivation unit 230 issues a request to deactivate the detection module 133, which has been tampered with, to any one of the detection modules 131, 132, and 134 through 137 (in this example, to the detection module 131), which have been determined not to have been tampered with (S4002).

Upon receiving the request to deactivate the detection module 133 from the module deactivation unit 230, the detection module 131 requests that the module deactivation unit 230 issue an access information acquisition key for deactivating the detection module 133 (S4003). Furthermore, the detection module 131 issues a request to the access control module 140 to acquire the access information for deactivating the detection module 133 (S4004).

Upon receiving the request for issuing the access information acquisition key, the module deactivation unit 230 confirms whether the detection module 131 is a valid detection module (i.e. has not been tampered with), and whether the requested access information acquisition key is the access information acquisition key for deactivating the detection module 133, which is invalid (i.e. has been tampered with) (S4005). The module deactivation unit 230 performs this confirmation using information on the detection modules notified to the module deactivation unit 230 by the determination unit 210.

If confirmation indicates that the request is from the detection module 133, which has been tampered with, or that the acquisition request is for the access information acquisition key for detection module 131 or 132, which have not been tampered with (S4005: N), deactivation processing is terminated (S4006).

If confirmation indicates no problem (S4005: Y), the module deactivation unit 230 transmits the access information acquisition key for deactivating the detection module 133 to the requesting detection module 131 (S4007).

The detection module 131 receives the access information acquisition key from the module deactivation unit 230 and also receives encrypted access information from the access control module 140 (S4008). The detection module 131 acquires the access information from the access information acquisition key and the encrypted piece of access information (S4009). The acquired access information is a dedicated driver for removing the detection module 133. The detection module 131 removes the invalid detection module 133, which has been tampered with, using the dedicated driver (S4010).

Upon completion of deactivation, the detection module 131 deletes the access information acquisition key, the encrypted piece of access information, the access information, and the like, and transmits a notification of completion to the module deactivation unit 230 (S4011). Upon receiving the notification of completion from the detection module 131, the module deactivation unit 230 transmits the notification of completion of deactivation to the determination unit 210 (S4012).

While in step S4002 above, the detection module 131 is requested to deactivate the detection module 133 that has been tampered with, the method of selecting a valid detection module may use the results of module identification according to Embodiment 1.

1.3 Advantageous Effects of Embodiment 1

As described above, mutual monitoring by a plurality of detection modules in the detection module group 130 allows for determination of whether any detection modules have been tampered with.

Furthermore, each detection module performing tampering detection on the detection target module 900, and the determination unit 210 of the management apparatus 200 making a determination based on the results, allows for detection of an invalid detection module that has been tampered with, thus increasing reliability of the detection system. Details on these advantageous effects are described below.

As shown in FIG. 21, a verification certificate 922 for the data portion 921 of the detection target module 900 is attached to the detection target module 900. This verification certificate 922 has been tampered with and is thus an invalid certificate. Therefore, if a valid detection module performs tampering detection on the data of the detection target module 900 using the verification certificate 922, the detection module determines that the detection target module 900 is invalid (has been tampered with) since the verification certificate is invalid. It follows that if a detection module determines the detection target module 900 to be valid (i.e. not to have been tampered with), that detection module is invalid. It is thus possible for the determination unit 210 of the management apparatus 200 to extract invalid detection modules by confirming the monitoring results from each detection module for the detection target module 900. Specifically, when a monitoring result indicates that the detection target module 900 is valid, the determination unit 210 determines that the detection module that transmitted the monitoring result is invalid, thus allowing for extraction of invalid detection modules. Accordingly, the determination unit 210 is able to detect invalid detection modules, thereby increasing the reliability of the detection system.

Furthermore, deactivation of an invalid detection module in Embodiment 1 prevents unauthorized operations by the invalid detection module.

Non-Patent Literature 3 discloses technology for assessing malfunction via mutual monitoring by modules. This technology, however, restricts the number of malfunctions in the system, and therefore harbors the possibility of erroneous determination when the number of malfunctions in the system is exceeded. The detection system in Embodiment 1, which is a tampering monitoring system according to the present invention, detects an invalid detection module using the monitoring results for the detection target module 900. Therefore, determination does not depend on the number of invalid detection modules, thereby avoiding erroneous determination.

2. Embodiment 2

With reference to the drawings, the following describes Embodiment 2 of another tampering monitoring system according to the present invention.

In Embodiment 1, a detection target module is used to identify invalid detection modules. Furthermore, a detection module determined not to be invalid is used for deactivating an invalid detection module. However, even a detection module that has been determined not to be invalid may in fact be invalid and therefore may not always properly deactivate an invalid detection module. Therefore, in Embodiment 2, in addition to an invalid detection module, a valid detection module is also identified, and the identified valid detection module is used for deactivation of invalid detection modules.

2.1 Structure of Detection System 10a

Figure 24:
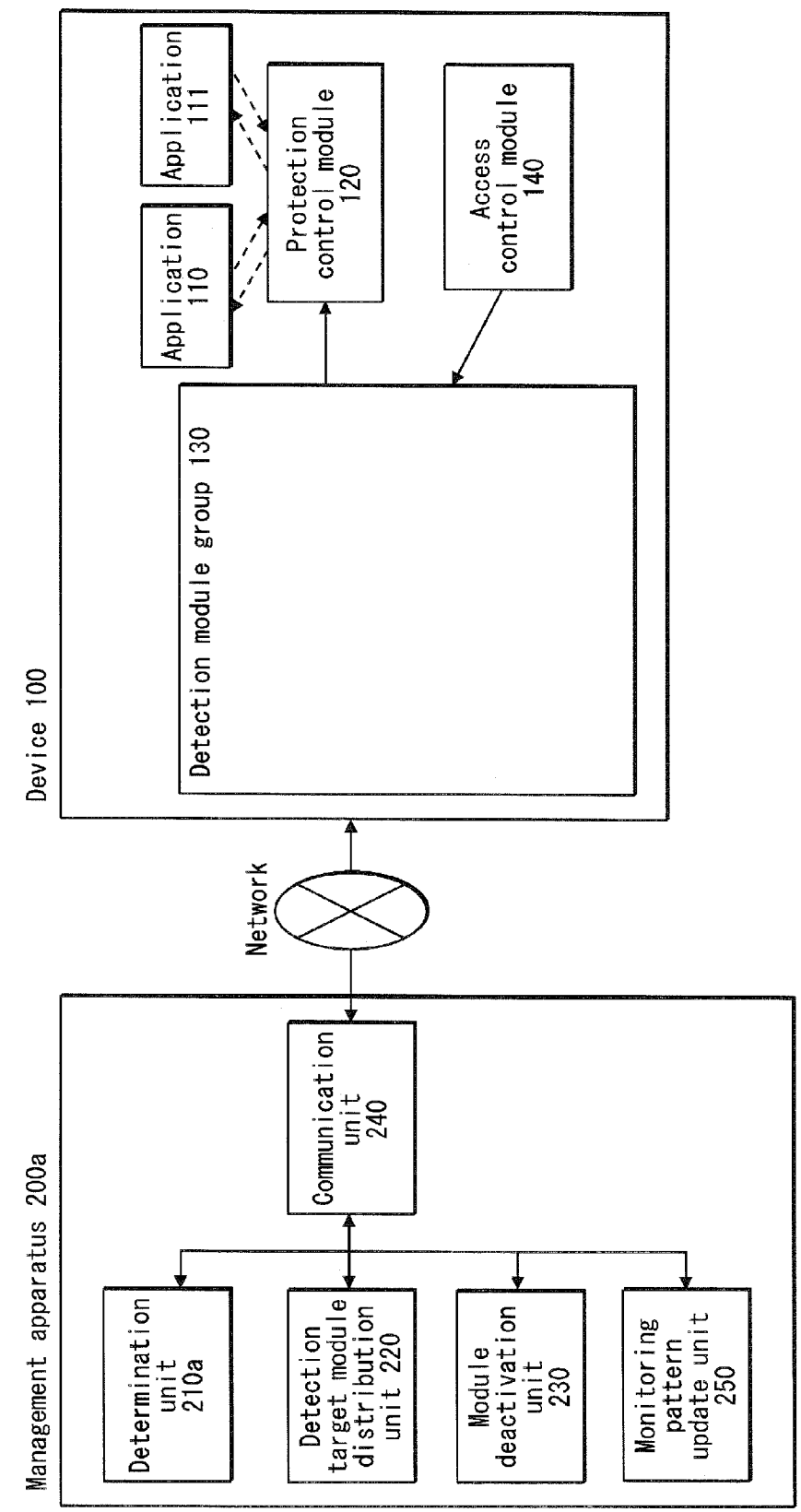
FIG. 24 is an overall structure diagram of a detection system 10*a* according to Embodiment 2.

With reference to FIG. 24, the following describes the structure of a detection system 10a according to Embodiment 2.

21

(1) Overall Structure

As shown in FIG. 24, in the detection system 10a, a device 100, which is an information processing apparatus, and a management apparatus 200a, which is a management apparatus, are connected over a network. In FIG. 24, constituent elements having similar functions as in Embodiment 1 are provided with the same reference signs as in FIG. 1, and a detailed description thereof is omitted. The following provides a detailed description of the characteristic constituent elements and processing in Embodiment 2.

The management apparatus 200a includes a determination unit 210a, a detection target module distribution unit 220a, a module deactivation unit 230, a communication unit 240, and a monitoring pattern update unit 250.

(2) Structure of Determination Unit 210a

Figure 25:
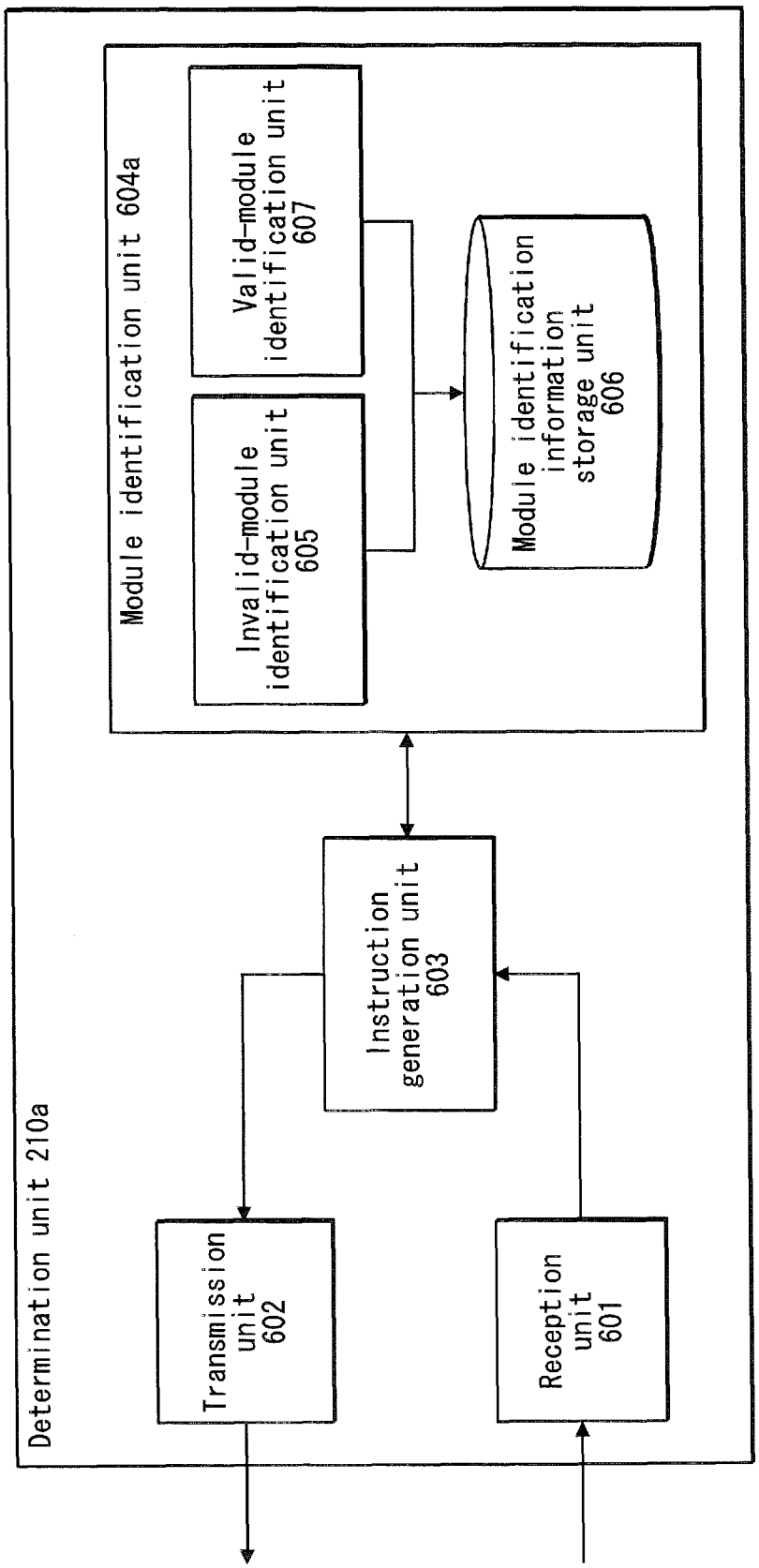
FIG. 25 is a block diagram showing the structure of a determination unit 210*a*.

FIG. 25 is a functional block diagram showing the functional structure of the determination unit 210a according to Embodiment 2.

As shown in FIG. 25, the determination unit 210a includes a reception unit 601, a transmission unit 602, an instruction generation unit 603, and a module identification unit 604a. An invalid-module identification unit 605, a valid-module identification unit 607, and a module identification information storage unit 606 are provided in the module identification unit 604a.

The differences with the determination unit 210 in Embodiment 1 are that the valid-module identification unit 607 and the module identification information storage unit 606 are provided in the module identification unit 604a.

(3) Module Identification Information Storage Unit 606

Figure 26:
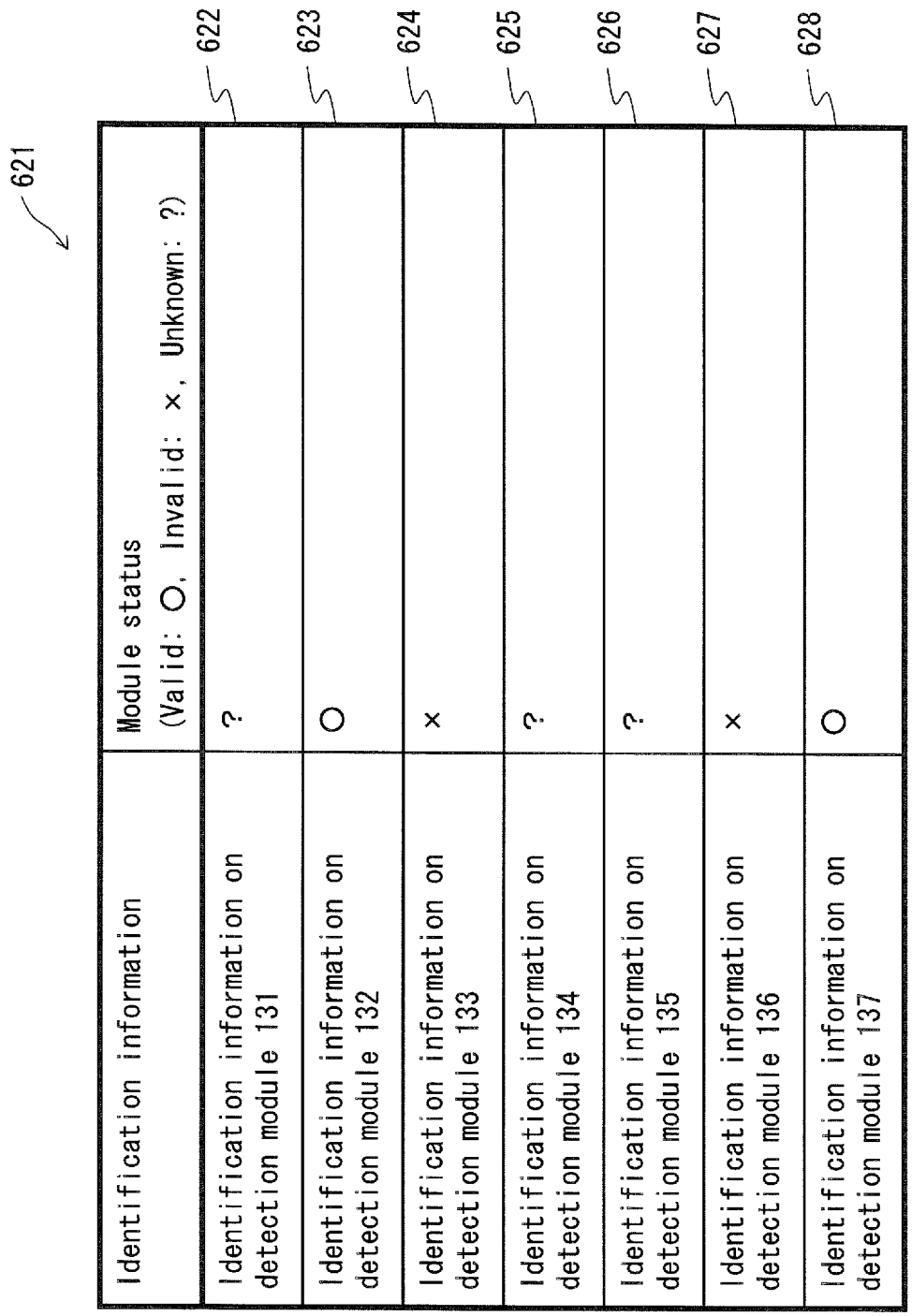
FIG. 26 illustrates an example of module identification information 621.

The module identification information storage unit 606 stores results from the invalid-module identification unit 605 and the valid-module identification unit 607 indicating invalid modules and valid modules. Specifically, as shown in FIG. 26, for example, the module identification information storage unit 606 stores a list 621 (module identification information) indicating detection module identifiers and indicating which of the modules are valid and which are invalid. In FIG. 26, detection modules 133 and 136 are identified as invalid (624, 627) and detection modules 132 and 137 as valid (623, 628), whereas the status of other detection modules is unknown (i.e. not identified as either invalid or valid) (622, 625, 626).

(4) Valid-Module Identification Unit 607

As shown below, the valid-module identification unit 607 identifies a valid detection module that has not been tampered with by referring to mutual monitoring results between detection modules in the device 100.

Figure 27:
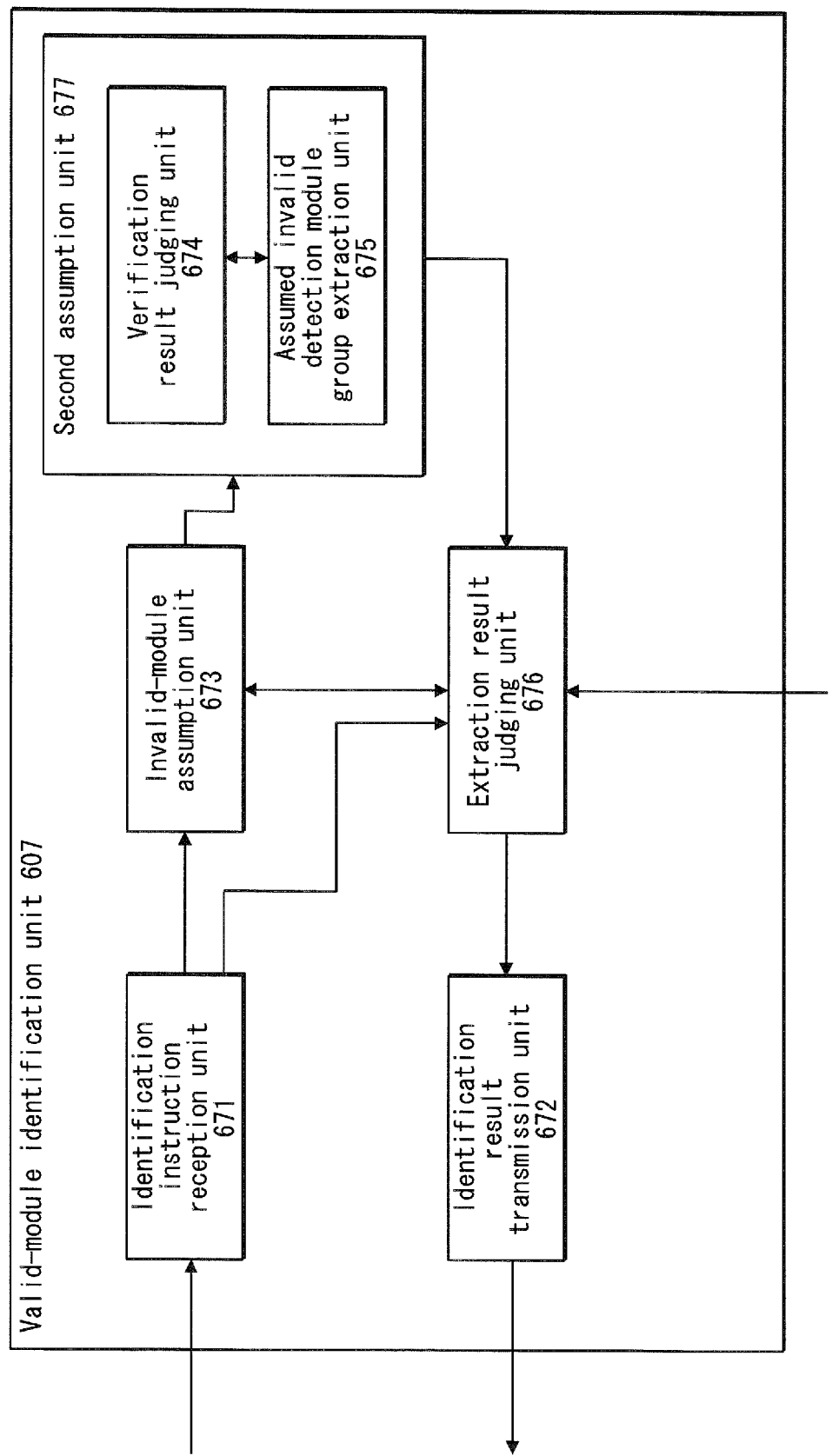
FIG. 27 is a block diagram showing the structure of a valid module identification unit 607.

As shown in FIG. 27, the valid-module identification unit 607 includes an identification instruction reception unit 671, an identification result transmission unit 672, an invalid-module assumption unit (also called a first assumption unit) 673, a verification result judging unit 674, an assumed invalid detection module group extraction unit 675, and an extraction result judging unit 676. The verification result judging unit 674 and the assumed invalid detection module group extraction unit 675 form a second assumption unit 677.

The second assumption unit 677 starts with a detection module assumed by the invalid-module assumption unit 673 to have been tampered with and, for each unprocessed detection module, consecutively performs the procedure of assuming, by referring to the received monitoring results, that a detection module determining a detection module assumed to have been tampered with to be valid has also been tampered with.

22

(a) Identification Instruction Reception Unit 671

The identification instruction reception unit 671 receives, from the instruction generation unit 603, a valid-module identification instruction, which instructs to identify a valid detection module. Upon receiving the valid-module identification instruction, the identification instruction reception unit 671 transmits the instruction to the invalid-module assumption unit 673.

The identification instruction reception unit 671 also receives a detection module list from the instruction generation unit 603. The detection module list includes identifiers for all of the detection modules in the detection module group 130 in the device 100. Next, the identification instruction reception unit 671 transmits the received detection module list to the invalid-module assumption unit 673 and the extraction result judging unit 676.

The identification instruction reception unit 671 also receives, from the device 100, monitoring results for the detection module group 130 in the device 100 via the network 5, the communication unit 240, the reception unit 601, and the instruction generation unit 603. The identification instruction reception unit 671 transmits the received monitoring results for the detection module group 130 to the invalid-module assumption unit 673 and the verification result judging unit 674.

(b) Invalid-Module Assumption Unit 673

As shown below, the invalid-module assumption unit 673 assumes that one detection module selected from among a plurality of detection modules is invalid (i.e. has been tampered with).

The invalid-module assumption unit 673 receives the detection module list from the identification instruction reception unit 671 and receives the monitoring results for the detection module group 130 in the device 100. The invalid-module assumption unit 673 also receives invalid identifiers, which are the identifiers for all of the detection modules identified as invalid and stored by the module identification information storage unit 606.

Next, the invalid-module assumption unit 673 selects, from among the identifiers for detection modules included in the detection module list, one identifier for a detection module other than the received invalid identifiers and assumes that the detection module indicated by the selected identifier is an invalid detection module. The selected identifier is referred to as an assumed identifier. The invalid-module assumption unit 673 creates an empty assumed invalid detection module group and then includes the assumed identifier in the assumed invalid detection module group. At this point, the assumed invalid detection module group includes only the assumed identifier identifying the selected detection module. The invalid-module assumption unit 673 thus generates the assumed invalid detection module group to include the assumed identifier.

Next, the invalid-module assumption unit 673 transmits the assumed identifier of the selected detection module to the extraction result judging unit 676 and transmits structural information on the assumed invalid detection module group to the verification result judging unit 674. The structural information on the assumed invalid detection module group is formed of all of the identifiers included in the assumed invalid detection module group.

The invalid-module assumption unit 673 also receives, from the extraction result judging unit 676, a notification of the impossibility of identification, indicating that a valid detection module cannot be identified. When receiving the notification of the impossibility of identification, the invalid-module assumption unit 673 selects the identifier of a detection module from among the identifiers of detection modules included in the detection module list other than the selected detection module and other than the detection modules indicated by the received invalid identifiers. The invalid-module assumption unit 673 then assumes that the selected detection module is invalid and includes only the assumed identifier identifying the selected detection module in the assumed invalid detection module group, transferring the structural information on the assumed invalid detection module group to the verification result judging unit 674.

(c) Second Assumption Unit 677

As described above, the second assumption unit 677 includes the verification result judging unit 674 and the assumed invalid detection module group extraction unit 675.

As described below, the second assumption unit 677 starts with a detection module assumed by the invalid-module assumption unit 673 to have been tampered with and, for each unprocessed detection module, consecutively performs the procedure of assuming, by referring to the received monitoring results, that a detection module determining a detection module assumed to have been tampered with to be valid has also been tampered with.

Briefly, operations are as follows. The second assumption unit 677 determines whether a detection module determining a detection module identified by an identifier included in the assumed invalid detection module group to be valid exists by referring to the monitoring results. When such a detection module exists, the second assumption unit 677 adds the identifier identifying the detection module to the assumed invalid detection module group. The second assumption unit 677 repeatedly performs this determination and addition for each unprocessed detection module.

(i) Verification Result Judging Unit 674

The verification result judging unit 674 receives the monitoring results for the detection module group 130 in the device 100 from the identification instruction reception unit 671. The verification result judging unit 674 also receives the assumed invalid structural information from the invalid-module assumption unit 673.

The verification result judging unit 674 judges the verification results for the detection modules in the assumed invalid detection module group by referring to the monitoring results for the detection module group 130 in the device 100, received from the identification instruction reception unit 671, and the structural information on the assumed invalid detection module group received from the invalid-module assumption unit 673.

The judgment method used by the verification result judging unit 674 is now described with reference to FIG. 28.

Figure 28:
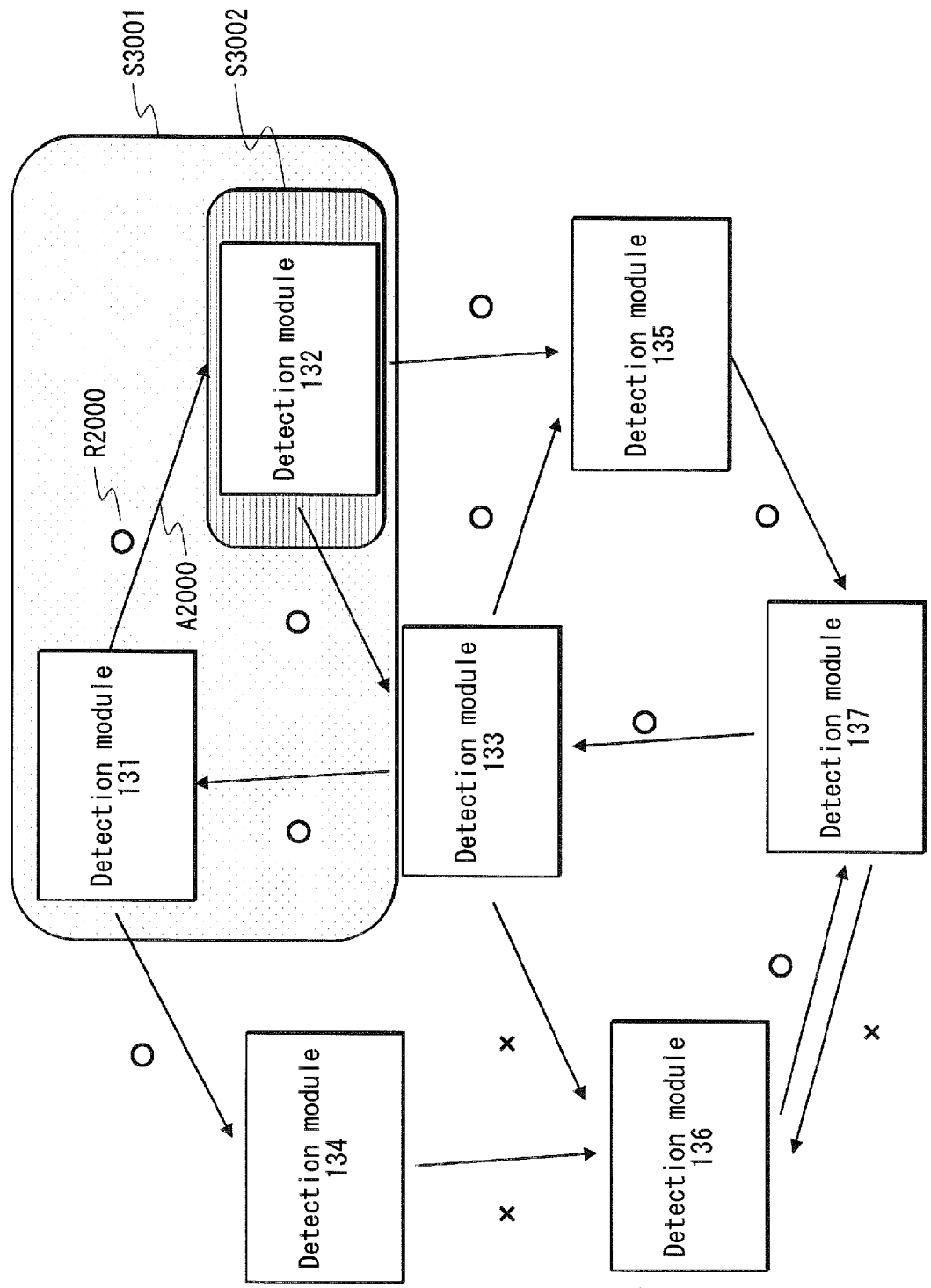
FIG. 28 illustrates valid module identification.

As shown in FIG. 28, suppose the detection module 131 monitors the detection module 132 (A2000), and as also shown in FIG. 28, suppose the monitoring result by the detection module 131 for the detection module 132 is valid (R2000). Furthermore, suppose that the detection module 132 is included in the assumed invalid detection module group 3002.

At this point, the verification result judging unit 674 searches, by referring to the received monitoring results, for a detection module that determines that the detection module 132 included in the assumed invalid detection module group 3002 is valid. In the example shown in FIG. 28, the detection module 131 determines that the detection module 132 is valid (R2000). Therefore, the verification result judging unit 674 assumes that the detection module 131, which determines the detection module 132 to be valid, is an invalid detection module.

As described below, the detection module 131 is added to the assumed invalid detection module group as an assumed invalid detection module. As a result, the detection modules 132 and 131 are included in a new assumed invalid detection module group 3001.

The verification result judging unit 674 transmits, as the results of monitoring of detection modules in the assumed invalid detection module group, each identifier identifying a detection module yielding a determination of valid (hereinafter referred to as "assumed invalid identifiers") and the received structural information on the assumed invalid detection module group to the assumed invalid detection module group extraction unit 675. When, as the result of monitoring of detection modules in the assumed invalid detection module group, no detection module is determined to be valid, the assumed invalid detection module group extraction unit 675 is notified accordingly. Similar operations are performed when receiving the structural information on the assumed invalid detection module group from the assumed invalid detection module group extraction unit 675.

(ii) Assumed Invalid Detection Module Group Extraction Unit 675

The assumed invalid detection module group extraction unit 675 receives from the verification result judging unit 674, as the result of monitoring of detection modules in the assumed invalid detection module group, identifiers for detection modules yielding a determination of valid (assumed invalid identifiers) and the structural information on the assumed invalid detection module group. Next, the assumed invalid detection module group extraction unit 675 adds the received detection module identifiers (assumed invalid identifiers) to the assumed invalid detection module group.

In the example in FIG. 28, the detection module 131 is added to the assumed invalid detection module group as an assumed invalid detection module. As a result, the detection modules 132 and 131 are included in a new assumed invalid detection module group 3001.

Next, the assumed invalid detection module group extraction unit 675 transmits the new structural information on the assumed invalid detection module group with the identifiers added thereto to the verification result judging unit 674. When receiving notification from the verification result judging unit 674 that no detection modules exist, the assumed invalid detection module group extraction unit 675 transmits the structural information on the assumed invalid detection module group to the extraction result judging unit 676.

(f) Extraction Result Judging Unit 676

The extraction result judging unit 676 receives the detection module list from the identification instruction reception unit 671. The extraction result judging unit 676 also receives the structural information on the assumed invalid detection module group and the assumed identifiers from the assumed invalid detection module group extraction unit 675. Furthermore, the extraction result judging unit 676 receives invalid identifiers identifying invalid detection modules from the module identification information storage unit 606.

Next, the extraction result judging unit 676 determines whether all of the detection modules other than the detection modules corresponding to the invalid identifiers stored in the module identification information storage unit 606 are included in the assumed invalid detection module group by referring to the structural information on the assumed invalid detection module group and to the invalid identifiers identifying invalid detection modules.

When no invalid detection module is indicated by the identifiers stored in the module identification information storage unit 606, the extraction result judging unit 676 judges whether all of the detection modules are included in the assumed invalid detection module group. Furthermore, even when no invalid detection modules are detected, the extraction result judging unit 676 determines whether all of the detection modules are included in the assumed invalid detection module group. In other words, the extraction result judging unit 676 judges whether all of the detection modules have been assumed to have been tampered with. This is equivalent to saying that the extraction result judging unit 676 judges whether the identifiers identifying all of the detection modules are included in the assumed invalid detection module group.

That is, the extraction result judging unit 676 removes, from the identifiers included in the detection module list, first the invalid identifiers and then identifiers included in the structural information on the assumed invalid detection module group, judging whether, as a result, the detection module list becomes an empty set, or whether the detection module list still includes any identifiers.

When no invalid detection module exists, the extraction result judging unit 676 removes identifiers included in the assumed invalid structural information from the identifiers included in the detection module list, judging whether, as a result, the detection module list becomes an empty set, or whether the detection module list still includes any identifiers. Furthermore, even when no invalid detection module is detected, the extraction result judging unit 676 removes identifiers included in the assumed invalid structural information from the identifiers included in the detection module list, judging whether, as a result, the detection module list becomes an empty set, or whether the detection module list still includes any identifiers.

When all of the detection modules other than the detection modules corresponding to invalid identifiers stored by the module identification information storage unit 606 are included in the assumed invalid detection module group, the extraction result judging unit 676 identifies the detection module assumed to be invalid by the invalid-module assumption unit 673 as a valid detection module, treats the received assumed identifier as an identifier of a valid module, and transmits this valid module identifier to the identification result transmission unit 672 as the result of identification.

When not all of the detection modules are included in the assumed invalid detection module group, the extraction result judging unit 676 transmits an instruction (a notification of the impossibility of identification of a valid detection module) to the invalid-module assumption unit 673 to assume that a detection module other than the previously assumed detection module is invalid.

(e) Identification Result Transmission Unit 672

The identification result transmission unit 672 receives the identification result of a valid detection module from the extraction result judging unit 676 and transmits the received identification result to the instruction generation unit 603.

The identification result transmission unit 672 also transmits a valid result indicating that all of the latest monitoring results are valid to the instruction generation unit 603. Additionally, the identification result transmission unit 672 transmits a result indicating that not all of the latest monitoring results are valid (i.e., when at least one result indicates an invalid module), or that not all of the previous monitoring results are valid (i.e., when at least one result indicates an invalid module) to the instruction generation unit 603.

(5) Structure of Monitoring Pattern Update Unit 250

When the monitoring patterns of the detection module group 130 in the device 100 are to be updated, the determination unit 210*a* issues an instruction for updating of the monitoring pattern. In response to the instruction, the monitoring pattern update unit 250 generates new monitoring patterns in order to update the monitoring pattern of each detection module in the detection module group 130 and transmits the generated monitoring patterns to the detection modules.

Figure 29:
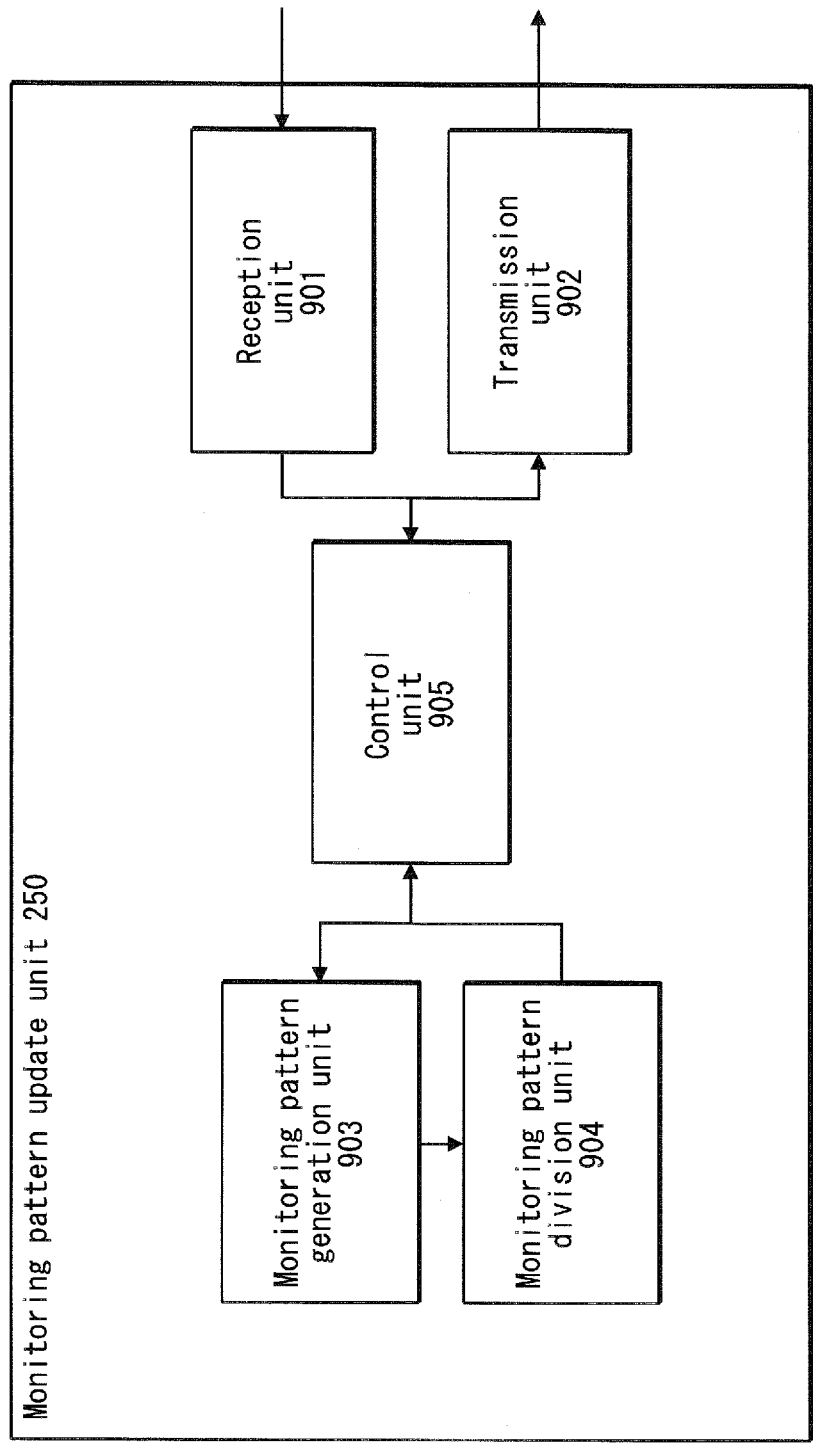
FIG. 29 is a block diagram showing the structure of a monitoring pattern update unit 250.

As shown in FIG. 29, the monitoring pattern update unit 250 includes a reception unit 901, a transmission unit 902, a monitoring pattern generation unit 903, a monitoring pattern division unit 904, and a control unit 905.

(a) Reception Unit 901

The reception unit 901 receives, from the determination unit 210*a*, a generation instruction indicating generation of monitoring patterns and a detection module list at the time of the instruction. The detection module list includes identifiers for all of the detection modules in the detection module group 130 of the device 100*a*.

The reception unit 901 transmits the received monitoring pattern generation instruction to the control unit 905. The reception unit 901 also transmits the received detection module list to the monitoring pattern generation unit 903 via the control unit 905.

(b) Monitoring Pattern Generation Unit 903

The monitoring pattern generation unit 903 receives the detection module list from the reception unit 901 via the control unit 905.

Upon receiving the detection module list, the monitoring pattern generation unit 903 refers to the received detection module list to determine which detection module will monitor which detection module, thereby generating an overall monitoring pattern for the detection module group 130 in the device 100.

Note that the monitoring pattern generation unit 903 may select an overall monitoring pattern in which, for example, all of the detection modules monitor all of the other detection modules.

The monitoring pattern generation unit 903 transmits the generated overall monitoring pattern to the monitoring pattern division unit 904.

(c) Monitoring Pattern Division Unit 904

The monitoring pattern division unit 904 receives the overall monitoring pattern from the monitoring pattern generation unit 903.

Upon receiving the overall monitoring pattern, the monitoring pattern division unit 904 divides the received overall monitoring pattern into a monitoring pattern for each detection module. Next, the monitoring pattern division unit 904 transmits the updated detection module monitoring patterns thus produced by division to the detection modules in the device 100 via the control unit 905, the transmission unit 902, the communication unit 240, and the network.

(d) Transmission Unit 902

The transmission unit 902 transmits the updated monitoring pattern for each detection module to the device 100 via the communication unit 240 and the network 5. The transmission unit 902 also notifies the determination unit 210*a* of completion of generation of the updated monitoring patterns and of completion of transmission.

(d) Control Unit 905

The control unit 905 receives the monitoring pattern generation instruction from the reception unit 901.

Upon receiving the monitoring pattern generation instruction, the control unit 905 causes the monitoring pattern generation unit 903 and the monitoring pattern division unit 904 to update the monitoring patterns in the device 100 by generating an overall monitoring pattern for the detection module group 130 in the device 100, generating an updated monitoring pattern for each detection module, and transmitting the updated detection module monitoring patterns to the device 100.

2.2 Operations of Detection System 10a

Next, the operations of the detection system 10a are described.

(1) Overall Operations

Figure 30:
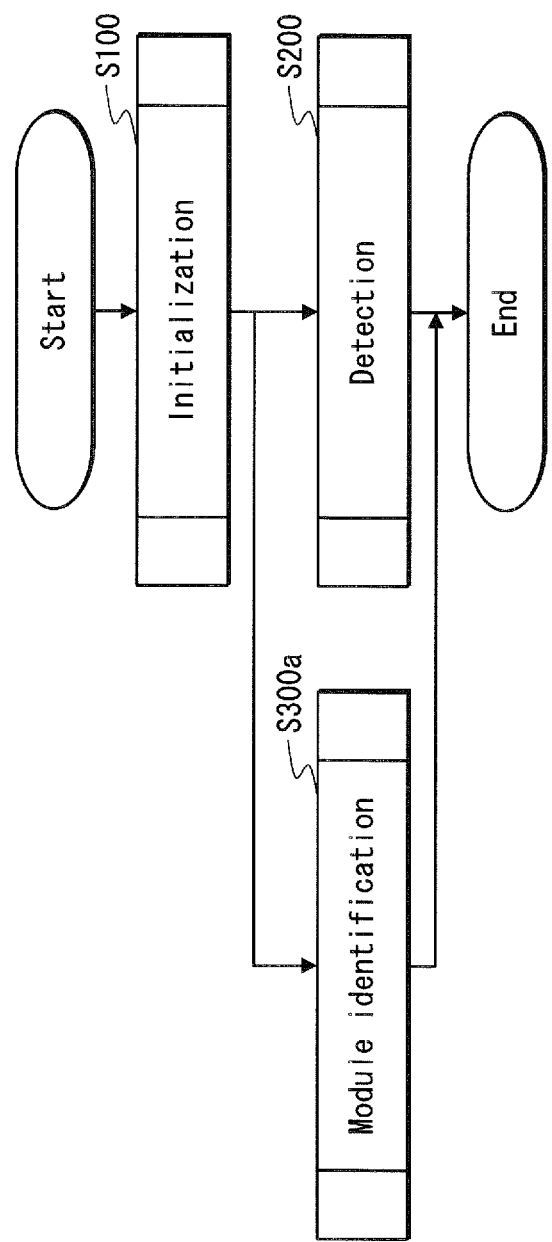
FIG. 30 is a flowchart showing overall operations of the detection system 10*a*.

FIG. 30 is a flowchart showing the overall flow of processing in the detection system 10a. In FIG. 30, processes having a similar function as in Embodiment 1 are provided with the same reference signs as in FIG. 11, and a detailed description thereof is omitted. The difference with the overall processes of the detection system 10 is that the module identification in S300 is replaced with module identification in S300a. Other processes are the same, and therefore the following is a detailed description of the module identification in S300a.

(2) Operations for Module Identification

Figure 31:
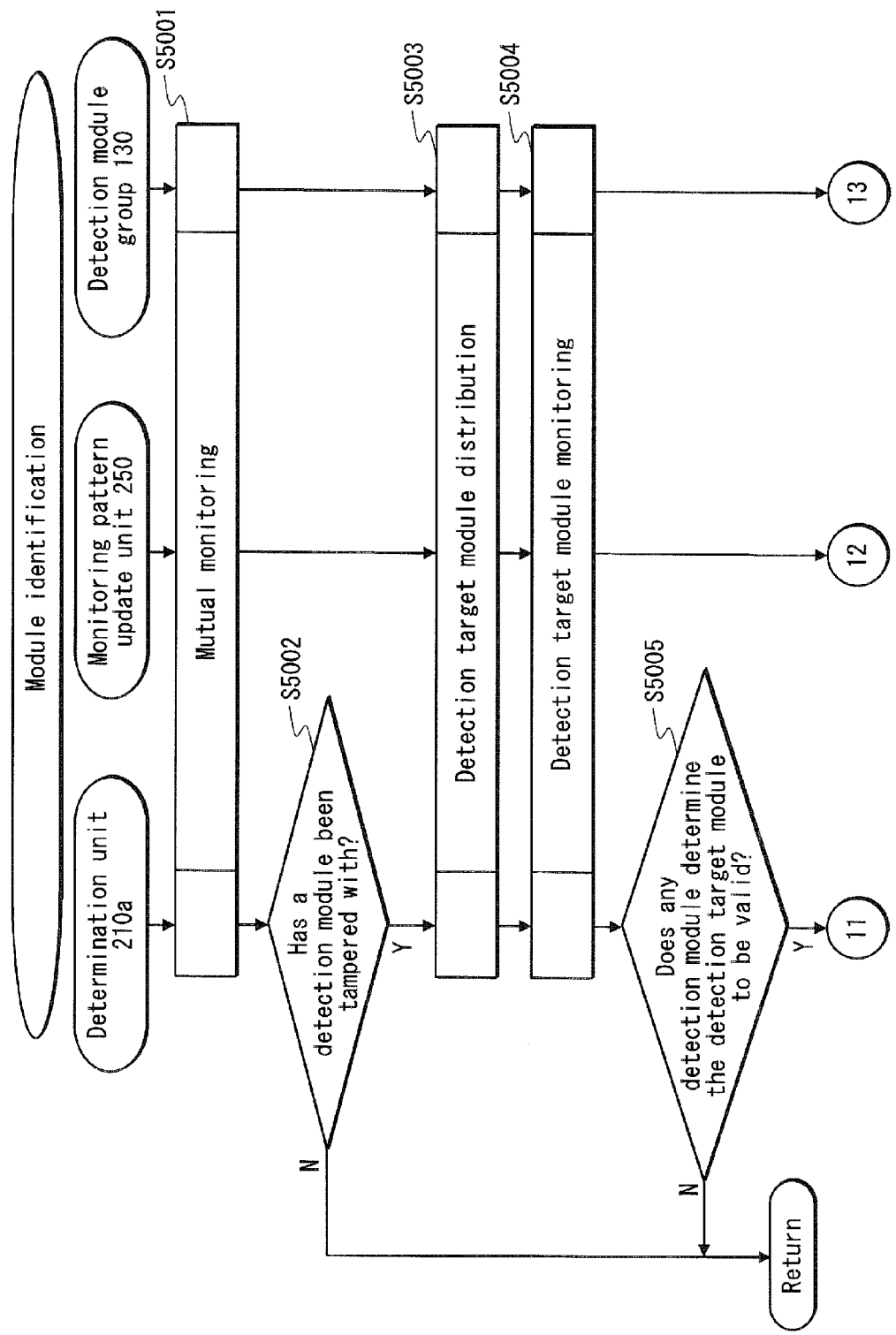
FIG. 31 is a sequence diagram showing module identification and is continued in FIG. 32.
Figure 32:
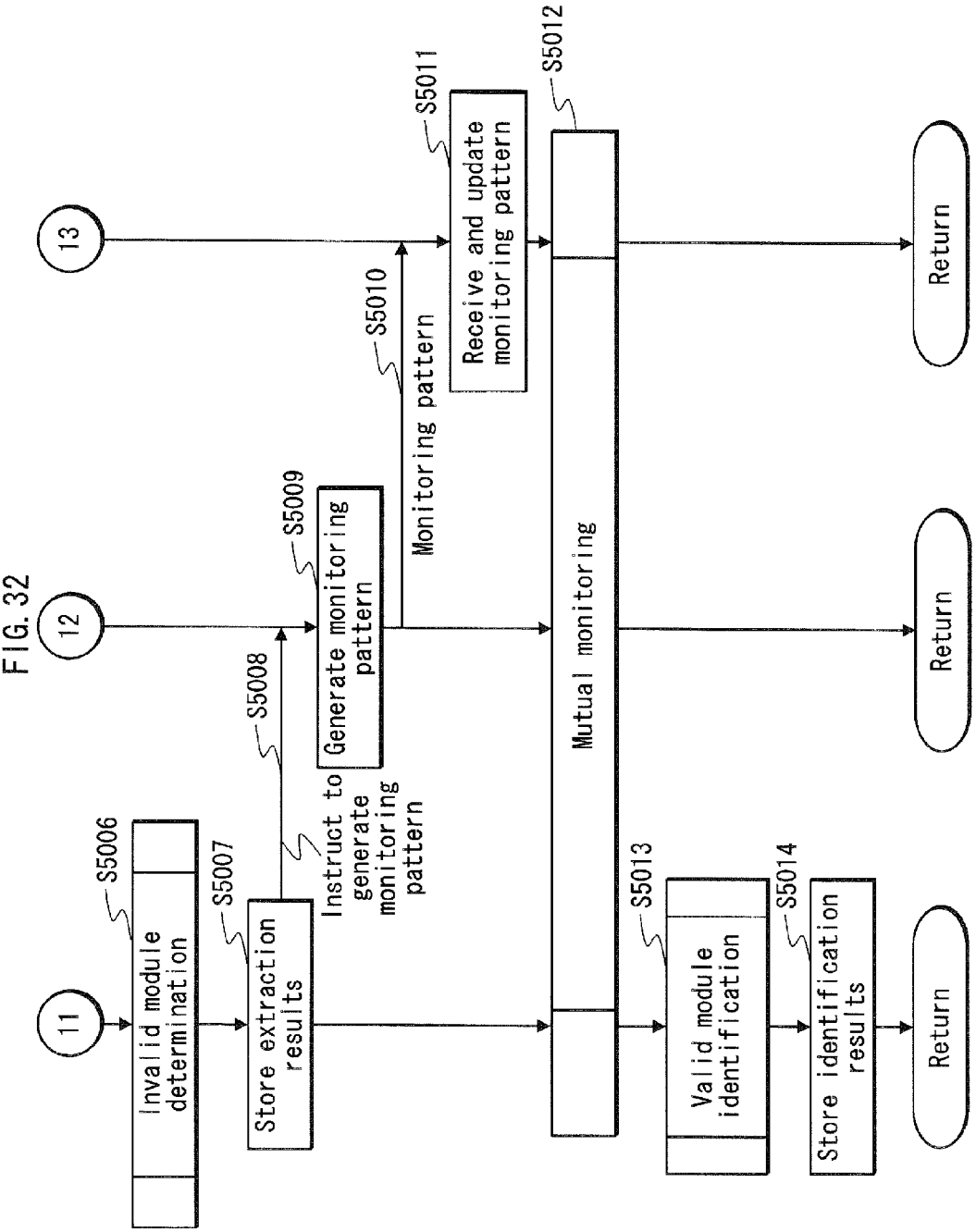
FIG. 32 is a sequence diagram showing module identification and is continued from FIG. 31.

Module identification (S300a in FIG. 30) is described in detail with reference to the sequence diagrams in FIGS. 31 and 32. Note that FIGS. 31 and 32 represent processing performed individually by the detection modules 131, 132, . . . , and 137 collectively as being performed by the detection module group 130.

The detection module group 130 and the determination unit 210a perform mutual monitoring whereby the detection modules perform tampering detection on each other (S5001). As this mutual monitoring is the same as the mutual monitoring in Embodiment 1 (FIG. 16), a description thereof is omitted.

In accordance with the detection results received from the detection modules, the determination unit 210a of the management apparatus 200a determines whether any detection modules have been tampered with (S5002). Specifically, when receiving a detection result, the determination unit 210a determines that a detection module has been tampered with. When determining that no detection module has been tampered with (S5002: N), the determination unit 210a terminates module identification without taking any other action. If it is determined that a detection module has been tampered with (S5002: Y), the detection target module 900 is distributed via detection target module distribution processing (S5003). As this detection target module distribution is the same as the detection target module distribution in Embodiment 1 (FIG. 17), a description thereof is omitted.

Next, each detection module performs detection target module monitoring by performing tampering detection on the detection target module 900 installed in the device 100 (S5004). As this detection target module monitoring is the same as the detection target module monitoring in Embodiment 1 (FIG. 18), a description thereof is omitted.

Based on the results of detection target module monitoring, the determination unit 210a determines whether any detection module determines the detection target module to be valid (S5005). When determining that no detection module has determined the detection target module to be valid (S5005: N), the determination unit 210a terminates module identification without taking any other action. If it is determined that a detection module has determined the detection target module to be valid (S5005: Y), processing for invalid module determination is performed (S5006). As this invalid module determination is the same as the invalid module determination in Embodiment 1 (FIG. 19), a description thereof is omitted.

The determination unit 210a stores the identifier for each invalid module extracted by invalid module determination in the module identification information storage unit 606 (S5007). Furthermore, the determination unit 210a transmits a monitoring pattern generation instruction to the monitoring pattern update unit 250 (S5008).

The monitoring pattern update unit 250 generates monitoring patterns in response to the monitoring pattern generation instruction (S5009) and transmits the generated monitoring patterns to the detection modules in the detection module group 130 (S5010).

Each detection module in the detection module group 130 receives a monitoring pattern and updates its own detection module monitoring pattern (S5011).

The detection module group 130 and the determination unit 210a perform mutual monitoring (S5012).

The determination unit 210a performs valid module identification (S5013). Valid module identification is described in detail below.

The determination unit 210a stores the identifier for each valid module identified by valid module identification in the module identification information storage unit 606 (S5014).

(2) Operations for Valid Module Identification

Figure 33:
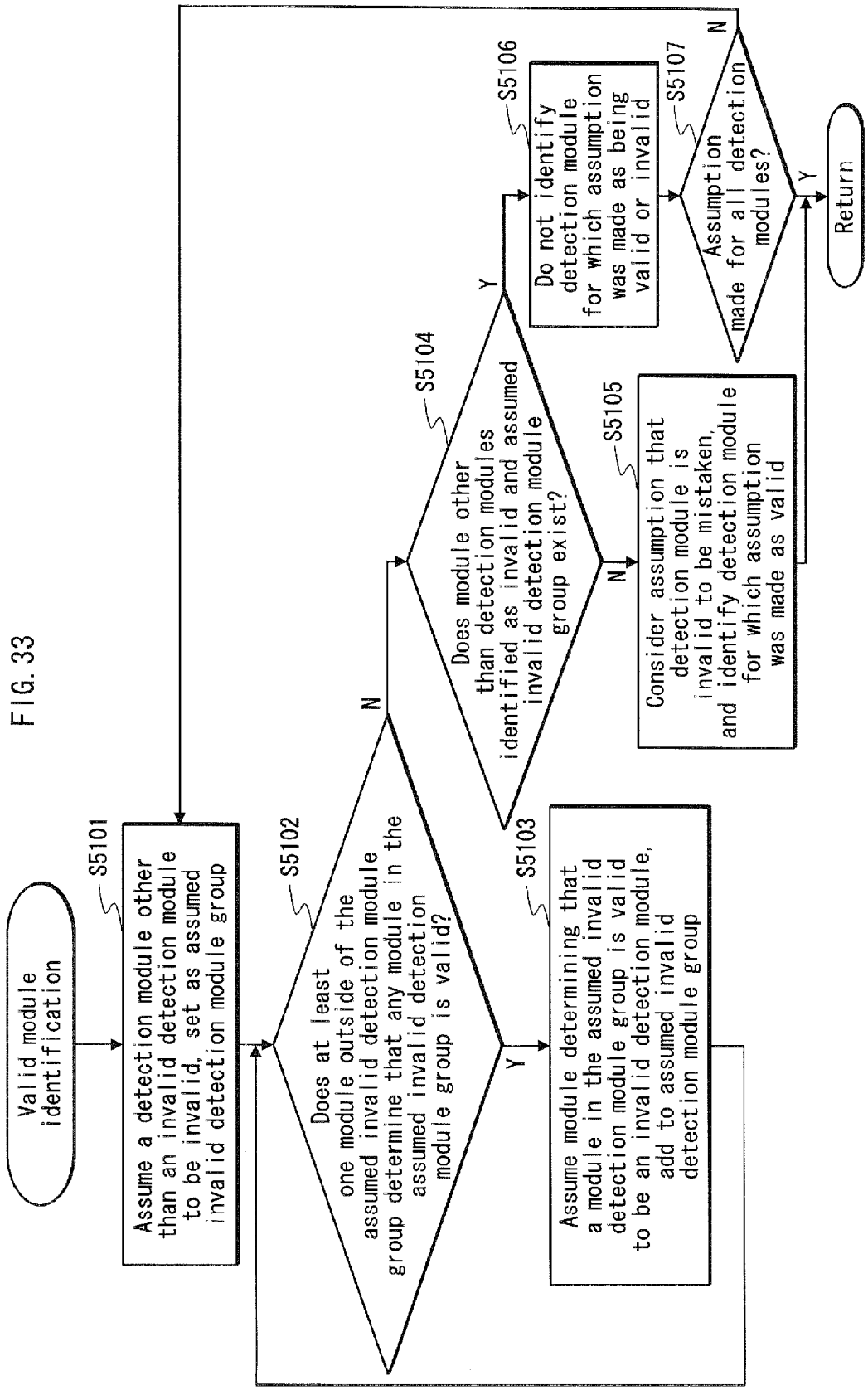
FIG. 33 is a flowchart showing valid module identification.

Operations for identification of a valid detection module in the detection system 10a are described with reference to the flowchart in FIG. 33.

The invalid-module assumption unit 673 selects a detection module other than an invalid detection module having an identifier of the invalid detection modules stored in the module identification information storage unit 606, assumes the selected detection module to be an invalid detection module, and sets an assumed invalid detection module group to include only the identifier of this detection module that is assumed to be invalid (step S5101).

The verification result judging unit 674 determines whether at least one detection module outside of the assumed invalid detection module group determines that any detection module identified by the identifiers included in the assumed invalid detection module group is valid (S5102). When even one detection module outside of the assumed invalid detection module group determines that a module in the assumed invalid detection module group is valid (S5012: Y), the assumed invalid detection module group extraction unit 675 includes the identifier of this detection module in the assumed invalid detection module group (S5103). Next, control proceeds to step S5102. When not even one detection module outside of the assumed invalid detection module group determines that a detection module in the assumed invalid detection module group is valid (S5102: N), it is determined whether a detection module other than invalid detection modules, whose identifiers stored in the module identification information storage unit 606 indicate invalidity, and other than the detection modules in the assumed invalid detection module group exists (S5104). When no detection module exists (S5104: N), the detection module assumed to be invalid in step S5101 is identified as a valid detection module (S5105). When a valid detection module is thus identified, all of the above assumptions that a detection module is invalid are subsequently revoked, and the identifiers included in the assumed invalid detection module group are removed.

When a detection module exists (S5104: Y), the detection module assumed to be invalid in step S5101 is not identified as a valid detection module (S5106). In step S5101, when not all invalid modules, whose identifiers stored in the module identification information storage unit 606 indicate invalidity, have been selected (step S5107: N), processing proceeds to step S5101. When all of the detection modules have been assumed to be invalid (S5107: Y), valid module identification terminates.

2.3 Example of Module Identification

2.3.1 First Example(Illustrating Success of Valid Module Identification)

The following describes an example of module identification with reference to FIGS. 22, 23, and 34-37 and to the flowcharts in FIGS. 31 and 32.

(a) Mutual Monitoring

Figure 34:
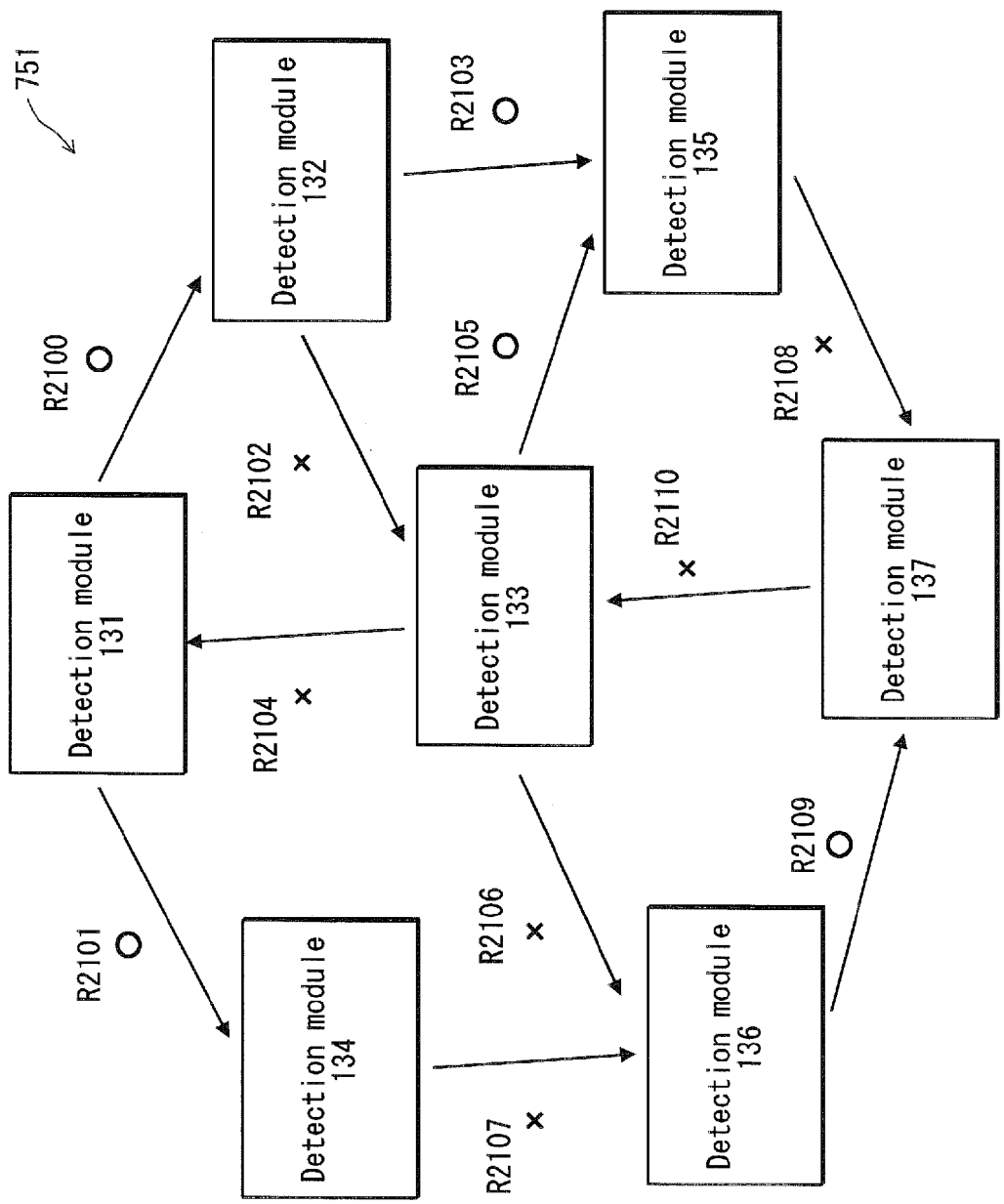
FIG. 34 illustrates an example of mutual monitoring.

FIG. 34 shows an example of mutual monitoring results 751 received by the determination unit 210a as a result of mutual monitoring in step S5001. In the example shown in FIG. 34, the detection module 132 determines that the detection module 133 is invalid. Therefore, it is determined in step S5002 that a detection module has been tampered with, and processing proceeds to step S5003.

(b) Detection Target Module Monitoring

Processing for detection target module distribution is performed in step S5003, and subsequently, processing for detection target module monitoring is performed in step S5004. FIG. 22 shows a monitoring pattern 551 for tampering detection (monitoring) of the detection target module. FIG. 23 shows the ensuing tampering detection results 552. In the example shown in FIG. 23, the detection modules 133, 136, and 137 determine that the detection target module 900 is valid. Therefore, it is determined in step S5005 that a detection module determining the detection target module to be valid exists, and processing proceeds to step S5006.

(c) Invalid Module Determination

Figure 35:
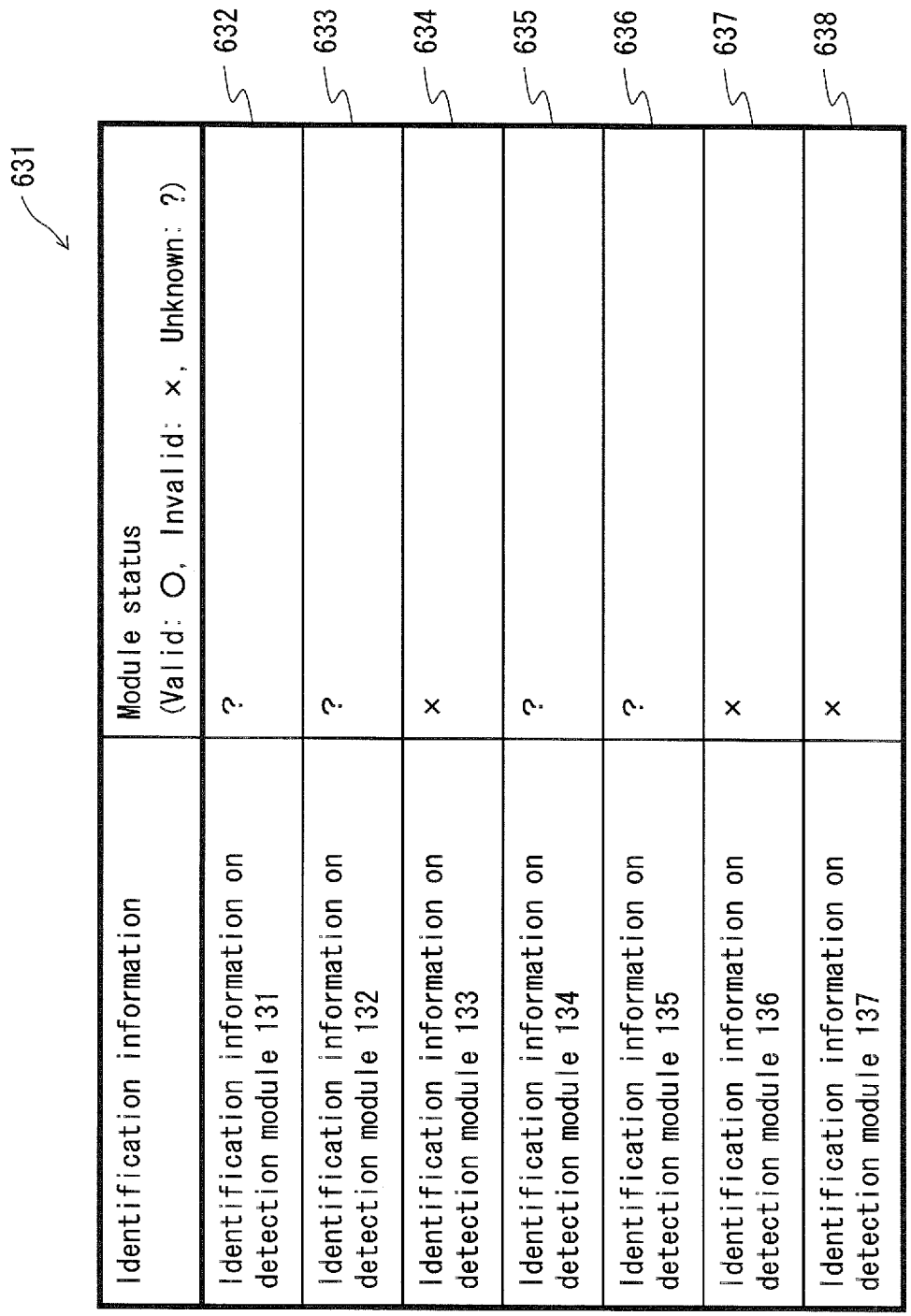
FIG. 35 illustrates an example of module identification information 631.

In step S5006, based on the tampering detection results of FIG. 23, the detection modules 133, 136, and 137 are extracted as invalid modules. In step S5007, the results of extraction are stored in the module identification information storage unit 606. FIG. 35 shows module identification information 631 stored in the module identification information storage unit 606 immediately after storage of the results. This module identification information 631 indicates that the detection modules 133, 136, and 137 are invalid (634, 637, 638), and that other detection modules are unknown (632, 633, 635, 636).

(d) Updating of Monitoring Patterns

Figure 36:
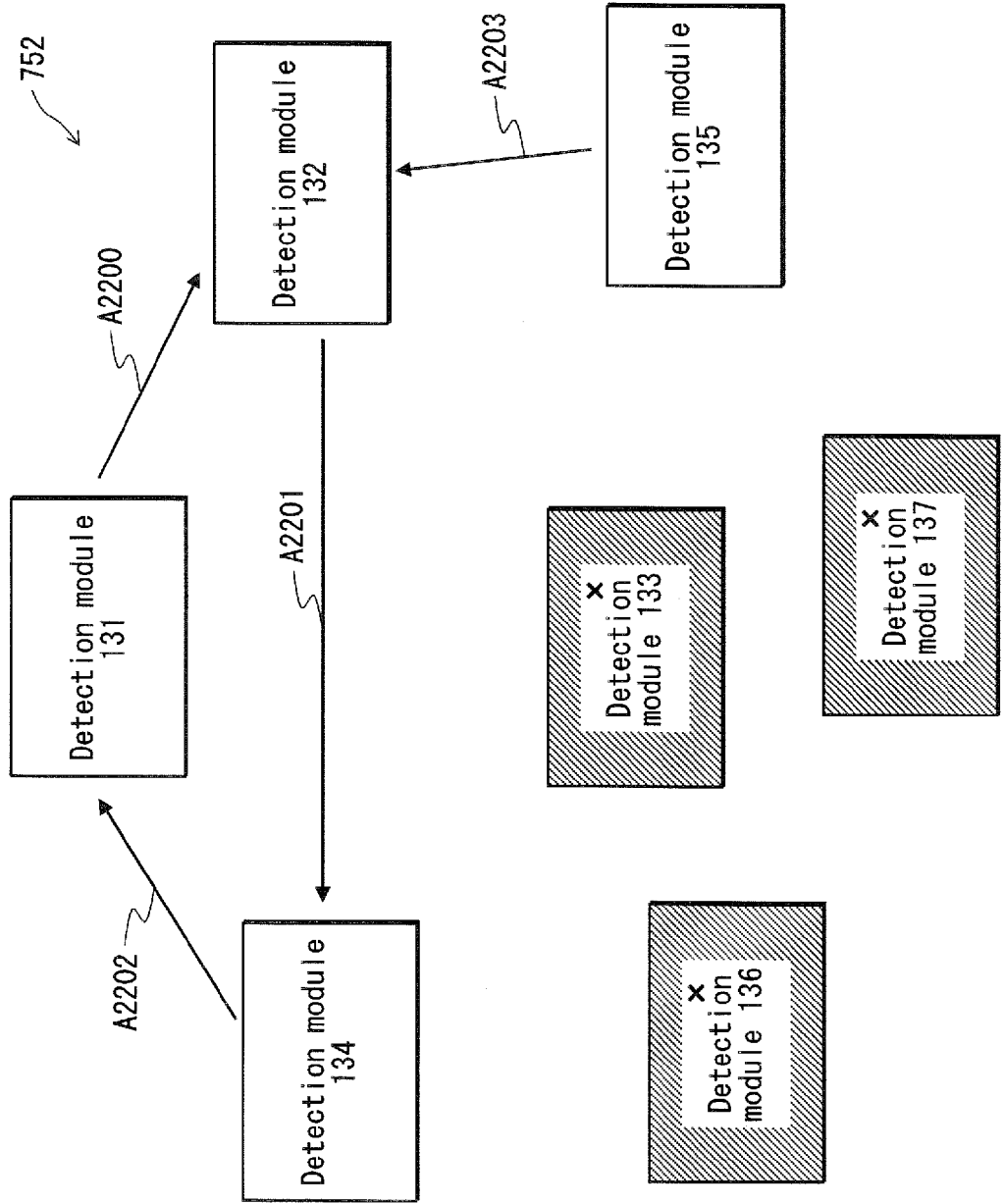
FIG. 36 illustrates an example of a monitoring pattern 752.

The monitoring patterns are updated from step S5008 to step S5011. FIG. 36 shows a monitoring pattern 752 for updating, i.e. an updated monitoring pattern. Arrows A2200 through A2203 indicate monitoring.

(e) Example of Mutual Monitoring S5012 and of Valid Module Identification S5013

Figure 37:
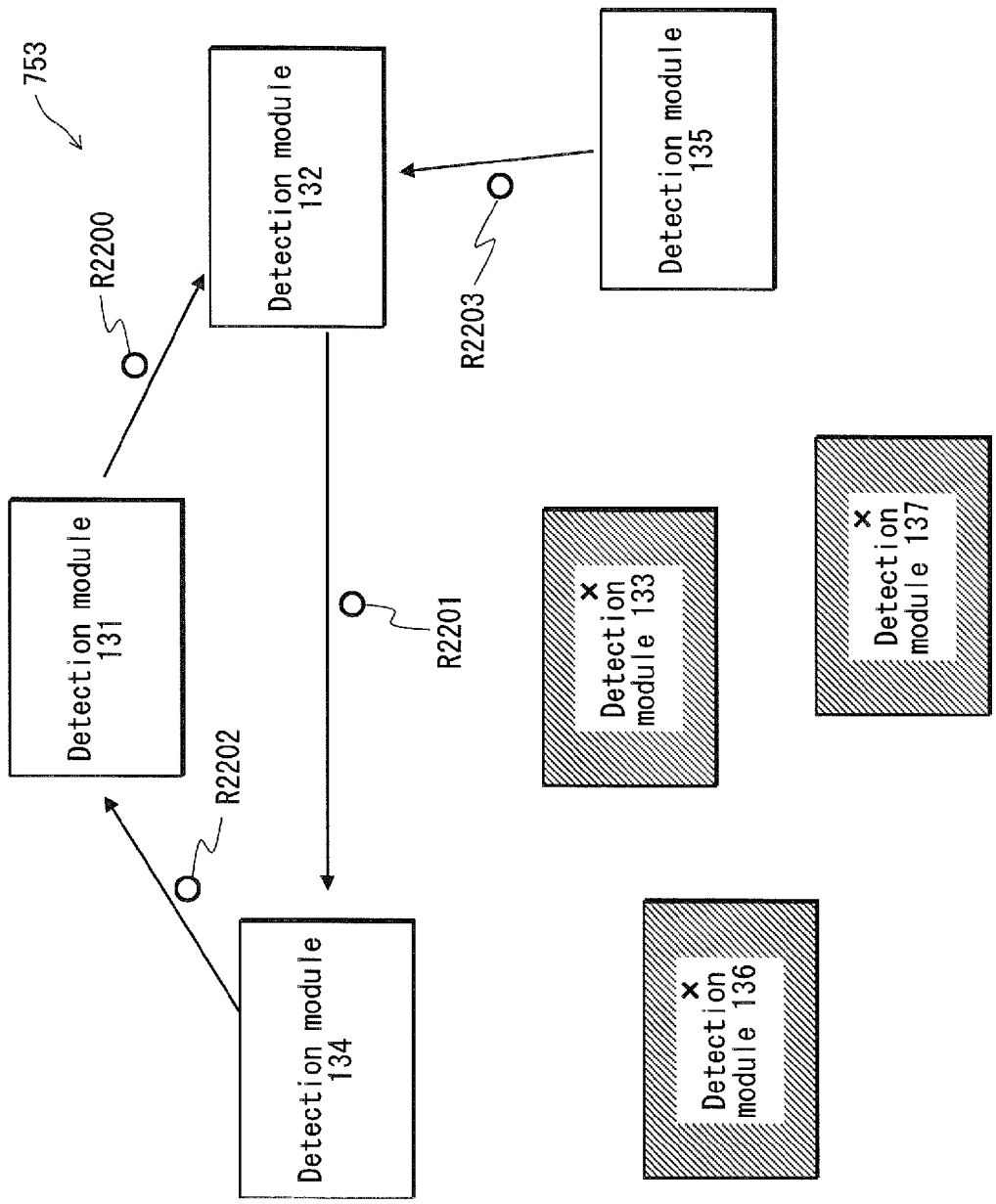
FIG. 37 illustrates an example of mutual monitoring results 753.

In step S5012, mutual monitoring is performed. FIG. 37 shows results 753 of mutual monitoring. In this case, each of the detection modules determines that the detection module it monitors is valid.

In step S5013, processing for valid mutual monitoring identification is performed by referring to the mutual monitoring results. First, in step S5101, the detection module 131 is assumed to be invalid and forms the assumed invalid detection module group. Next, in step S5102, it is determined whether at least one detection module outside of the assumed invalid detection module group determines that any detection module in the assumed invalid detection module group is valid. Since such a detection module exists, processing proceeds to step S5103.

In step S5103, the detection module 134, which determines the detection module 131 to be valid (R2202), is assumed to be an invalid detection module and is added to the assumed invalid detection module group. Once again, in step S5102, it is determined whether at least one detection module outside of the assumed invalid detection module group determines that any detection module in the assumed invalid detection module group is valid. Since such a detection module exists, processing proceeds to step S5103.

In step S5103, the detection module 132, which determines the detection module 134 to be valid (R2201), is assumed to be an invalid detection module and is added to the assumed invalid detection module group. Once again, in step S5102, it is determined whether at least one detection module outside of the assumed invalid detection module group determines that any detection module in the assumed invalid detection module group is valid. Since such a detection module exists, processing proceeds to step S5103.

In step S5103, the detection module 135, which determines the detection module 132 to be valid (R2203), is assumed to be an invalid detection module and is added to the assumed invalid detection module group. Once again, in step S5102, it is determined whether at least one detection module outside of the assumed invalid detection module group determines that any detection module in the assumed invalid detection module group is valid. Since no such detection module exists, processing proceeds to step S5104.

In step S5104, it is determined whether any detection module other than the detection modules identified as invalid (detection modules 133, 136, and 137) and the assumed invalid detection module group (detection modules 131, 132, 134, and 135) exists. Since the detection modules 131 through 137 are either identified as invalid or included in the assumed invalid detection module group, the determination in step S5104 is N (negative), and processing proceeds to step S5105.

In step S5105, the assumption that the detection module 131 is invalid is considered a mistake, and the detection module 131 is identified as valid.

2.3.2 Second Example(Illustrating Failure of Valid Module Identification)

The following describes an example of module identification with reference to FIGS. 22, 23, 34-36, and 38 and to the flowcharts in FIGS. 31 and 32.

In the second example, (a) through (d) are the same as in the first example, whereas (e) differs. Therefore, a description of (a) through (d) is omitted, and only (e) is described.

(e) Example of Mutual Monitoring S5012 and of Valid Module Identification S5013

Figure 38:
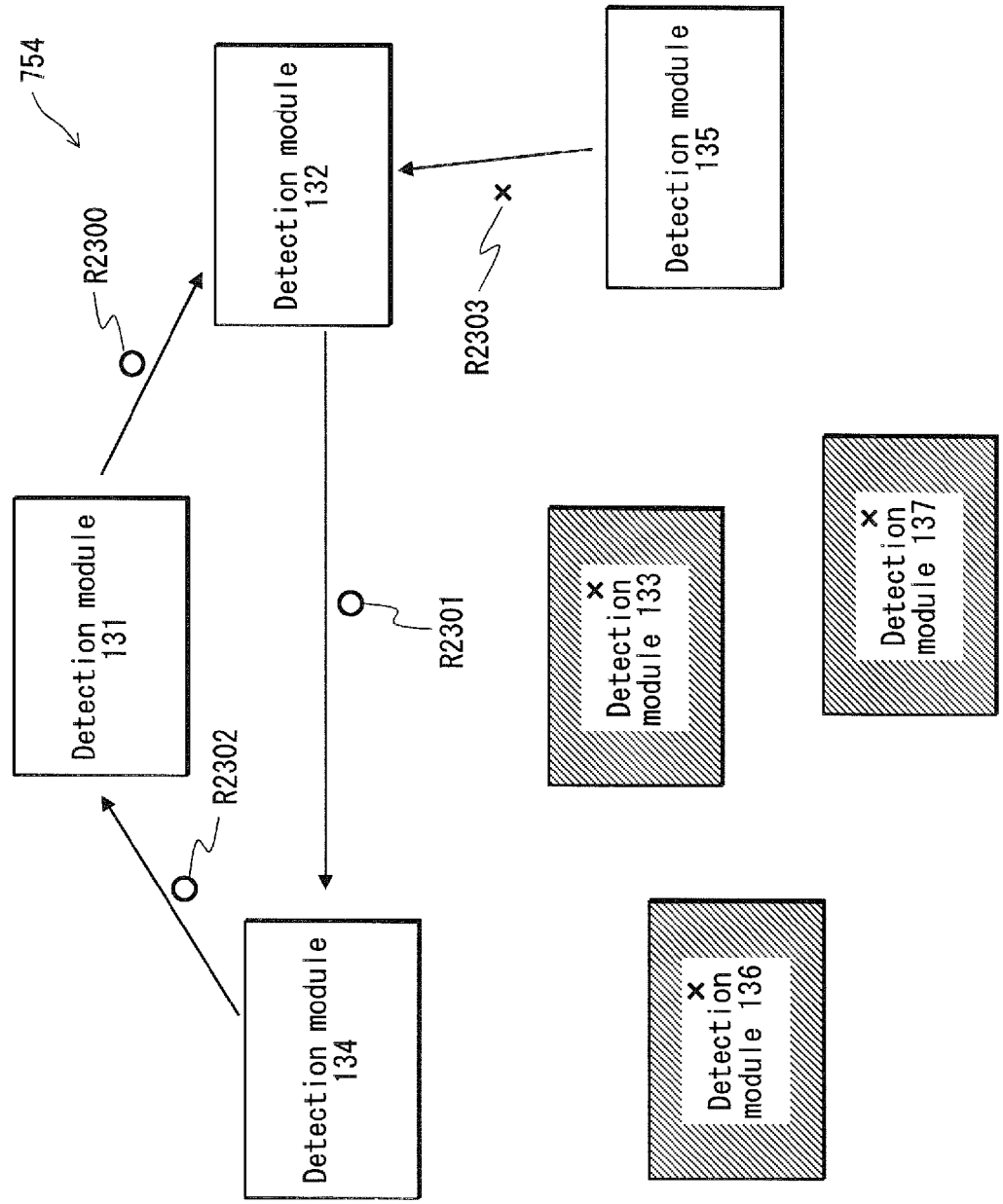
FIG. 38 illustrates an example of mutual monitoring results 754.

In step S5012, mutual monitoring is performed. FIG. 38 shows results 754 of mutual monitoring. In this case, detection module 135 monitors and determines detection module 132 to be invalid, whereas each of the other detection modules determines that the detection module it monitors is valid.

In step S5013, processing for valid mutual monitoring identification is performed by referring to the mutual monitoring results. First, in step S5101, the detection module 131 is assumed to be invalid and forms the assumed invalid detection module group. Next, in step S5102, it is determined whether at least one detection module outside of the assumed invalid detection module group determines that any detection module in the assumed invalid detection module group is valid. Since such a detection module exists, processing proceeds to step S5103.

In step S5103, the detection module 134, which determines the detection module 131 to be valid (R2302), is assumed to be an invalid detection module and is added to the assumed invalid detection module group. Once again, in step S5102, it is determined whether at least one detection module outside of the assumed invalid detection module group determines that any detection module in the assumed invalid detection module group is valid. Since such a detection module exists, processing proceeds to step S5103.

In step S5103, the detection module 132, which determines the detection module 134 to be valid (R2301), is assumed to be an invalid detection module and is added to the assumed invalid detection module group. Once again, in step S5102, it is determined whether at least one detection module outside of the assumed invalid detection module group determines that any detection module in the assumed invalid detection module group is valid. Since detection module 135, which is a detection module other than the detection modules 131, 132, and 134 included in the assumed invalid detection module group, determines that the detection module 132 is not valid but rather invalid (R2303), the determination in step S5102 is N, and processing proceeds to step S5104.

In step S5104, it is determined whether any detection module other than the detection modules identified as invalid (detection modules 133, 136, and 137) and the assumed invalid detection module group (detection modules 131, 132, and 134) exists. Since the detection module 135 is not included among either the detection modules identified as invalid nor the assumed invalid detection module group, the determination in step S5104 is Y, and processing proceeds to step S5106.

In step S5106, the detection module 131 assumed to be invalid is not identified as either valid or invalid, and in step S5107 it is determined whether all of the detection modules have been assumed to be invalid. Since detection modules 132, 134, and 135 have not been assumed to be invalid, these detection modules are each assumed to be invalid, and similar processing is performed. With the monitoring results in FIG. 38, processing ultimately proceeds to step S5106 for each of the other detection modules 132, 134, and 135, and thus no identification is made. Therefore, when the monitoring results in FIG. 38 occur, no valid module is identified.

2.3.3 Third Example(Illustrating Extraction of All Detection Modules by the Detection Target Module Extraction Unit)

The following describes an example of module identification with reference to FIGS. 22 and 34 and to the flowcharts in FIGS. 19, 31, and 32.

In the third example, (a) is the same as in the second example, whereas sections from (b) onwards differ from the first example. Therefore, a description of (a) is omitted, and sections from (b) onwards are described.

(b) Detection Target Module Monitoring

Figure 39:
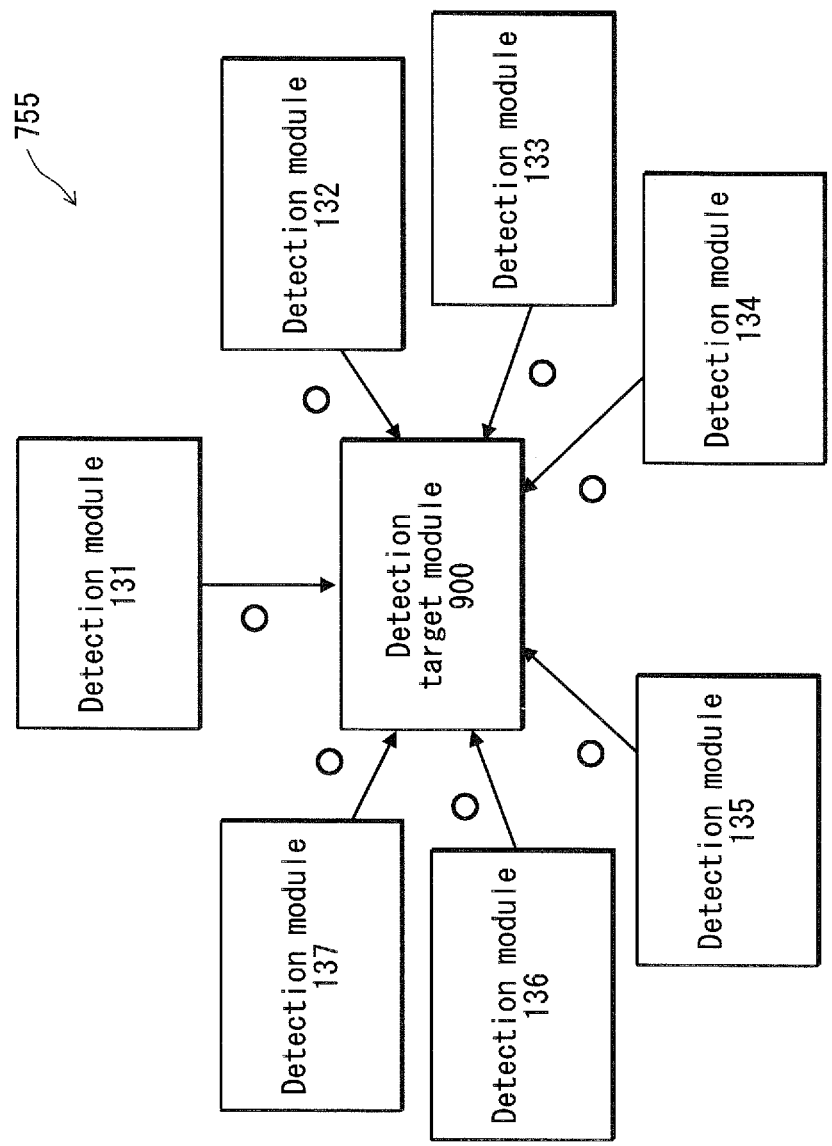
FIG. 39 illustrates an example of tampering detection results 755 for a detection target module.

Processing for detection target module distribution is performed in step S5003, and subsequently, processing for detection target module monitoring is performed in step S5004. FIG. 22 shows a monitoring pattern 551 for tampering detection (monitoring) of the detection target module. FIG. 39 shows the ensuing tampering detection results 755. In the example shown in FIG. 39, all of the detection modules determine that the detection target module 900 is valid. Therefore, it is determined in step S5005 that a detection module determining the detection target module to be valid exists, and processing proceeds to step S5006.

(c) Invalid Module Determination

In step S5006, based on the tampering detection results 755 of FIG. 39, all of the detection modules are extracted as invalid modules. Specifically, invalid modules are extracted in step S3401 of FIG. 19. Furthermore, in step S3402, it is determined whether all of the detection modules in the device 100 are invalid. Since all of the detection modules are invalid, an error is output and the device is stopped in step S3403.

2.4 Advantageous Effects of Embodiment 2

In step S5106, not identifying a detection module assumed to be invalid as a valid detection module, as described above, prevents erroneous determination of an invalid detection module as a valid detection module. It is thus possible to prevent invalid deactivation of a detection module that an invalid detection module identifies as invalid.

During the above valid module identification, one detection module among a plurality of detection modules is first assumed to be an invalid detection module. Since a valid detection module among detection modules is then efficiently identified using a logical verification method, the identified valid detection module can be used to properly deactivate a detection module identified as invalid.

Furthermore, during invalid module determination, since a valid module is identified after identifying all invalid modules that determine the detection target module to be valid, a valid module is identified in a state with as few invalid modules as possible, thus increasing the probability of identifying a valid module.

Additionally, in step S3402 of FIG. 19, which shows invalid module determination, it is determined whether all of the detection modules in the device 100 are invalid. In the third example, since all of the detection modules are invalid, the determination in step S3402 is Y, and the device is stopped in step S3403. Therefore, identifying a valid module only when not all of the detection modules are invalid allows for identification of a valid module in a state in which no invalid modules exist, thus increasing the probability of identifying a valid module.

3. Embodiment 3

Embodiment 3 describes a software updating system for updating the protection control module 120 to a new protection control module 121 when tampering is detected in the protection control module 120. The method for updating the protection control module 120 in the software updating system applies the present invention to the method described in detail in Patent Literature 3. The detection modules in this Embodiment include the update function of the update module in Patent Literature 3.

3.1 Structure of Software Updating System 12

(1) Overall Structure

The structure of a software updating system 12 according to Embodiment 3 is described with reference to FIG. 40.

Figure 40:
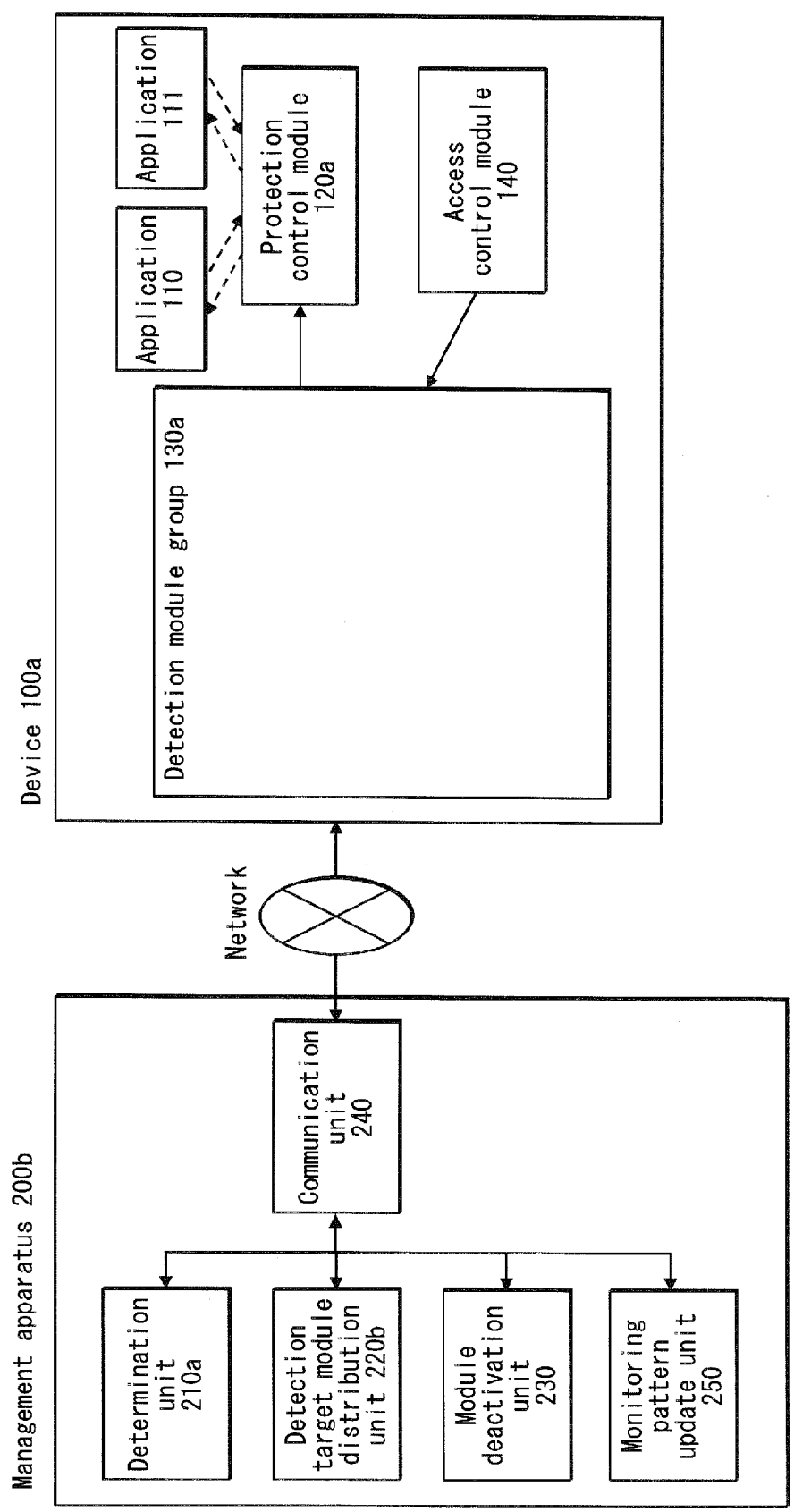
FIG. 40 is an overall structure diagram of a software updating system 12 according to Embodiment 3.

As shown in FIG. 40, the software updating system 12 includes a device 100a, which is an information processing apparatus, and a management apparatus 200b, which is a management apparatus. The device 100a and the management apparatus 200b are connected via a network.

The management apparatus 200b includes a determination unit 210a, a detection target module distribution unit 220b, a module deactivation unit 230, a communication unit 240, and a monitoring pattern update unit 250.

In FIG. 40, constituent elements having similar functions as in Embodiments 1 and 2 are provided with the same reference signs as in FIGS. 1 and 24, and a detailed description thereof is omitted. The following provides a detailed description of the characteristic constituent elements and processing in Embodiment 3.

(2) Structure of Device 100a (a) Structure of Protection Control Module 120a

The following describes the protection control module 120a in detail.

Figure 41:
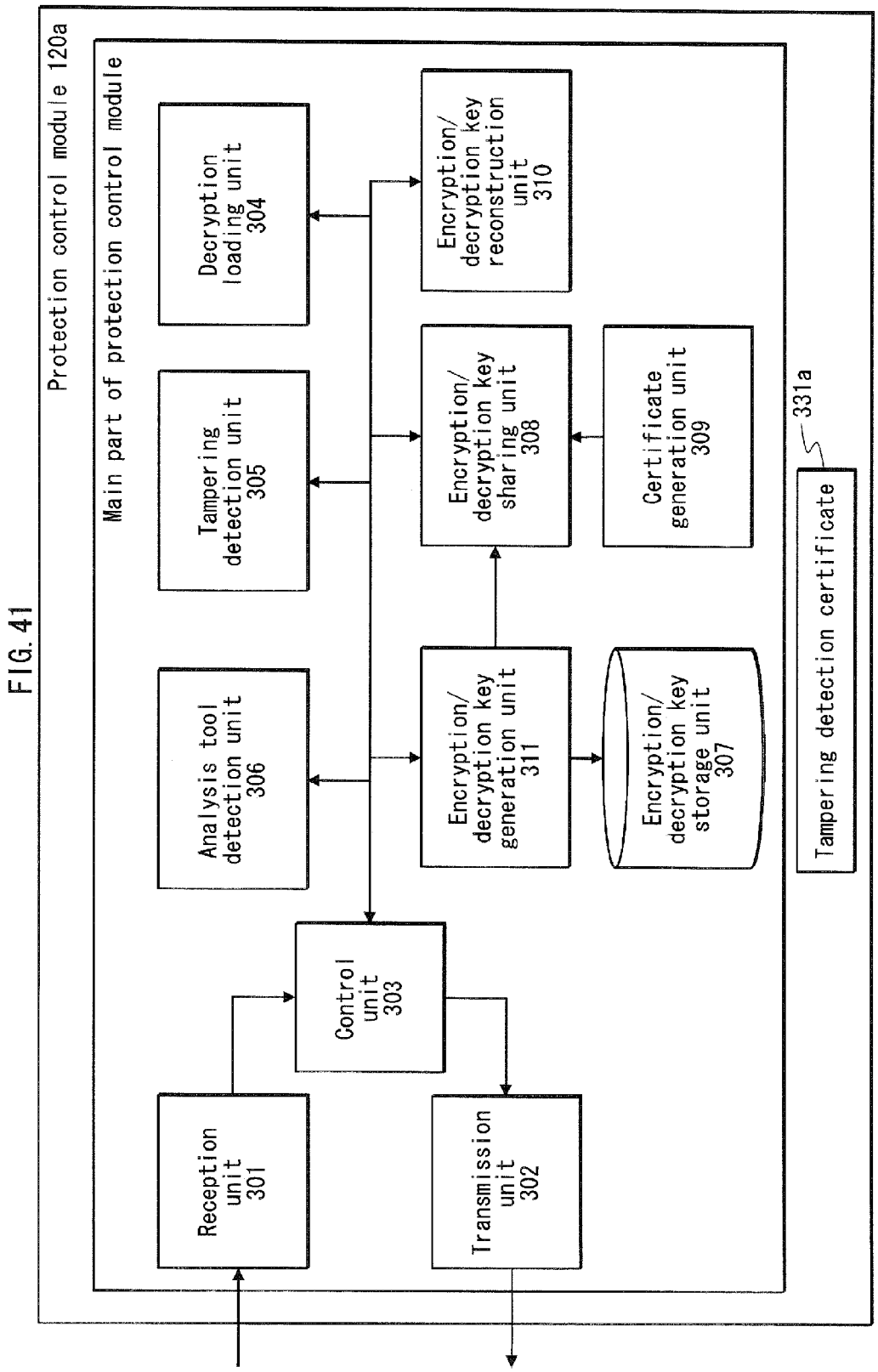
FIG. 41 is a block diagram showing the structure of a protection control module 120*a*.

FIG. 41 is a functional block diagram showing the functional structure of the protection control module 120a.

As shown in FIG. 41, in addition to the structure of the protection control module 120 in FIG. 2, the protection control module 120a includes an encryption/decryption key sharing unit 308, a certificate generation unit 309, an encryption/decryption key reconstruction unit 310, and an encryption/decryption key generation unit 311.

The encryption/decryption key distribution unit 308 generates shares from the encryption/decryption key using a secret sharing scheme.

The certificate generation unit 309 generates a certificate used for verification of whether reconstruction is valid when the shares generated from the encryption/decryption key are reconstructed.

Based on distribution information, the encryption/decryption key reconstruction unit 310 acquires, from the detection modules, the shares distributed thereto. The encryption/decryption key reconstruction unit 310 reconstructs the encryption/decryption key from the acquired shares and transmits the reconstructed encryption/decryption key to the decryption loading unit 304.

The encryption/decryption key generation unit 311 generates the encryption/decryption key for encrypting and decrypting the applications 110 and 111.

(b) Structure of Detection Module 131*a*

Next, the structure of the detection modules 131*a* is described in detail.

Figure 42:
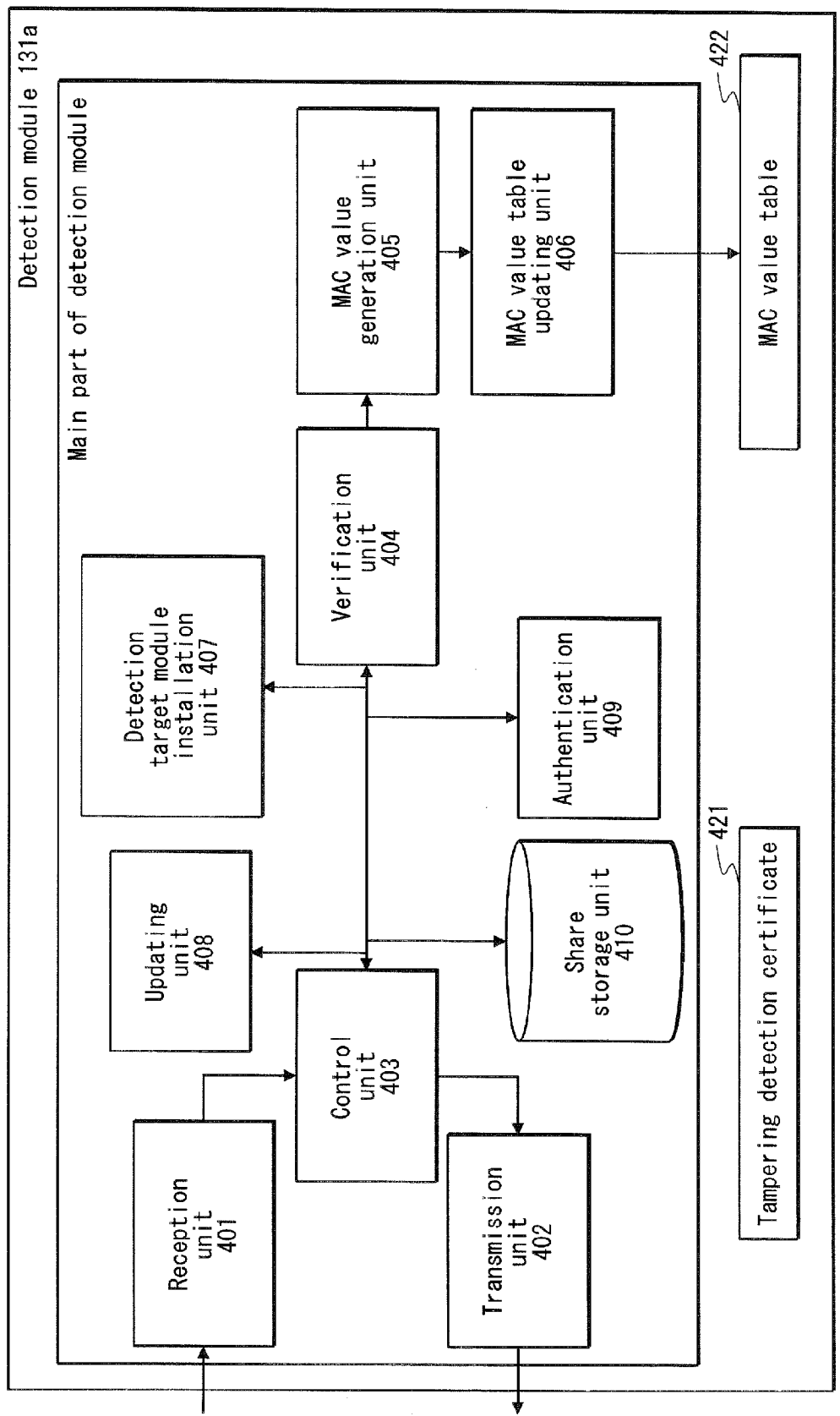
FIG. 42 is a block diagram showing the structure of a detection module 131*a*.

FIG. 42 is a functional block diagram showing the functional structure of the detection module 131*a*. The other detection modules have a similar structure.

As shown in FIG. 42, in addition to the structure of the detection module 131 in FIG. 4, the detection module 131*a* includes an update unit 408, an authentication unit 409, and a share storage unit 410.

A control unit 403 causes the update unit 408 to update the software in the device 100*a* in coordination with the management apparatus 200*b*. Specifically, the applications 110 and 111, the protection control module 120*a*, and the detection modules 131*a*, 132*a*, . . . , and 137*a* are updated.

The authentication unit 409 stores an authentication key pair for the detection module (an authentication private key and an authentication public key) and performs authentication on other modules.

The share storage unit 410 stores a share generated from the encryption/decryption key, which the protection control module 120*a* uses to encrypt and decrypt the applications 110 and 111, and distribution information regarding the shares distributed by the protection control module 120*a*. The distribution information indicates which shares were distributed to which detection modules.

A signature method is described on pages 171 to 187 of Non-Patent Literature 1, and certificates are described in detail in Non-Patent Literature 2. Non-Patent Literature 2 also provides a detailed explanation of shares.

(c) Detection Target Module Distribution Unit 220*a*

Figure 43:
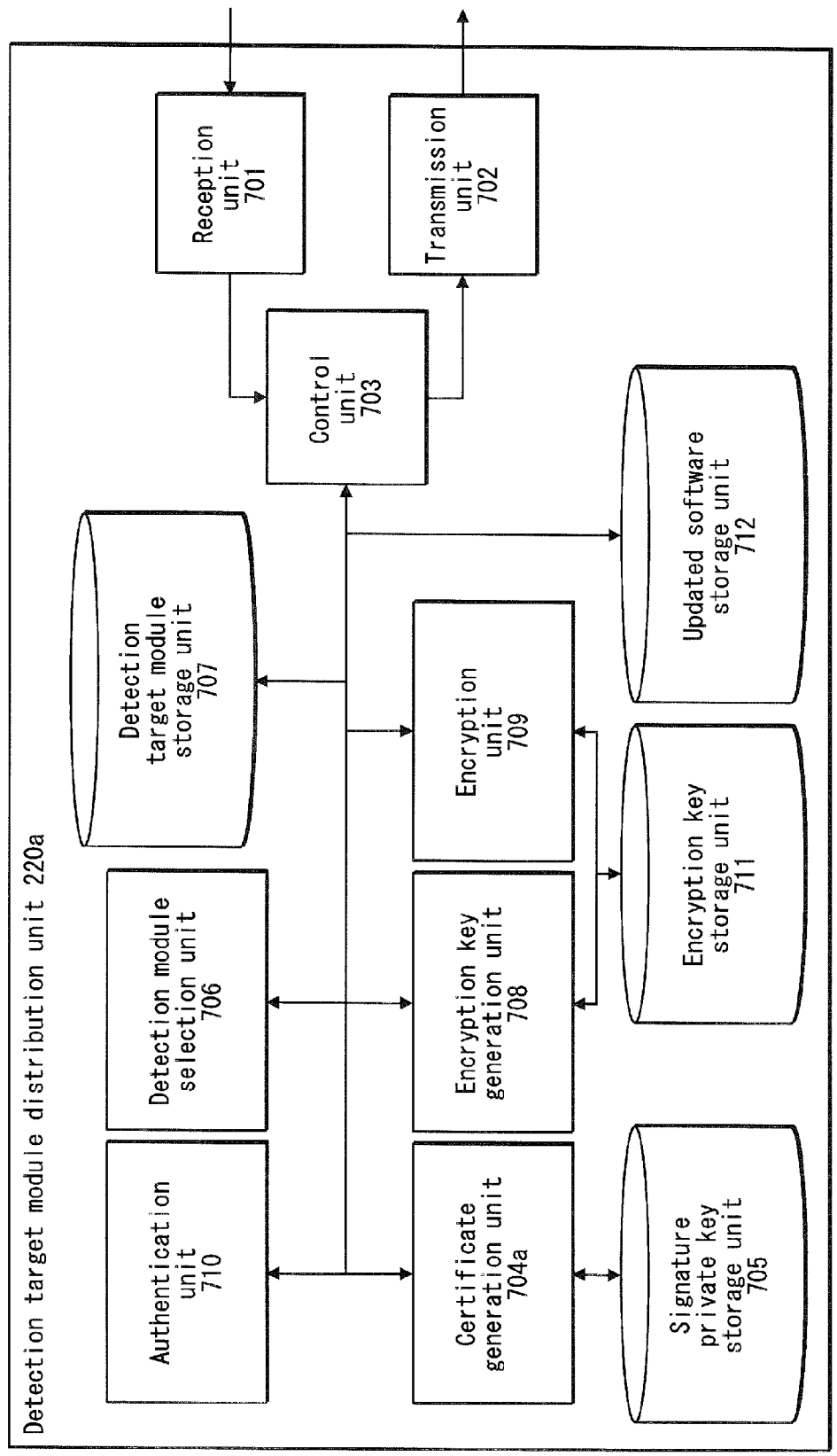
FIG. 43 is a block diagram showing the structure of a detection target module distribution unit 220*a*.

FIG. 43 is a functional block diagram showing the functional structure of a detection target module distribution unit 220*a*.

As shown in FIG. 43, in addition to the structure of the detection target module distribution unit 220 in FIG. 7, the detection target module distribution unit 220*a* includes an encryption key generation unit 708, an encryption unit 709, an authentication unit 710, an encryption key storage unit 711, and an updated software storage unit 712. Note that a certificate generating unit 704 in this structure is a certificate generating unit 704*a* which has additional functions described below.

In addition to the processing of the certificate generating unit 704 in Embodiment 1, the certificate generating unit 704*a* also generates, using the signature private key for the updated software, an update verification certificate for verifying that the protection control module in the device 100 has been correctly updated.

The encryption key generation unit 708 generates the encryption key used when transmitting updated software to the detection modules 131*a*, 132*a*, . . . , and 137*a*.

The encryption unit 709 encrypts the updated software using the encryption key generated by the encryption key generation unit 708. The encryption unit 709 also encrypts the encryption key using a key unique to each detection module.

The encryption keys and updated software are not transmitted to the detection modules 131*a*, 132*a*, . . . , and 137*a* all at once. Rather, data is transferred to each detection module when the data becomes necessary during the updating process.

The authentication unit 710 performs mutual authentication with the detection modules 131*a*, 132*a*, . . . , and 137*a*, and with the protection control module 120*a*.

The encryption key storage unit 711 stores the encryption key generated by the encryption key generation unit 708 and the encryption key encrypted by the encryption unit 709.

The updated software storage unit 712 stores an updated protection control module for updating the protection control module 120*a* when the protection control module 120*a* is attacked.

3.2 Operations of Software Updating System 12

Next, the operations of the software updating system 12 are described.

(1) Overall Operations

Figure 44:
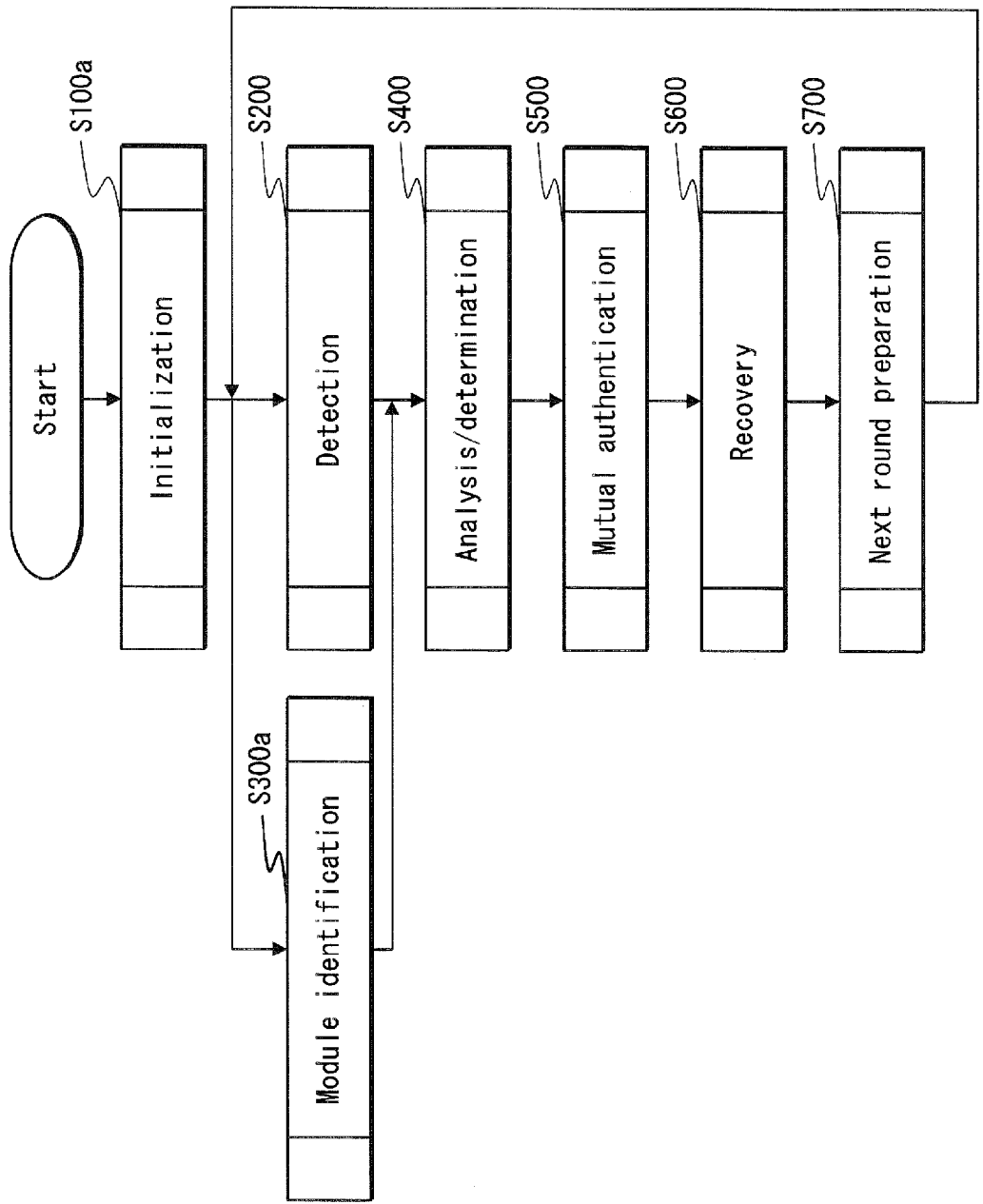
FIG. 44 is a flowchart showing operations of the software updating system 12.

The software updating system 12 performs four processes in addition to the initialization, detection, and module identification in the above embodiments. FIG. 44 is a flowchart showing operations of the software updating system 12.

The software updating system 12 performs initialization (S100*a*) and subsequently performs processing for detection (S200) and module identification (S300*a*) in parallel. When tampering is detected in the protection control module 120*a* during detection, the software updating system 12 performs processing for analysis/determination to analyze the protection control module 120*a* and determine whether updating is necessary (S400).

Next, the software updating system 12 performs mutual authentication for the detection modules 131*a*, 132*a*, . . . , and 137*a* and the detection target module distribution unit 220*a* to confirm each other as valid software (S500).

The software updating system 12 then performs recovery (S600).

Recovery refers to installing an updated protection control module in the device 100*a* after mutual tampering detection between detection modules included in the detection module group 130*a*. Recovery also refers to updating the protection control module in the device 100*a* using shares embedded in the detection modules 131*a*, 132*a*, . . . , and 137*a*.

Subsequently, the software updating system 12 performs next round preparation in preparation for the next time the protection control module will need to be updated, generating key data and shares necessary for updating and embedding the generated information in the detection modules (S700). The software updating system 12 then returns to the detection in S200 and the module identification in S300*a* and continues processing.

(2) Initialization Operations

Figure 45:
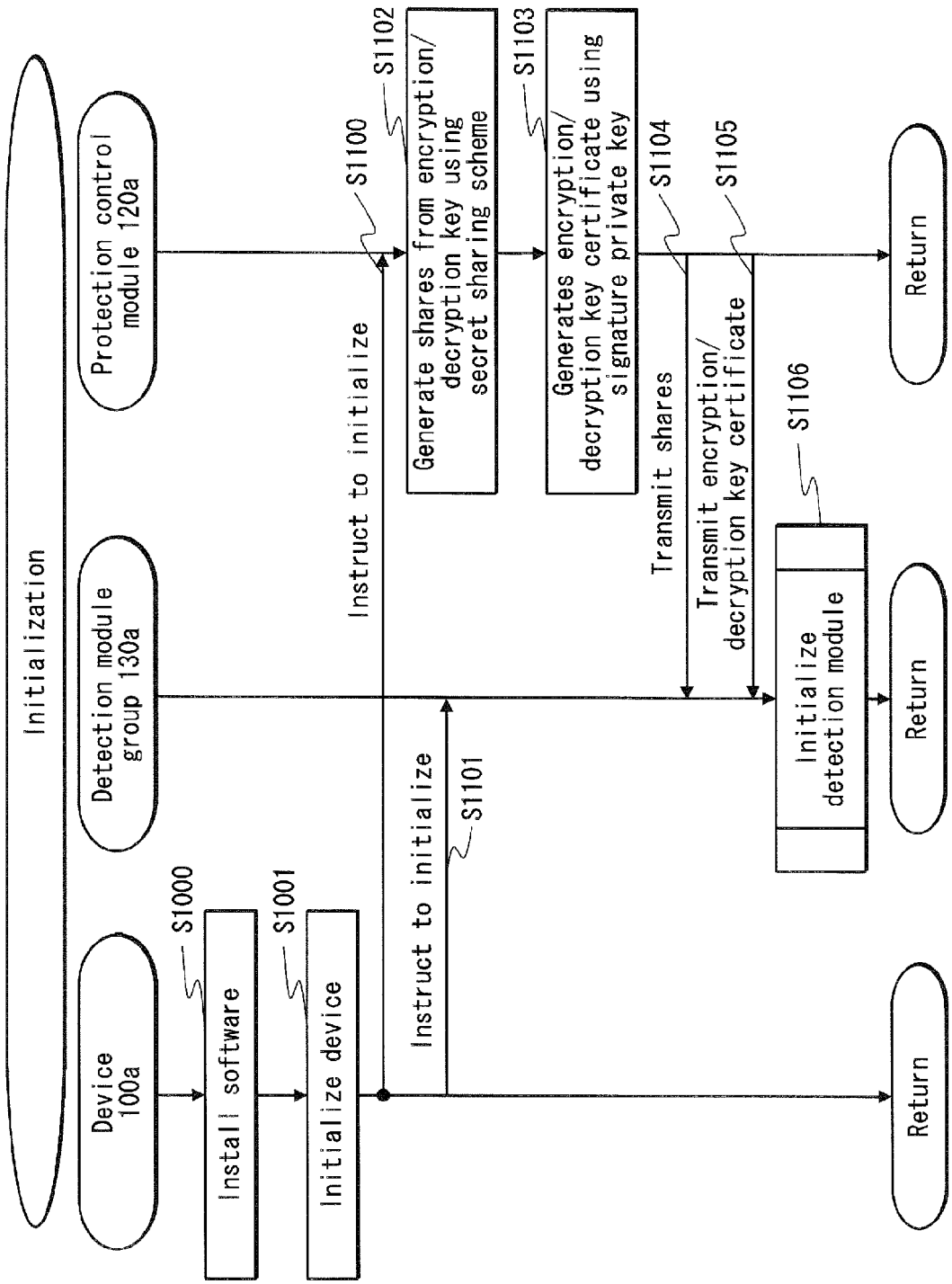
FIG. 45 is a sequence diagram showing initialization.
Figure 46:
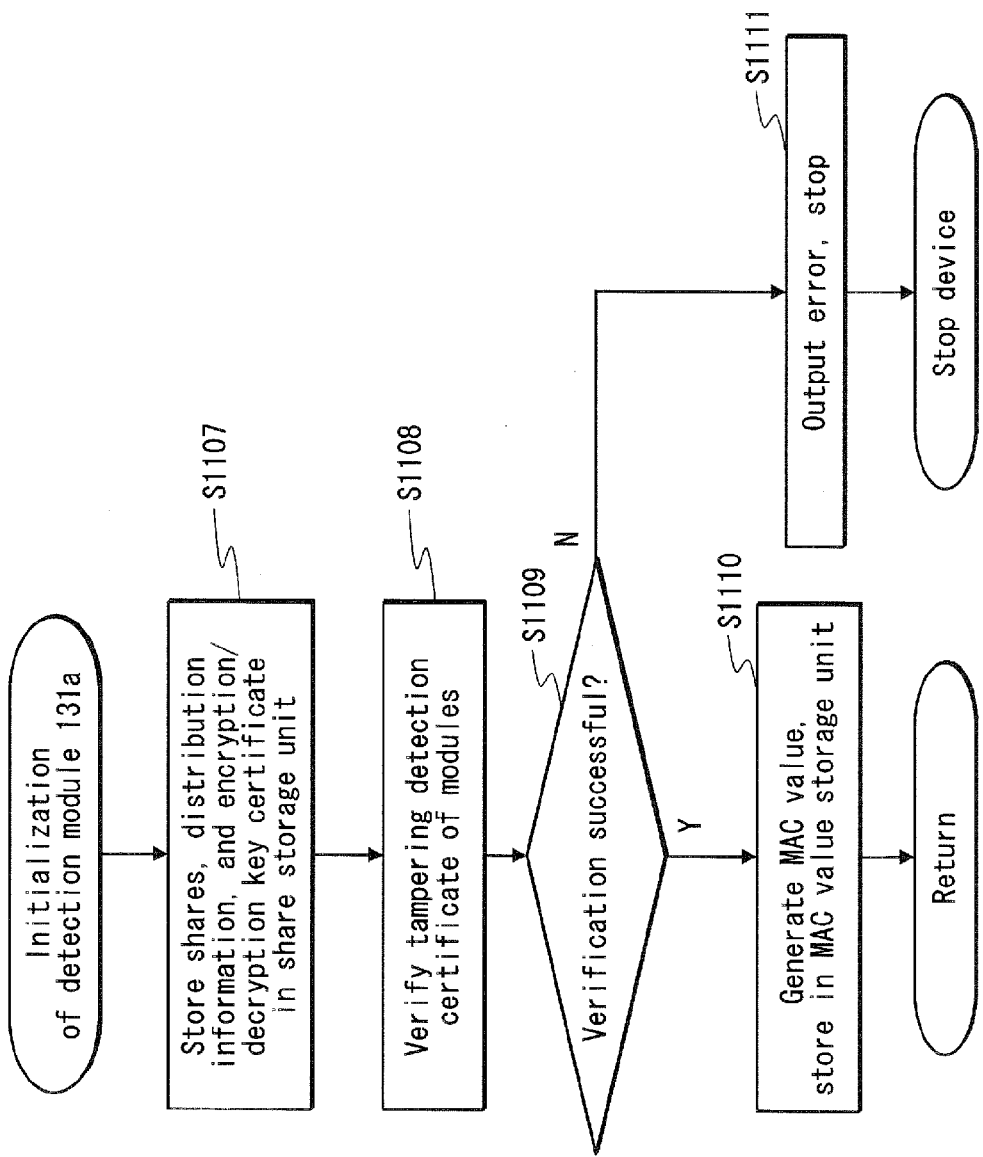
FIG. 46 is a flowchart showing detection module initialization.

The following describes initialization in the software updating system 12 (S100*a* in FIG. 44) in detail with reference to FIGS. 45 and 46.

The operations from S1000 to S1001 in Embodiment 3 respectively correspond to and are similar to the operations from S1000 to S1001 in Embodiment 1. Therefore a description of these operations is omitted.

After initialization of the device 100a, the device 100a issues an initialization instruction to the protection control module 120a and to the detection modules 131a, 132a, . . . , and 137a (S1100, S1101).

The protection control module 120a generates shares from the encryption/decryption key using a secret sharing scheme (S1102). Note that the protection control module 120a generates the same number of shares as the number of detection modules provided with the share storage unit 410. When all of the detection modules 131a, 132a, . . . , and 137a are provided with the share storage unit 410, the protection control module 120a generates seven shares.

Furthermore, the protection control module 120a generates the encryption/decryption key certificate using the signature private key (S1103). The encryption/decryption key certificate is for confirming, after reconstruction of the encryption/decryption key, that the encryption/decryption key has been correctly reconstructed.

The protection control module 120a transmits the generated shares and encryption/decryption key certificate to the detection modules 131a, 132a, . . . , and 137a (S1104, S1105).

Note that the protection control module 120a transmits a combination of shares to each of the detection modules 131a, 132a, . . . , and 137a so that each detection module stores a different combination of shares. Furthermore, the protection control module 120a transmits, to each detection module, distribution information indicating which shares were distributed to which detection modules. The same distribution information is transmitted to each detection module.

Pages 47 to 49 of Patent Literature 2 contain a detailed description of both the method for generating the shares from the encryption/decryption key using the secret sharing scheme, as well as the method for transmitting the shares to the detection modules. In order to employ the same method as in Patent Literature 2, the encryption/decryption key in Embodiment 3 can be made to correspond to the private key d, the protection control module 120a to the authentication authority device, and the detection modules 131a, 132a, . . . , and 137a to the share storing devices in Patent Literature 2.

After receiving the shares, the distribution information, and the encryption/decryption key certificate from the protection control module 120a, the detection modules perform detection module initialization (S1106).

(a) Detection Module Initialization Operations

FIG. 46 is a flowchart showing operations for detection module initialization (S1106 in FIG. 45).

The operations from S1108 to S1111 in Embodiment 3 respectively correspond to and are similar to the operations from S1004 to S1007 in Embodiment 1. Therefore a description of these operations is omitted.

The detection module 131a receives the shares, the distribution information, and the encryption/decryption key certificate from the protection control module 120a, storing the received information in the share storage unit 410 (S1107).

(3) Detection Operations

Detection in Embodiment 3 is similar to the operations for detection in Embodiments 1 and 2, and therefore a description thereof is omitted.

(4) Operations for Module Identification

Module identification in Embodiment 3 is similar to the operations for module identification in Embodiments 1 and 2, and therefore a description thereof is omitted. Note that module identification in Embodiment 3 may be the same as the module identification in Embodiment 1.

(5) Analysis and Determination Operations

Figure 47:
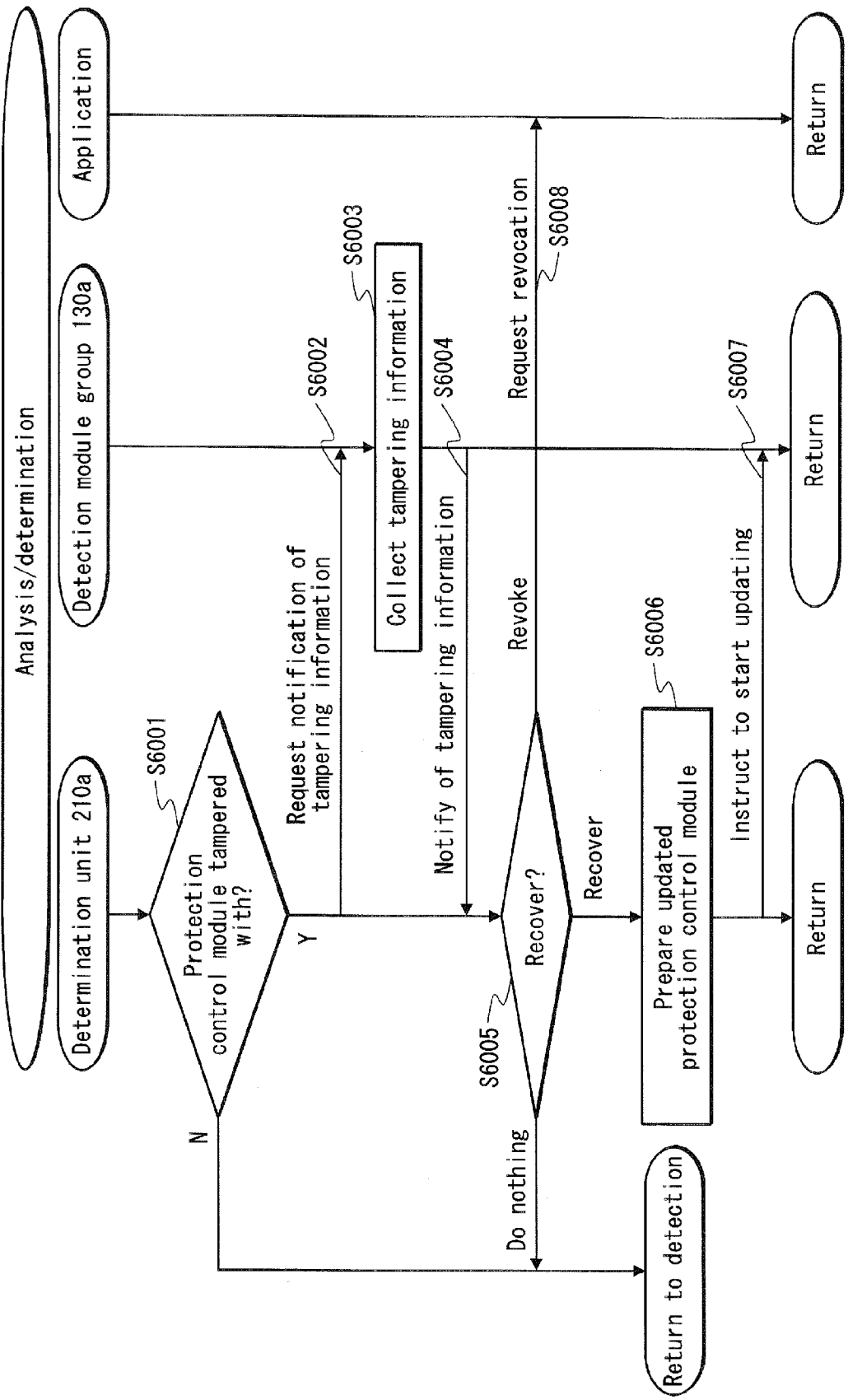
FIG. 47 is a sequence diagram showing analysis and determination.

Next, analysis and determination (S400 in FIG. 44) are described in detail with reference to the sequence diagram in FIG. 47. Note that FIG. 47 represents processing performed individually by the detection modules 131a, 132a, . . . , and 137a collectively as being performed by the detection module group 130a.

When the determination unit 210a receives tampering detection results for the protection control module 120a from the detection modules during detection, the determination unit 210a determines whether the protection control module 120a is valid or invalid (whether the protection control module 120a has been tampered with) based on the received tampering detection results (S6001).

An example of the method of determination is to determine that the protection control module 120a is invalid (has been tampered with) when a predetermined number of detection modules detect tampering, and to determine that the protection control module 120a is valid (has not been tampered with) when fewer than the predetermined number of detection modules detect tampering. The predetermined number may be a majority of the detection modules included in the detection module group 130a. An alternative method of determination is to perform the same module identification as in S300a of detection, determining the protection control module 120a to be invalid (tampered with) when a detection module identified as valid detects tampering in the protection control module 120a, and determining the protection control module 120a to be valid (not tampered with) when the detection module identified as valid does not detect tampering in the protection control module 120a.

When determining the protection control module 120a to have been tampered with (S6001: Y), the determination unit 210a requests notification of tampering information, such as the part of the protection control module 120a that was tampered with, from the detection module group 130a in order to determine whether it is necessary to recover the protection control module 120a (S6002).

Upon receiving a request for notification of tampering information, the detection module group 130a collects the tampering information (S6003) and notifies the determination unit 210a of the collected tampering information (S6004).

Based on the tampering information, the determination unit 210a determines whether to recover the protection control module 120a, to revoke the device 100a, or to do nothing (S6005).

When the protection control module 120a is to be recovered (S6005: "Recovery"), the determination unit 210a prepares an updated protection control module (S6006) and instructs the detection module group 130a to start updating (S6007). When the device 100a is to be revoked (S6005: "Revoke"), the determination unit 210a issues a request to the server providing service to the applications 110 and 111 to revoke the device 100a (S6008). When the determination unit 210a determines to do nothing (S6005: "Do nothing"), processing returns to detection.

When the determination unit 210a determines that the protection control module 120a is valid (not tampered with; S6001: N), processing returns to detection.

(5) Mutual Authentication Operations

Next, mutual authentication by the software updating system 12 (S500 in FIG. 44) is described in detail with reference to the sequence diagram in FIGS. 48 and 49.

When determining, during analysis/determination, that it is necessary to recover the protection control module 120a, the determination unit 210a of the management apparatus 200b instructs the detection target module distribution unit 220a to recover the protection control module 120a.

After instructing the detection modules 131a, 132a, ..., and 137a, to start updating, the detection target module distribution unit 220a performs mutual authentication with each of the detection modules on a one-to-one basis. This prevents the device 100a from connecting to an unauthorized management apparatus and prevents the management apparatus 200b from connecting to an unauthorized device. Note that during mutual authentication, the detection target module distribution unit 220a uses the signature private key and the signature public key, and the detection modules use the authentication key pair (authentication private key and authentication public key).

Figure 48:
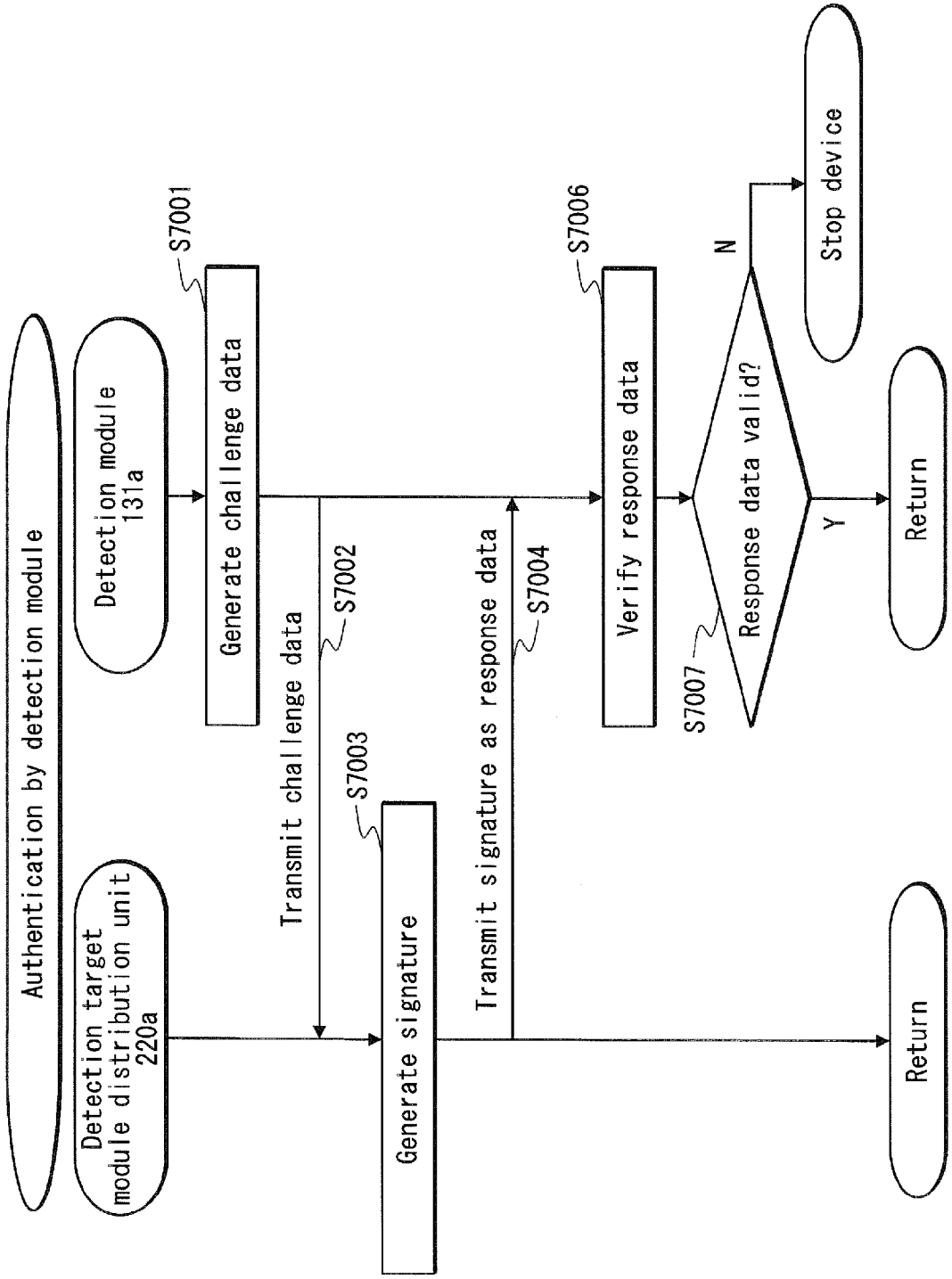
FIG. 48 is a sequence diagram showing mutual authentication, specifically authentication by the detection module.

FIG. 48 is a sequence diagram of when the detection module 131a performs authentication on the detection target module distribution unit 220a. Note that the detection modules 132a, ..., and 137a also operate similarly to the detection module 131a in FIG. 48 to perform authentication on the detection target module distribution unit 220a.

The detection module 131a generates a random number (challenge data) using a random number generator (S7001) and transmits the generated challenge data to the detection target module distribution unit 220a (S7002). Along with the challenge data, the detection module 131a also transmits a detection module identifier for identifying the detection module 131a. The detection target module distribution unit 220a generates signature data for the received challenge data using the signature private key (S7003) and returns the generated signature data to the detection module 131a as response data (S7004).

The detection module 131a receives the response data from the detection target module distribution unit 220a (S7004) and verifies whether the response data matches the signature data for the challenge data using the signature public key (S7006).

If verification indicates that the response data is valid, and therefore that the detection target module distribution unit 220a is a valid module (S7007: Y), the detection module 131a continues processing. If verification indicates that the response data is invalid, and therefore that the detection target module distribution unit 220a is an invalid module (S7007: N), the detection module 131a outputs an error and terminates processing (S7008).

Next, the detection target module distribution unit 220a performs authentication on the detection modules 131a, 132a, ..., and 137a.

Figure 49:
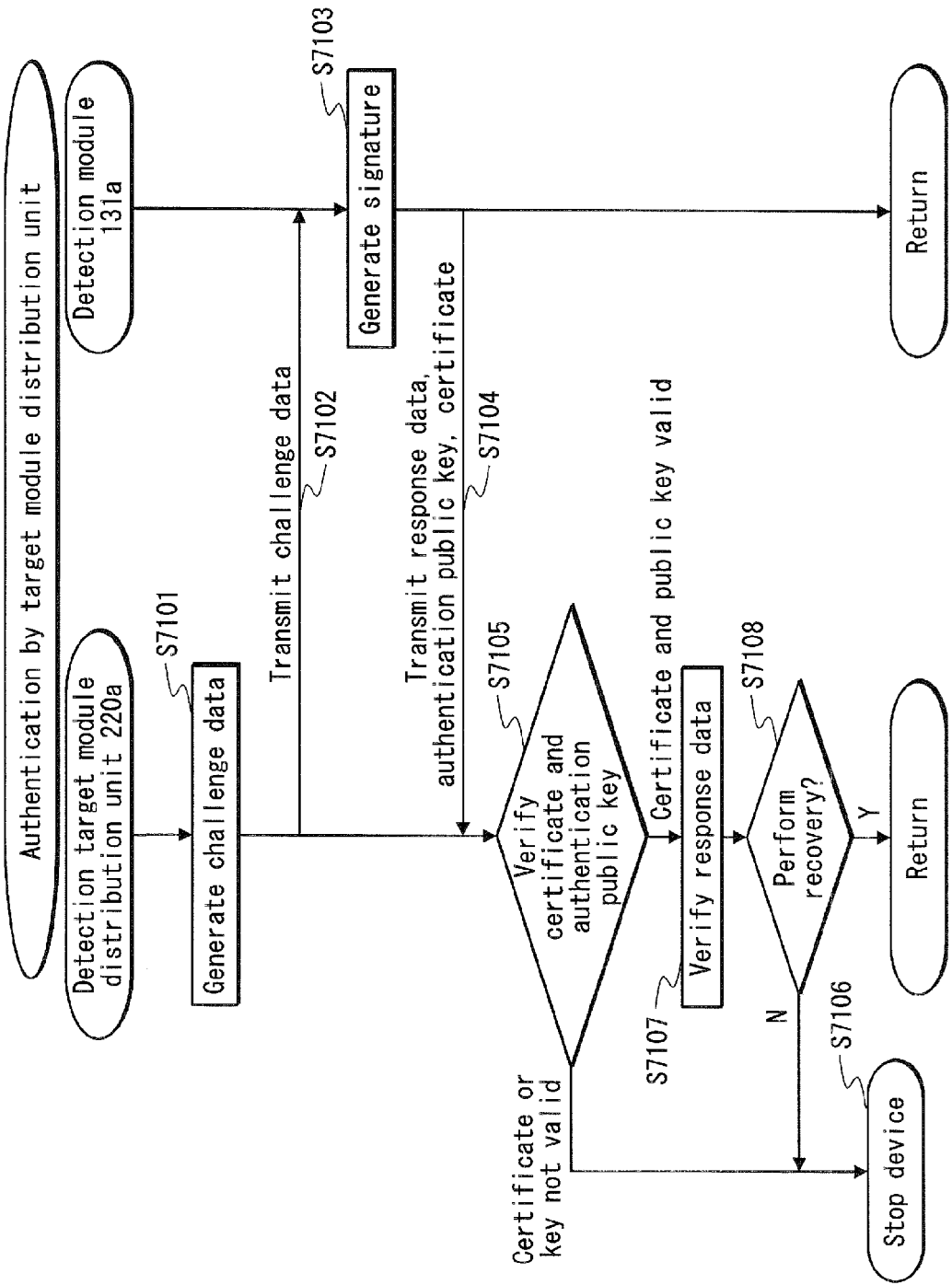
FIG. 49 is a sequence diagram showing mutual authentication, specifically authentication by the detection target module distribution unit.

FIG. 49 is a sequence diagram of when the detection target module distribution unit 220a performs authentication on each of the detection modules.

Using the random number generator, the detection target module distribution unit 220a generates a different random number (challenge data) for each of the detection modules that transmitted challenge data (S7101) and transmits each piece of challenge data to the corresponding detection module (S7102).

The detection modules generate signature data for the received challenge data using the authentication private key (S7103) and return the generated signature data to the detection target module distribution unit 220a as response data (S7104).

Along with the response data, the detection modules also transmit the authentication public key and the authentication key certificate to the detection target module distribution unit 220a.

The detection target module distribution unit 220a receives the response data, the authentication public key, and the authentication key certificate from each detection module (S7104). The detection target module distribution unit 220a verifies whether each authentication key certificate is the certificate that the detection target module distribution unit 220a itself issued and also verifies authenticity of the authentication public key using the authentication key certificate (S7105).

When the authentication key certificate and the authentication public key are invalid (S7105: "Certificate or key invalid"), the detection target module distribution unit 220a terminates processing (S7106).

If the authentication key certificate and the authentication public key are valid (S7105: "Certificate and key valid"), the detection target module distribution unit 220a verifies whether the received response data matches the signature data for the challenge data using the authentication public key (S7107).

Next, the detection target module distribution unit 220a determines whether to perform recovery using the detection modules that return valid response data (i.e. valid detection modules) (S7108). At this point, it is determined whether the number of detection modules that return valid response data (i.e. valid detection modules) is at least a preset number necessary for recovery. In this case, if the number of detection modules that return valid response data (i.e. valid detection modules) is at least the preset number necessary for recovery, it is determined that recovery is to be performed. If the number of detection modules that return valid response data (i.e. valid detection modules) is fewer than the preset number necessary for recovery, it is determined that recovery is not to be performed.

When recovery is not to be performed (S7108: N), the detection target module distribution unit 220a terminates processing (S7106). When recovery is to be performed (S7108: Y), mutual authentication concludes, and processing proceeds to recovery.

The detection target module distribution unit 220a also creates an authentication list that lists detection module identifiers for all of the detection modules confirmed to be valid during mutual authentication. During subsequent recovery, only the detection modules whose identifier is listed in the authentication list are used.

(6) Recovery Operations

Next, recovery (S600 in FIG. 44) is described in detail with reference to FIGS. 50 to 54. Recovery is processing to update the protection control module 120a that has been tampered with to a new, updated protection control module when the above described mutual authentication is successful.

Figure 50:
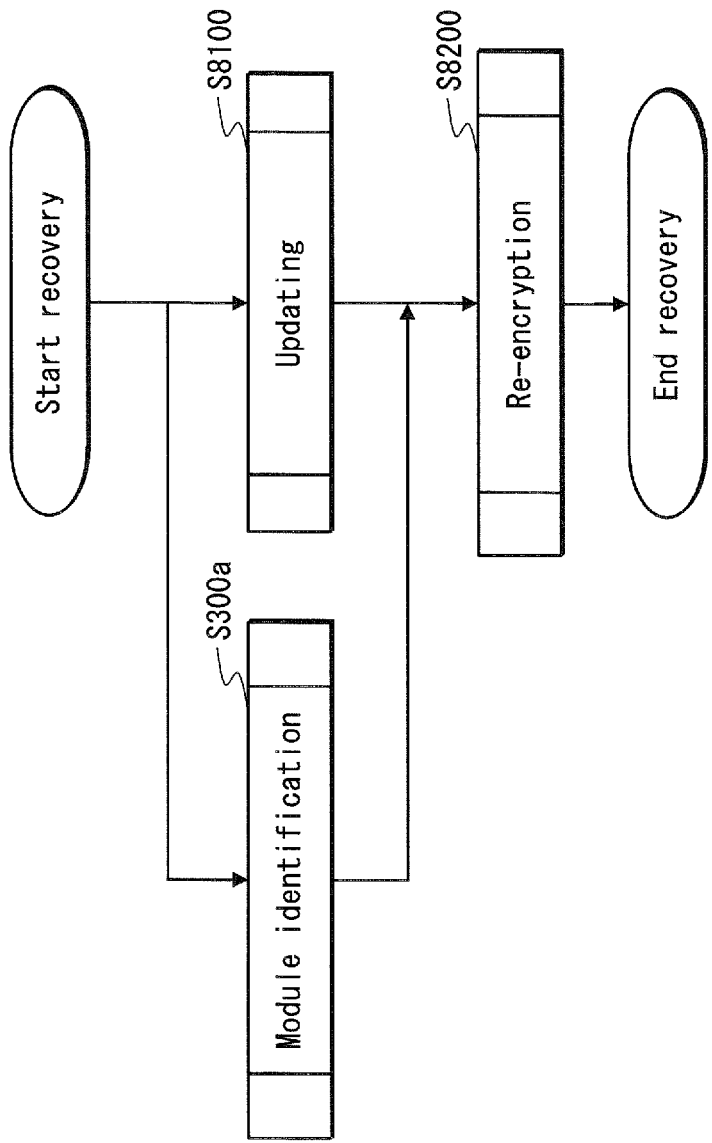
FIG. 50 is a flowchart showing recovery.
Figure 51:
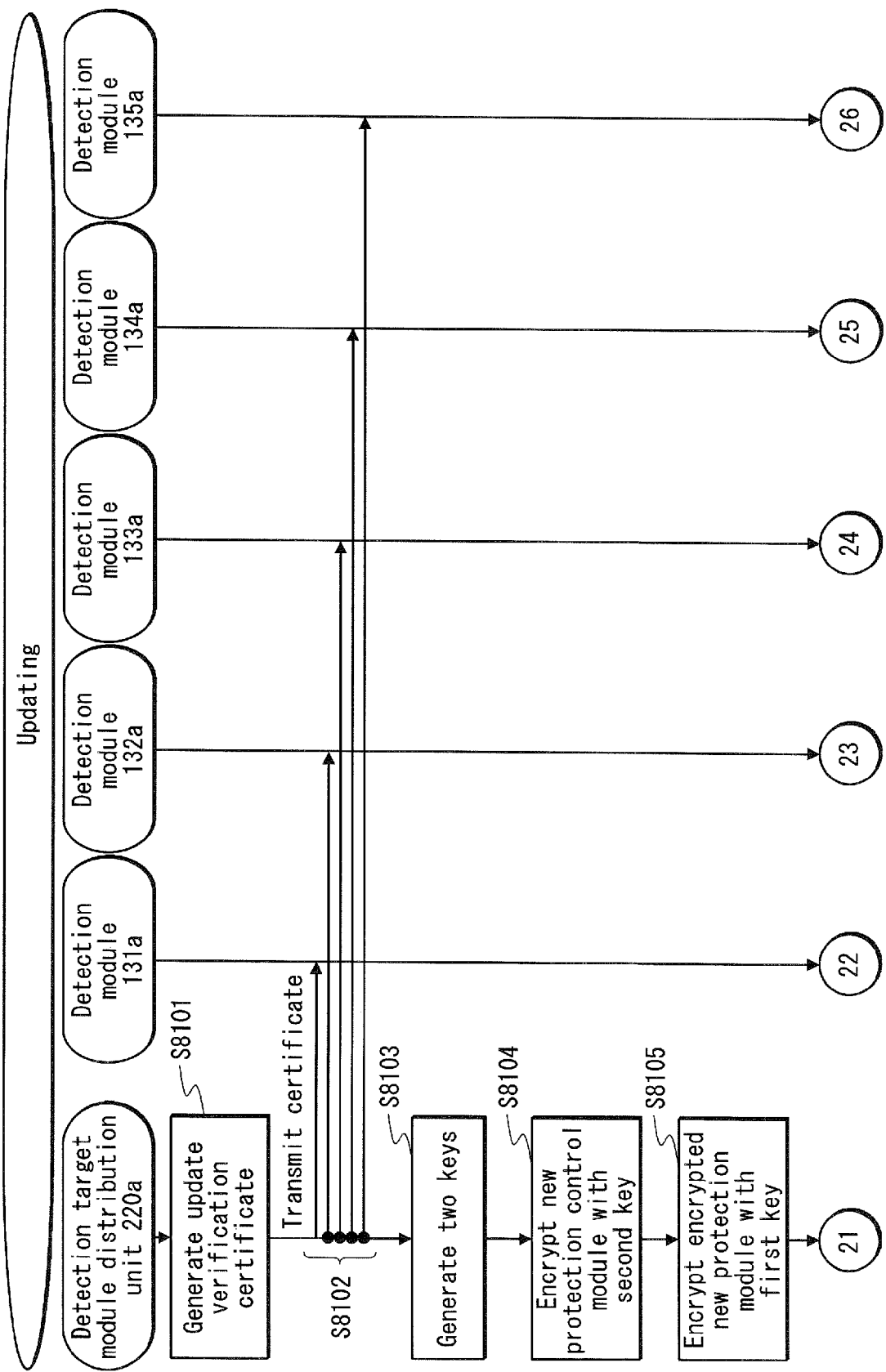
FIG. 51 is a sequence diagram showing updating and is continued in FIG. 52.
Figure 52:
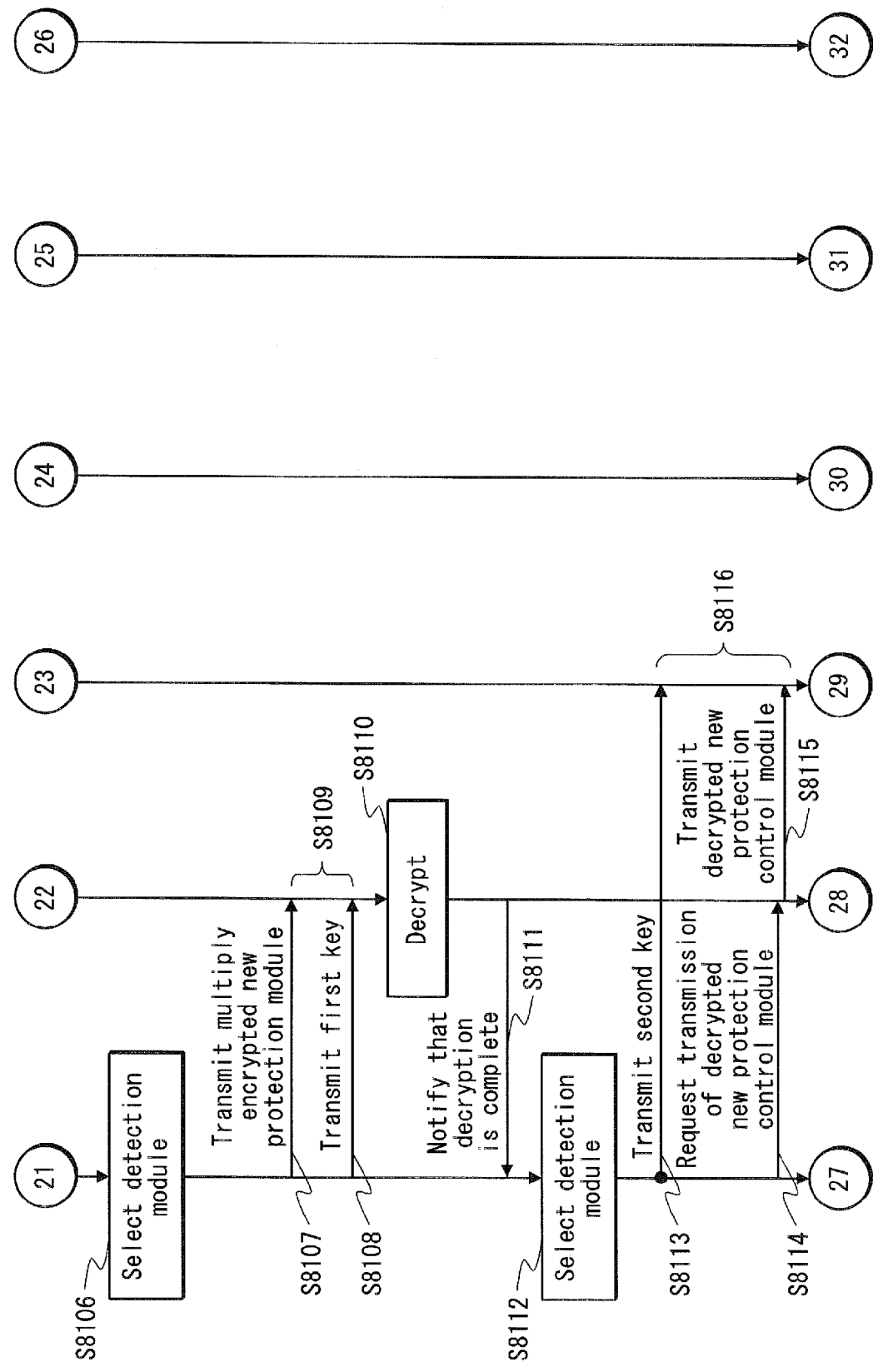
FIG. 52 is a sequence diagram showing updating and is continued in FIG. 53.
Figure 53:
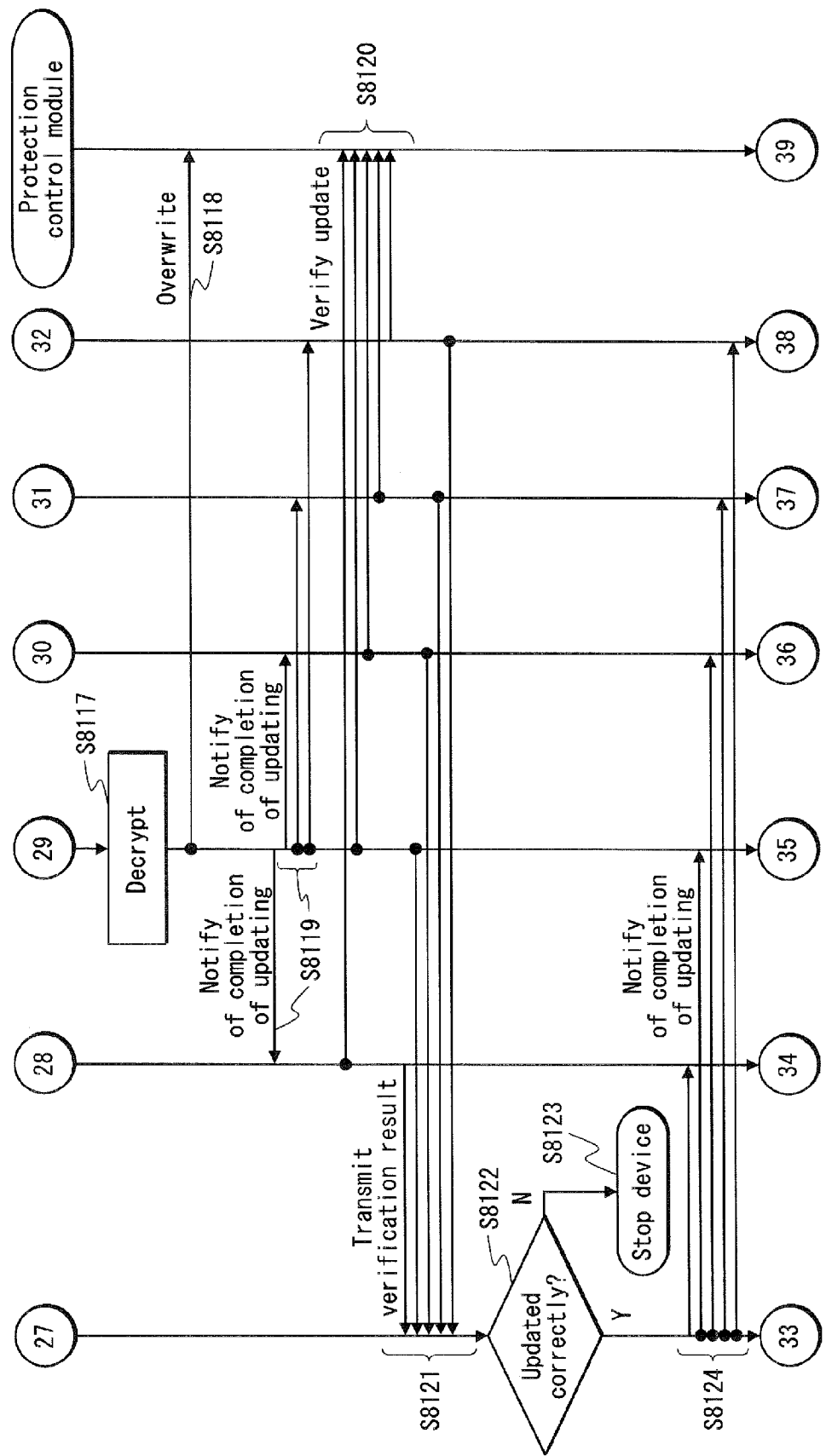
FIG. 53 is a sequence diagram showing updating and is continued in FIG. 54.
Figure 54:
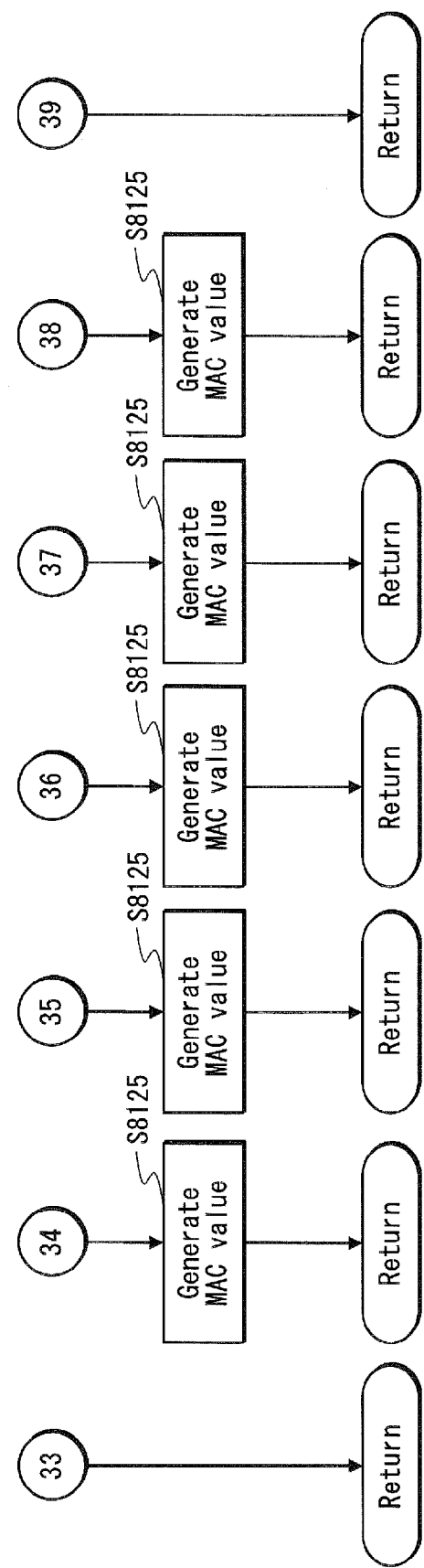
FIG. 54 is a sequence diagram showing updating and is continued from FIG. 53.

FIG. 50 is a flowchart showing recovery operations.

First, module identification (S300a) and updating (S8100) are performed in parallel.

Re-encryption processing to re-encrypt the encrypted applications 110 and 111 is then performed (S8200).

(a) Module Identification

Module identification during recovery is similar to operations for module identification in Embodiment 2, and therefore a description thereof is omitted. Note that this module identification may be the same as the module identification in Embodiment 1.

(b) Updating

Next, updating (S8100 in FIG. 50) is described in detail with reference to the sequence diagrams in FIGS. 51 to 54. Note that while FIGS. 51 to 54 show only the detection modules 131a, 132a, 133a, 134a, and 135a due to space constraints in the drawings, detection modules 136a and 137a also in fact perform processing.

First, the certificate generating unit 704 of the detection target module distribution unit 220a generates an update verification certificate using the signature private key (S8101).

The update verification certificate is for the detection modules 131*a*, 132*a*, . . . , and 137*a* to confirm whether the new protection control module has been installed properly. The detection target module distribution unit 220*a* transmits the generated certificate to the detection modules (S8102).

Next, the encryption key generation unit 708 in the detection target module distribution unit 220*a* generates two encryption keys (a first key and a second key) for multiply encrypting the new protection control module (S8103). The encryption unit 709 encrypts the new protection control module using the second key, thus generating an encrypted new protection control module (S8104). The encryption unit 709 then further encrypts the encrypted new protection control module using the first key, thus generating a multiply encrypted new protection control module (S8105).

The detection module selection unit 706 of the detection target module distribution unit 220*a* selects one of the detection modules in the detection module group 130*a* (S8106) and notifies the determination unit 210*a* of the identifier of the selected detection module. In this example, the detection module 131*a* is selected.

The detection target module distribution unit 220*a* transmits the multiply encrypted new protection control module (S8107) and the first key (S8108) to the selected detection module 131*a*.

The detection module 131*a* receives the multiply encrypted new protection control module and the first key (S8109). The detection module 131*a* decrypts the multiply encrypted new protection control module using the first key, thus acquiring the encrypted new protection control module (S8110). The detection module 131*a* then notifies the detection target module distribution unit 220*a* that decryption is complete (S8111).

Upon receiving the notification of completion of decryption (S8111), the detection target module distribution unit 220*a* selects a detection module from the detection module group 130*a* that differs from the detection module selected in S8106 (S8112). In this example, the detection module 132*a* is selected.

The detection target module distribution unit 220*a* transmits the second key to the selected detection module 132*a* (S8113). The detection target module distribution unit 220*a* also issues a request to the detection module 131*a* to transmit the encrypted new protection control module acquired in S8110 to the detection module 132*a* (S8114).

The detection module 131*a* receives the request from the detection target module distribution unit 220*a* and transmits the encrypted new protection control module to the detection module 132*a* (S8115).

The detection module 132*a* receives the second key from the detection target module distribution unit 220*a* and receives the encrypted new protection control module from the detection module 131*a* (S8116). The detection module 132*a* then decrypts the encrypted new protection control module using the second key, thus acquiring the new protection control module (S8117).

The detection module 132*a* overwrites the protection control module 120*a* with the new protection control module acquired in S8117, thereby updating the protection control module 120*a* (S8118). The detection module 132*a* then transmits a notification of completion of updating to the other detection modules (S8119).

Next, the detection modules 131*a*, 132*a*, . . . , and 137*a* verify whether the protection control module has been properly updated, using the already received update verification certificate (S8120). Furthermore, the detection modules notify the detection target module distribution unit 220*a* of the verification results (S8121).

The detection target module distribution unit 220*a* receives the verification results transmitted from the detection modules (S8121). The detection target module distribution unit 220*a* then determines whether the protection control module has been properly updated (S8122). When updating is determined not to have been performed correctly (S8121: N), the detection target module distribution unit 220*a* stops the device 100 (S8123).

When updating is determined to have been performed properly (S8122: Y), the detection target module distribution unit 220*a* notifies the detection modules of completion of updating (S8124).

Upon receiving the notification of completion of updating (S8124), the detection modules generate a MAC value for the new protection control module and write the generated MAC value in combination with the identifier of the protection control module in the MAC value table (S8125).

As explained above, during updating the detection target module distribution unit 220*a* multiply encrypts the new protection control module for updating with a plurality of keys before transmission to the detection module group 130*a*. The detection module group 130*a* updates the protection control module 120*a* with the received new protection control module.

During this process, the detection target module distribution unit 220*a* controls the timing at which the plurality of keys for decrypting the multiply encrypted new protection control module is transmitted to the detection module group 130*a*, making it difficult for an attacker to acquire the non-encrypted new protection control module.

(c) Relationship Between Module Identification and Updating

The above-described module identification and updating are performed in coordination with each other.

Module identification is performed periodically when the detection target module distribution unit 220*a* transmits the plurality of keys to detection modules included in the detection module group 130*a*, and when detection modules included in the detection module group 130*a* decrypt the encrypted new protection control module. The time intervals at which module identification is performed periodically are, for example, shorter intervals than the time for the protection control module used for updating to traverse the communication channel and be completely transmitted to an external device. For example, if transmission requires one second to complete, monitoring is performed at a shorter interval, such as 500 milliseconds.

Figure 55:
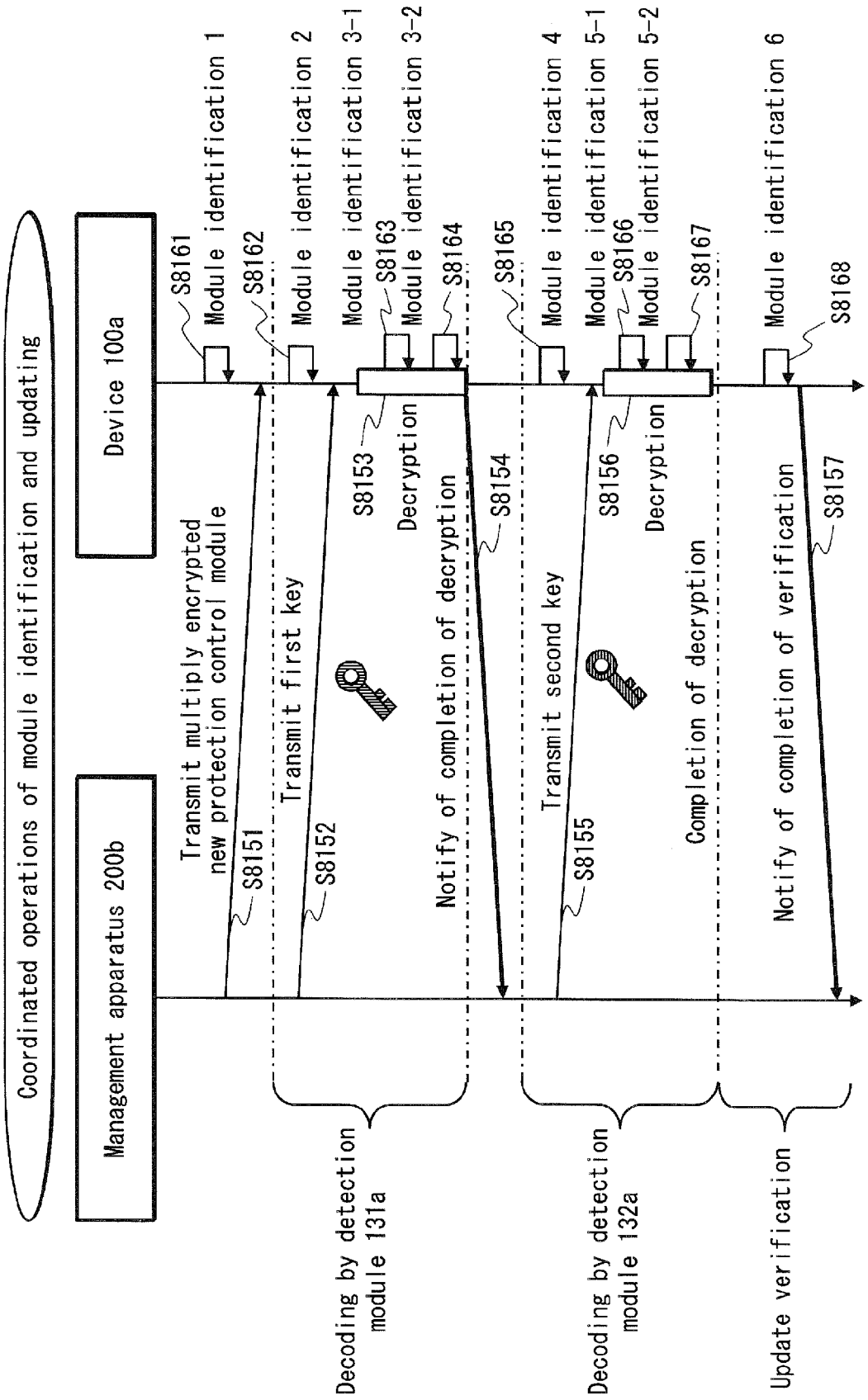
FIG. 55 illustrates coordination between updating and module identification.

The coordinated operations of module identification and updating are now described with reference to FIG. 55.

First, the device 100*a* performs module identification (module identification 1 (S8161)) before the multiply encrypted new protection control module is transmitted from the management apparatus 200*b* (S8151). This is so as not to select an invalid detection module that has been tampered with as the detection module for updating.

Subsequently, the device 100*a* performs module identification (module identification 2 (S8162)) before the detection module 131*a* receives the first key transmitted by the management apparatus 200*b* (S8162), thus confirming that an invalid detection module has not been selected before the device 100*a* receives the first key.

Furthermore, after the detection module 131*a* receives the first key (S8152), while the detection module 131*a* decrypts the multiply encrypted new protection control module using the first key (S8153), decryption is periodically suspended for module identification (module identification 3-1 (S8163), 3-2 (S8164)). Therefore, even if the detection modules 131*a*, 132*a*, . . . , and 137*a* are attacked during decryption, the attack is detected in time to prevent the entire encrypted new protection control module from being divulged.

Subsequent processing is the same as above. Specifically, the device 100*a* performs module identification (module identification 4 (S8165)) before the detection module 132*a* receives the second key transmitted by the management apparatus 200*b* (S8155), thus confirming that an invalid detection module has not been selected during updating before the device 100*a* receives the second key.

Furthermore, after the detection module 132*a* receives the second key (S8155), while the detection module 132*a* decrypts the multiply encrypted new protection control module using the second key (S8156), decryption is periodically suspended for module identification (module identification 5-1 (S8166), 5-2 (S8167)). Module identification is then performed one last time (module identification 6 (S8168)).

Next, the device 100*a* notifies the management apparatus 200*b* of the verification results (S8157).

Therefore, an attack on the detection modules is detected in time to prevent the entire new protection control module from being divulged.

If tampering is detected in one of the detection modules during module identification, recovery processing is terminated. This allows the management apparatus 200*b* to suspend transmission of the first key or the second key, thereby making it impossible for an attacker to acquire the keys for decrypting the doubly encrypted new protection control module. Note that if a valid module was identified during module identification, the identified valid module may be used to perform recovery again.

(d) Re-Encryption

Figure 56:
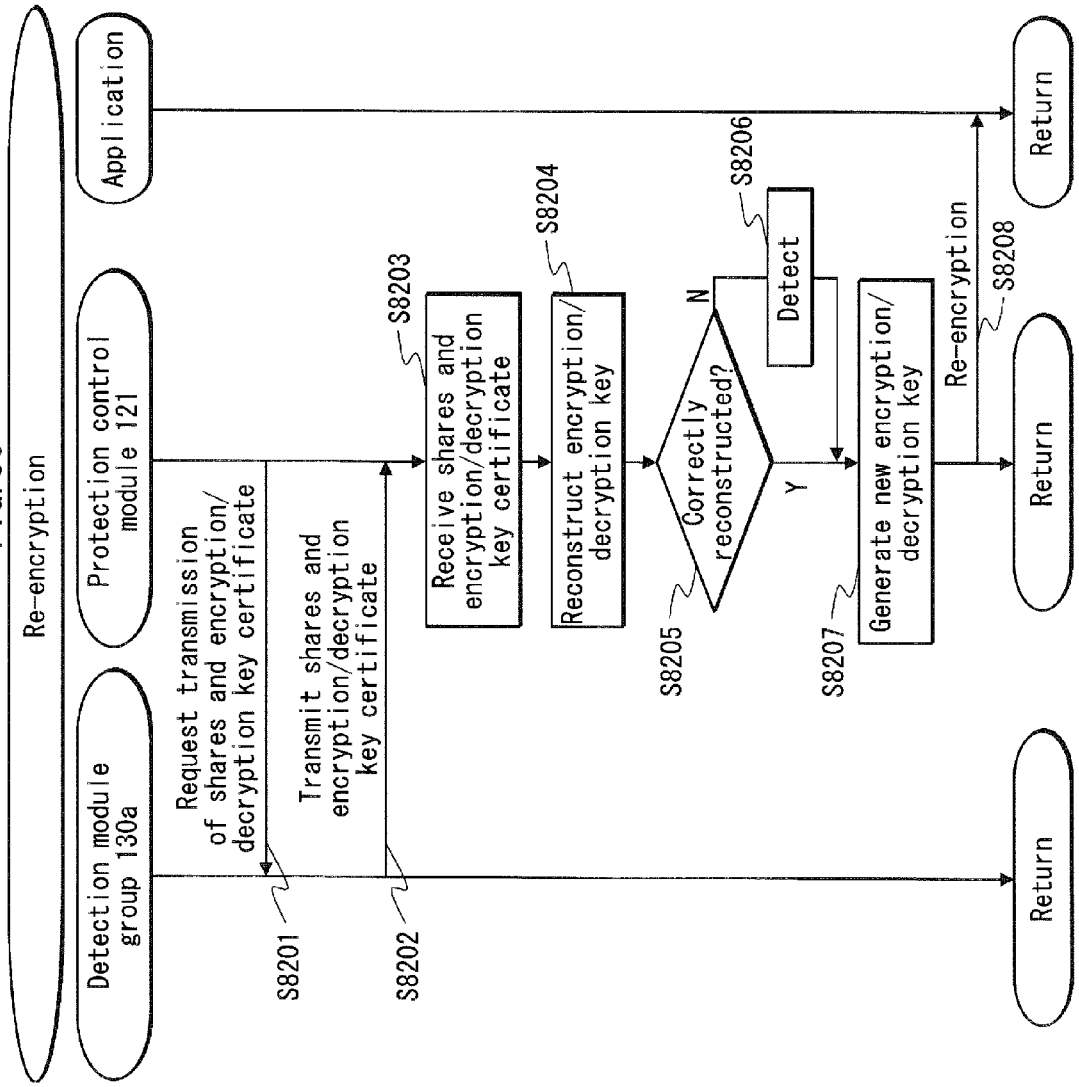
FIG. 56 is a sequence diagram showing re-encryption.

Next, re-encryption (S8200 in FIG. 50) is described in detail with reference to the sequence diagram in FIG. 56.

In the following description, the detection modules 131*a*, 132*a*, . . . , and 137*a* are collectively referred to as the detection module group 130*a*.

First, the updated protection control module (referred to in the description of FIG. 56 as the "protection control module 121" to distinguish from the protection control module 120*a* before updating) issues a request to the detection modules 131*a*, 132*a*, . . . , and 137*a* to transmit the shares and the encryption/decryption key certificate stored by each detection module (S8201).

Upon receiving the request from the protection control module 121, the detection modules 131*a*, 132*a*, . . . , and 137*a* transmit the shares and the encryption/decryption key certificates (S8202).

The protection control module 121 receives the shares and the encryption/decryption key certificates from the detection modules 131*a*, 132*a*, . . . , and 137*a* (S8203) and, from the received shares, reconstructs the encryption/decryption key (referred to here as the "old encryption/decryption key") used by the protection control module 120 before updating (S8204). The protection control module 121 also refers to the encryption/decryption key certificates to verify whether the old encryption/decryption key was properly reconstructed (S8205).

If the old encryption/decryption key was not properly reconstructed (S8205: N), the protection control module 121 detects the invalid detection module (i.e. identifies the detection module that transmitted an invalid share) (S8206). The management apparatus 200*b* is notified of the identified invalid detection module.

If the old encryption/decryption key was correctly reconstructed (S8205: Y), the encryption/decryption key generation unit 311 in the protection control module 121 generates a new encryption/decryption key (S8207). The decryption loading unit 304 decrypts the encrypted applications (110, 111) with the old encryption/decryption key and then re-encrypts the applications (110, 111) with the new encryption/decryption key (S8208).

Pages 50 to 52 of Patent Literature 2 contain a detailed description of both the method of reconstructing the old encryption/decryption key from the shares, as well as the method of identifying the invalid detection module. In order to employ the same method as in Patent Literature 2, the encryption/decryption key in Embodiment 3 can be made to correspond to the private key d, the protection control module 121 to the authentication authority device, and the detection modules 131*a*, 132*a*, . . . , and 137*a* to the share storing devices in Patent Literature 2.

Furthermore, the module identification in Embodiment 1 or 2 may be adopted as the method of identifying an invalid detection module in S8206.

(7) Next Round Preparation Operations

Figure 57:
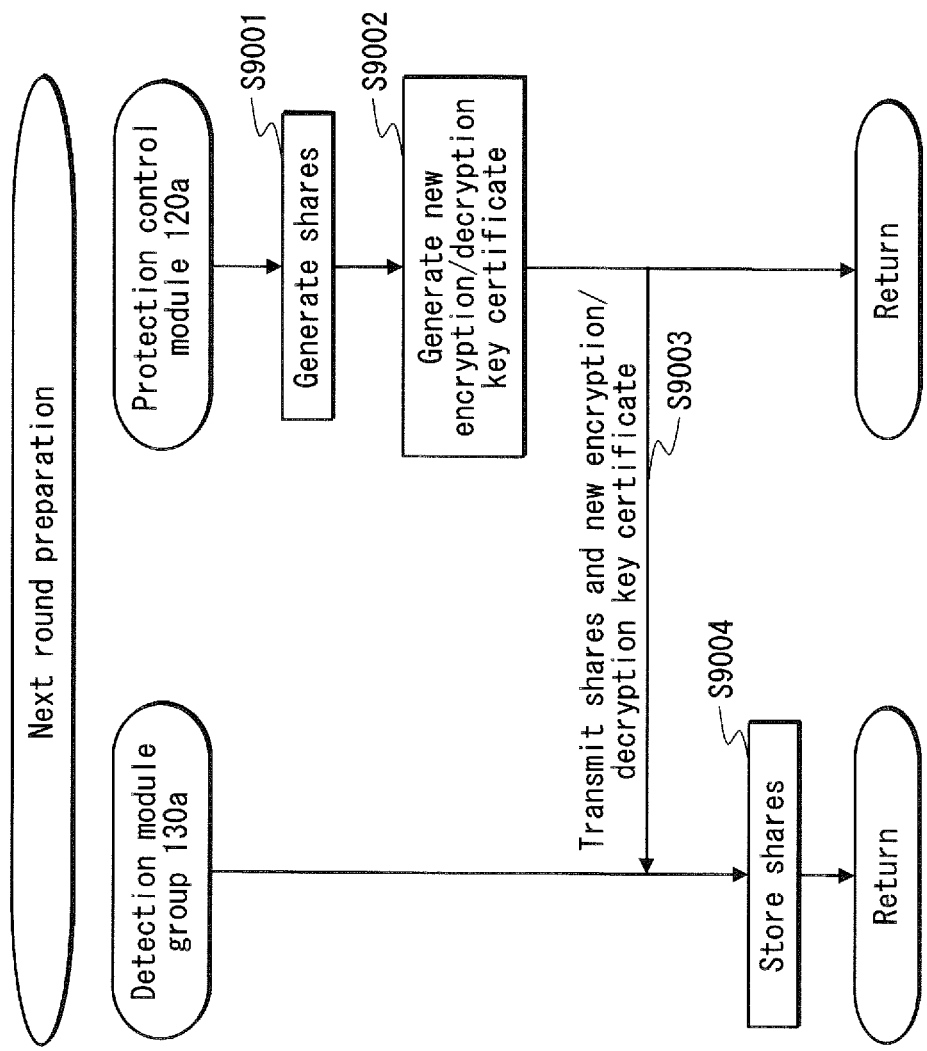
FIG. 57 is a sequence diagram showing next round preparation.

Next round preparation (S700 in FIG. 44) is described next in detail with reference to the sequence diagram in FIG. 57. During next round preparation, preparations are made for the next recovery after completion of the present recovery. The following describes an example.

First, the protection control module 121 generates shares from the new encryption/decryption key using the secret sharing scheme (S9001) and generates a new encryption/decryption key certificate using the signature private key (S9002). The protection control module 121 transmits the generated shares and encryption/decryption key certificate to the detection modules 131*a*, 132*a*, . . . , and 137*a* (S9003).

As during initialization, the same number of shares as the number of detection modules is generated, and shares are transmitted so that each detection module stores a different pair of shares. The same new encryption/decryption key certificate is transmitted to the detection modules 131*a*, 132*a*, . . . , and 137*a*.

Each of the detection modules 131*a*, 132*a*, . . . , and 137*a* receives the shares and the new encryption/decryption key certificate from the protection control module 121 and stores the received shares and new encryption/decryption key certificate in the share storage unit 410 (S9004).

3.4 Advantageous Effects of Embodiment 3

With the above embodiment, when tampering is detected in the protection control module 120*a*, the protection control module that has been tampered with is updated to a new protection control module, thus improving safety in the system.

Furthermore, the protection control module is updated more securely by identifying a valid module via the module identification of S300*a* and using the identified valid module to update the protection control module to a new protection control module. Security of the system is therefore further heightened.

4. Other Modifications

While the present invention has been described based on the above embodiments, the present invention is of course not limited to these Embodiments.

The present invention also includes cases such as the following.

(1) In Embodiment 3, the protection control module 120*a* is updated, but the present invention is not limited in this way.

Modules other than the protection control module 120*a*, such as detection modules, application programs, and the like, may be updated. The following describes updating of a detection module, using updating of the detection module 133*a* as an example.

During updating of a detection module, as when updating the protection control module, the detection target module distribution unit 220*a* multiply encrypts, using a plurality of keys, an updated detection module for updating the detection module 133*a* and transmits the updated detection module to a detection module in the detection module group 130*a* (other than the detection module 133*a*). A detection module included in the detection module group 130*a* (other than the detection module 133*a*) updates the detection module 133*a* with the updated detection module.

At this time, the detection target module distribution unit 220*a* controls the timing of transmission of the plurality of keys for decrypting the multiply encrypted updated detection module to the detection module included in the detection module group 130*a*, so that an attacker cannot acquire the unencrypted updated detection module.

(2) In the above embodiments, the detection modules each include units such as the reception unit 401, the transmission unit 402, the control unit 403, the verification unit 404, the MAC value generation unit 405, the MAC value table updating unit 406, the detection target module installation unit 407, and the update unit 408. However, the detection modules are not limited in this way.

Each detection module may include only constituent elements necessary for monitoring (the control unit 403 and the verification unit 404). Alternatively, each detection module may include only constituent elements necessary for updating (the control unit 403 and the update unit 408). Each detection module may instead include only constituent elements necessary for deactivation (the control unit 403 and the update unit 408).

Furthermore, each detection module may be a combination of the above structures.

In this case, the plurality of detection modules included in the detection module group should be structured as a whole to include the constituent elements necessary for monitoring and updating.

(3) In the above embodiments, the verification unit in each detection module performs a tampering check on other detection modules and on the protection control module, but the target of the tampering check is not limited to these modules.

The target of the tampering check may be a portion of the detection modules, such as data corresponding to a specific capability, function, key, etc. Furthermore, the tampering check need not be performed at once for the entire target, but may be performed for a portion of the target. In this case, a tampering check may be performed on portions obtained by dividing the target of the tampering check into portions of a predetermined size, or obtained by dividing by capability or function. Furthermore, each tampering check may be performed on one of a plurality of portions of the target of the tampering check selected in order. Alternatively, the portion on which the tampering check is performed may be selected at random each time. Another module, or an apparatus external to the device, may indicate the portion on which to perform the tampering check, and the tampering check may then be performed on the indicated portion.

(4) In the above embodiments, the detection modules and the protection control module may operate in a region protected from attacks, such as a tamper-resistant region.

In the case that a detection module having only the constituent elements necessary for monitoring operates in a region protected from attack, when another detection module or the determination unit of the management apparatus receives, from the detection module located in the protected region, notification of detection of an attack on another detection module or the protection control module, the other detection module or the determination unit may receive the notification unconditionally and perform updating or deactivation. The other detection module or the determination unit may also treat the notification as being more important than notification from other modules when determining whether to perform updating or deactivation.

The protection control module may operate in protected mode, i.e. may operate in a tamper-resistant region. The detection modules may operate in normal mode, i.e. may operate in a region that is not tamper resistant.

(5) In the above embodiments, the module deactivation unit is located in the management apparatus, and the access control module is located in the device, but the present invention is not limited in this way.

The module deactivation unit and the access control module may both be located within the device or in the management apparatus. The module deactivation unit and the access control module may also be located within the detection modules.

The module deactivation unit and the access control module need not be separate modules, but may be one module within the device or the management apparatus.

When the module deactivation unit and the access control module are one module, the access information may be transmitted directly to the detection module that performs deactivation, without transmitting the access information acquisition key and the encrypted access information.

Furthermore, when located in the device, the module deactivation unit or the access control module may be located in a region protected from attack by, for example, tamper resistance.

(6) In the above embodiments, the management apparatus includes a determination unit, detection target module distribution unit, module deactivation unit, communication unit, monitoring pattern update unit, and the like, but the management apparatus is not limited in this way. The determination unit, detection target module distribution unit, module deactivation unit, communication unit, monitoring pattern update unit, and the like may be structured as one module. The above components may be combined with each other.

(7) In the above embodiments, the detection system or the software updating system initializes the device at the time of manufacturing, but initialization is not limited in this way. Initialization may be performed at some point after shipping, such as after selling. Furthermore, initialization may be performed not only once, but two or more times.

(8) In the above embodiments, the tampering detection certificates for the protection control module and the detection modules, the verification certificate for the detection target module, the update verification certificate, and the authentication key certificate for the authentication public key are generated by referring to the signature private key stored by the detection target module distribution unit, but these certificates are not limited in this way. The certificates may be generated using separate keys, or may be issued by a certificate issuing device other than the detection target module distribution unit 220.

(9) In Embodiment 3, during initialization and next round preparation, shares generated from the encryption/decryption key are transmitted to the detection modules, which store the shares. The present invention, however, is not limited in this way.

Instead of detection modules, application programs may store shares, or both detection modules and application programs may store shares.

(10) In the above embodiments, when performing tampering detection on the protection control module, the detection modules use the MAC value calculated using the verification key, but tampering detection is not limited in this way.

Verification may use the tampering detection certificate of the protection control module. Furthermore, instead of tampering verification using a hash value such as a MAC value or a certificate, tampering detection may be performed by checking a log.

(11) In the above embodiments, when a detection module detects tampering in the protection control module, the update module notifies the determination unit of the management apparatus and other detection modules, but the present invention is not limited in this way.

The detection module may notify at least one module from among the determination unit and the other detection modules. When tampering is detected in the protection control module, the detection modules, the device, or the protection control module may be stopped. Furthermore, a protection control module that has been tampered with may be deleted.

When a detection module does not detect tampering in the protection control module, the detection module provides no notification to the determination unit, but the present invention is not limited in this way. The update module may provide notification that tampering was not detected as a result of tampering detection.

(12) In the above Embodiments, each detection module does not transmit the results of tampering detection on the protection control module to other detection modules during detection, but alternatively the detection modules may share detection results.

When a detection module does not share detection results, the detection module may be determined to be an invalid detection module and be deactivated.

(13) In Embodiment 3, during analysis and determination, it is determined whether to update the protection control module based on tampering information, but the present invention is not limited in this way.

It may be determined whether to update based on the number of detection modules that notify of tampering. For example, it may be determined to perform updating when the number of detection modules notifying of tampering is at least a predetermined number, and not to perform updating otherwise. The predetermined number is the number of all of the detection modules included in the detection module group.

Furthermore, during analysis and determination, it is determined whether to update the protection control module and whether to deactivate the protection control module, but analysis and determination are not limited in this way. It may also be determined whether to stop the device.

(14) In Embodiment 3, during mutual authentication, each detection module performs authentication on the detection target module distribution unit, and subsequently, the detection target module distribution unit performs authentication on each detection module, but mutual authentication is not limited in this way.

The detection target module distribution unit may perform authentication on each detection module, and subsequently, each detection module may perform authentication on the detection target module distribution unit. Alternatively, the detection modules and the detection target module distribution unit may perform authentication on each other on an individual basis.

(15) In Embodiment 3, during mutual authentication, the detection target module distribution unit performs authentication on each of the update modules using challenge data having a different value for each detection module, but mutual authentication is not limited in this way. The same value may be used for challenge data for all of the detection modules, or the detection modules may be divided into a plurality of groups, with challenge data having a different value for each group.

(16) In Embodiment 3, during mutual authentication, each detection module performs authentication on the detection target module distribution unit individually, but mutual authentication is not limited in this way.

Each detection module may notify other detection modules of the result of signature verification, thereby sharing the verification results between detection modules, and a detection module may determine whether the detection target module distribution unit is valid based on the verification results of the detection module itself and verification results received from other detection modules.

The method of determination may, for example, be to determine that the detection target module distribution unit is valid when verification is successful for a predetermined number (such as a majority) of the detection modules, and to determine that the detection target module distribution unit is not valid otherwise.

(17) In Embodiment 3, the management apparatus performs mutual authentication using the signature private key and the signature public key, but the present invention is not limited in this way. Other than the signature private key and the signature public key, the authentication key pair used during mutual authentication may be used.

In this case, the authentication public key in the authentication key pair for the update server may be stored in advance by one detection module or may be transmitted from the management apparatus to a detection module at the time of mutual authentication.

(18) In Embodiment 3, during mutual authentication, it is determined whether to perform recovery based on whether the number of detection modules verified as being valid is at least the number necessary for recovery, but the present invention is not limited in this way.

It may be determined whether to perform recovery based on whether the number of invalid detection modules is less than a predetermined allowable number.

Furthermore, during mutual authentication, when the number is determined not to be the required minimum for recovery, the device is stopped in the above Embodiments, but alternatively, the detection modules may be deactivated.

(19) In Embodiment 3, during mutual authentication, when the detection target module distribution unit performs authentication on each detection module, each detection module transmits response data along with the authentication public key and the authentication key certificate to the detection target module distribution unit, but mutual authentication is not limited in this way.

Each detection module may transmit the response data, the authentication public key, and the authentication key certificate at separate times.

Furthermore, the detection modules may send the authentication public key and the authentication key certificate only when requested by the detection target module distribution unit to do so. In this case, the detection target module distribution unit may receive the authentication public key and the authentication key certificate from all of the detection modules, from the predetermined number of detection modules necessary for recovery, or from fewer than the predetermined allowable number of invalid detection modules.

(20) In Embodiment 3, during recovery, module identification is performed twice during each decryption (module identification 3-1, 3-2, 5-1, 5-2), but the present invention is not limited in this way. Module identification may be performed any number of times in accordance with the duration of decryption, and other than during decryption, module identification may be performed when receiving a key or the updated protection control module, when performing detection, or during mutual authentication.

Although module identification has been described as being performed regularly at predetermined intervals, module identification is not limited in this way. Updating may be divided into a plurality of blocks, and module identification may be performed at the end of processing for each block, at random intervals, or at intervals specified by the management apparatus.

Each detection module may acquire synchronization information indicating the timing of module identification from an external server and perform module identification in accordance with the acquired synchronization information. In this way, each detection module performs monitoring at the same time as other detection modules, thus improving the accuracy of detection of an invalid detection module.

Furthermore, the frequency of detection may vary between normal processing and recovery. The frequency of detection may also vary during recovery.

(21) In Embodiment 3, the invalid-module assumption unit 673 randomly selects a detection module in the detection module group 130a, but the present invention is not limited in this way. The invalid-module assumption unit 673 may select a detection module determined by many other detection modules to be valid. Since the detection module is determined to be valid by many detection modules, the number of detection modules in the assumed invalid detection module group increases. This reduces the number of update modules selected in step S9014, thereby increasing efficiency.

(22) In Embodiments 2 and 3, when not all detection modules are selected in step S5107, one other detection module is selected in step S5101 at random, but the present invention is not limited in this way.

A detection module other than the detection modules in the assumed invalid detection module group in step S5103 of the previous valid module identification may be selected. Since it is known that no contradiction occurs among detection modules in the assumed invalid detection module group in the previous valid module identification, no valid detection module can be identified by selecting, in step S5101, a detection module in the assumed invalid detection module group.

Avoiding selection of a detection module that cannot be used to identify a valid detection module increases processing efficiency.

(23) In each of the above embodiments, during detection target module monitoring, invalid modules are extracted by the determination unit based on detection results for one instance of tampering detection performed on the detection target module, but the present invention is not limited in this way.

Tampering detection may be performed multiple times on the detection target module, and invalid modules may be extracted by the determination unit based on the multiple detection results.

The following describes an example of three instances of tampering detection.

FIG. 58 shows the first tampering detection results 756 for the detection target module. As a result, the detection modules 132, 134, 135, and 137 are extracted as invalid modules. Based on these results, the determination module stores the module identification information 641 shown in FIG. 59 in the module identification information storage unit.

Next, based on the module identification information 641, the determination unit instructs the detection modules 131, 133, and 136, which have not been identified as invalid modules, to perform tampering detection (the second tampering detection) on the detection target module.

Figure 60:
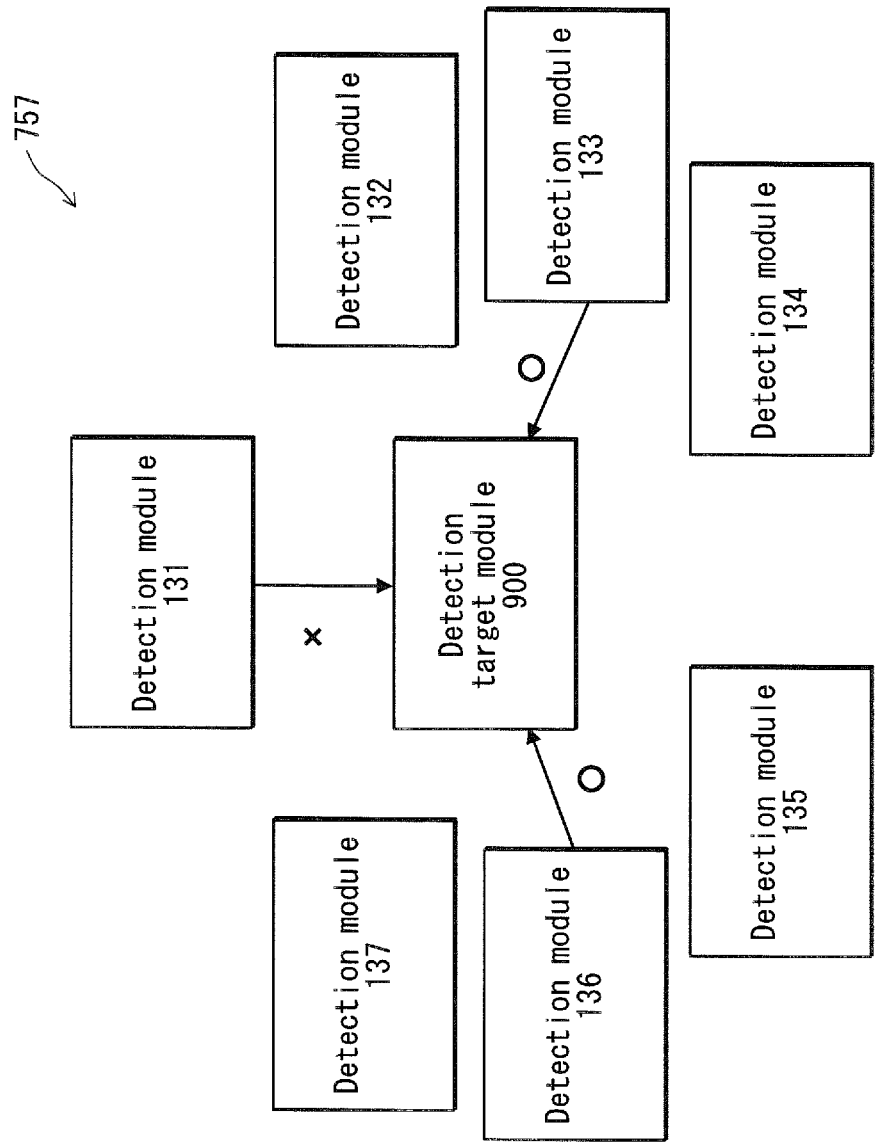
FIG. 60 shows an example of monitoring results 757 by detection modules for the detection target module 900*a* in Modification (23).

FIG. 60 shows the second tampering detection results 757 for the detection target module. As a result, the detection modules 133 and 136 are newly extracted as invalid modules. Based on these results, the determination module stores the module identification information 651 shown in FIG. 61 in the module identification information storage unit. Next, based on the module identification information 651, the determination unit instructs the detection module 131, which has not been identified as an invalid module, to perform tampering detection (the third tampering detection) on the detection target module.

Figure 62:
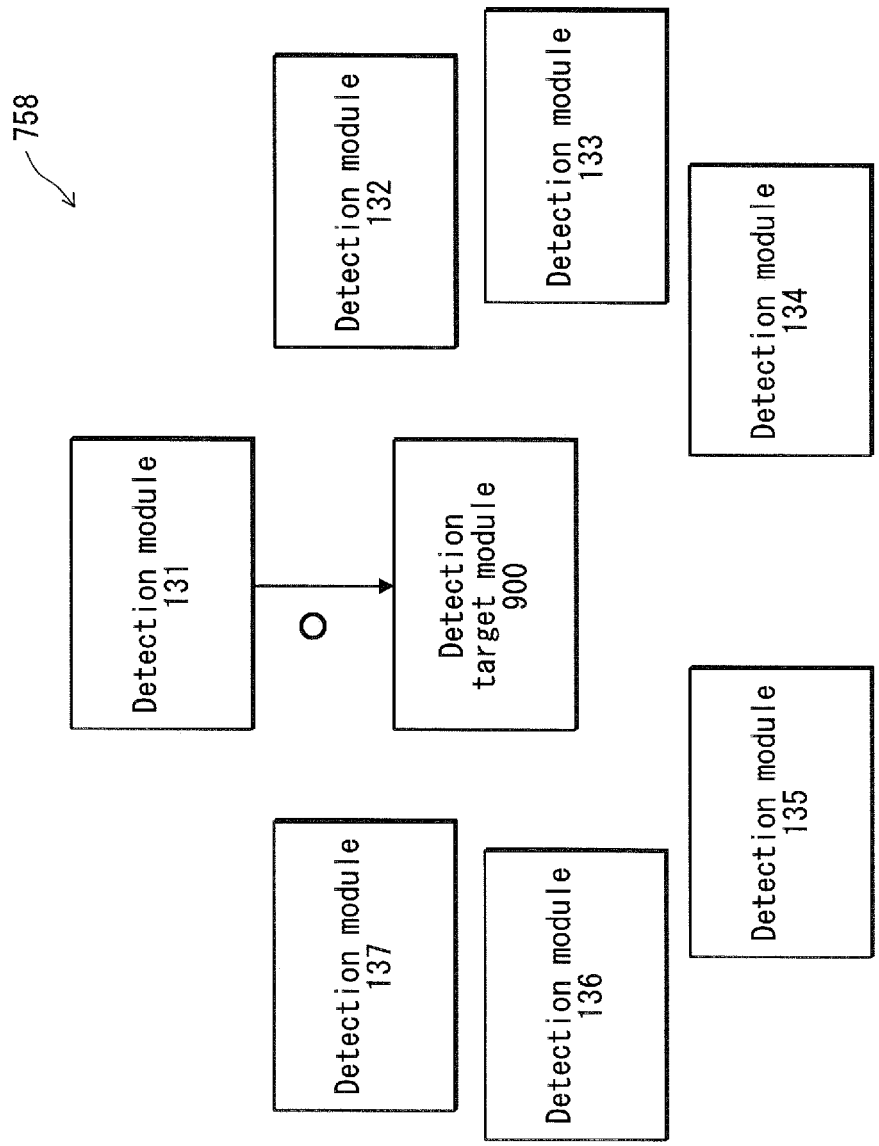
FIG. 62 shows an example of monitoring results 758 by detection modules for the detection target module 900*a* in Modification (23).

FIG. 62 shows the third tampering detection results 758 for the detection target module. As a result, the detection module 131 is newly extracted as an invalid module. Since all of the detection modules are invalid, the determination in step S3402 is Y, an error is output, and the device is stopped.

Thus performing tampering detection on the detection target module multiple times increases the accuracy of extraction of invalid modules. Furthermore, it becomes possible to avoid performing valid module identification when no valid module exists, since the accuracy of determination of whether all of the detection modules are invalid also increases. Security of the system is therefore further heightened.

(24) In the above embodiments, one verification certificate is attached to the detection target module 900, as shown in FIG. 21, but the verification certificate is not limited in this way. A plurality of verification certificates may be attached.

The following describes attachment of two verification certificates.

Figure 63:
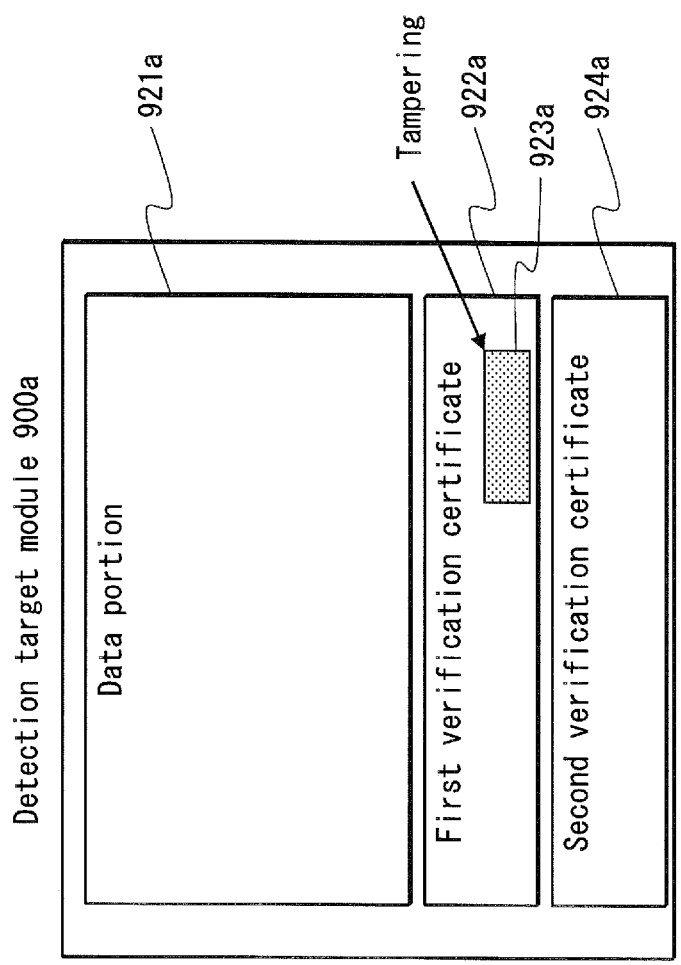
FIG. 63 illustrates the data structure of a detection target module 900*a* in Modification (24).

FIG. 63 shows the data structure of a detection target module 900a. In FIG. 63, a first verification certificate 922a and a second verification certificate 924a are attached to the detection target module 900a. A portion 923a of the first verification certificate 922a is tampered with so that the first verification certificate 922a does not correspond to the data portion 921a of the detection target module 900a, whereas the second verification certificate 924a is correctly generated so as to correspond to the data portion 921a of the detection target module 900a.

The detection target module distribution unit installs the detection target module 900a in the device without notifying the detection module group of which one of the first verification certificate 922a and the second verification certificate 924a is the valid certificate that properly corresponds to the detection target module 900a. Furthermore, the determination unit causes each detection module to perform tampering detection using the two verification certificates and receives the tampering detection results. Based on the tampering detection results for the two verification certificates, the determination unit determines whether each detection module is invalid.

For example, if the tampering detection results indicate a result of "valid" for the properly corresponding verification certificate (in this case, the second verification certificate 924a) and a result of "invalid" for the non-corresponding verification certificate (in this case, the first verification certificate 922a), the detection module transmitting the tampering detection results may be determined to be "valid", and otherwise, the detection module may determined to be "invalid".

The case of the properly corresponding verification certificate (the second verification certificate 924a) not being properly installed due to being blocked by an invalid detection module may be taken into consideration. In other words, even if the result for the first verification certificate 922a is "invalid", if the result for the second verification certificate 924a is "invalid", the detection module transmitting the tampering detection results may be designated as "possibly invalid", and the management apparatus may manage the detection module by, for example, recording the identification number thereof.

In subsequent module identification, based on the determination of "possibly invalid", invalid module identification or valid module identification may be performed.

Note that in the above modification, the first verification certificate 922a is tampered with, but the modification is not limited in this way. Two detection target modules may be installed in the detection module group, one properly corresponding to the verification certificate and the other not corresponding to the verification certificate, and each detection module may be caused to perform tampering detection on the detection target modules. It is also possible to tamper with the data section of the detection target module without tampering with the verification certificate.

Furthermore, instead of two verification certificates, three or more verification certificates may be used. When a detection module is caused to perform tampering detection multiple times on the detection target module, the determination unit may instruct the detection module to change the verification certificate used for tampering detection. Between the multiple instances of tampering detection, an additional verification certificate may be transmitted, and the detection module may be caused to perform tampering detection using the additional verification certificate.

When a detection module is caused to perform tampering detection multiple times on the detection target module, a different combination of properly corresponding (hereinafter "valid") and of non-corresponding (hereinafter "invalid") verification certificates may be used each time. For example, for the case of three verification certificates, the three verification certificates used each time may be selected from among eight patterns: (valid, valid, valid), (valid, valid, invalid), (valid, invalid, valid), (valid, invalid, invalid), (invalid, valid, valid), (invalid, valid, invalid), (invalid, invalid, valid), (invalid, invalid, invalid). In this case, the pattern (valid, invalid, valid) refers to the first verification certificate being valid, the second verification certificate being invalid, and the third verification certificate being valid.

(25) In Embodiments 2 and 3, during valid module identification, an invalid detection module identified as being invalid during invalid module determination is not included in the mutual monitoring pattern, but processing is not limited in this way.

A detection module not identified as invalid may monitor an invalid detection module, and a determination may be made based on the monitoring results. In this case, if the monitoring results indicate that the invalid detection module is valid, the detection module monitoring the invalid detection module may be identified as invalid. Subsequently, the valid module identification in FIG. 33 may be performed. This allows for identification of invalid modules that could not be clearly identified, thus improving the accuracy of valid module identification.

(26) The following structure may be adopted.

Figure 64:
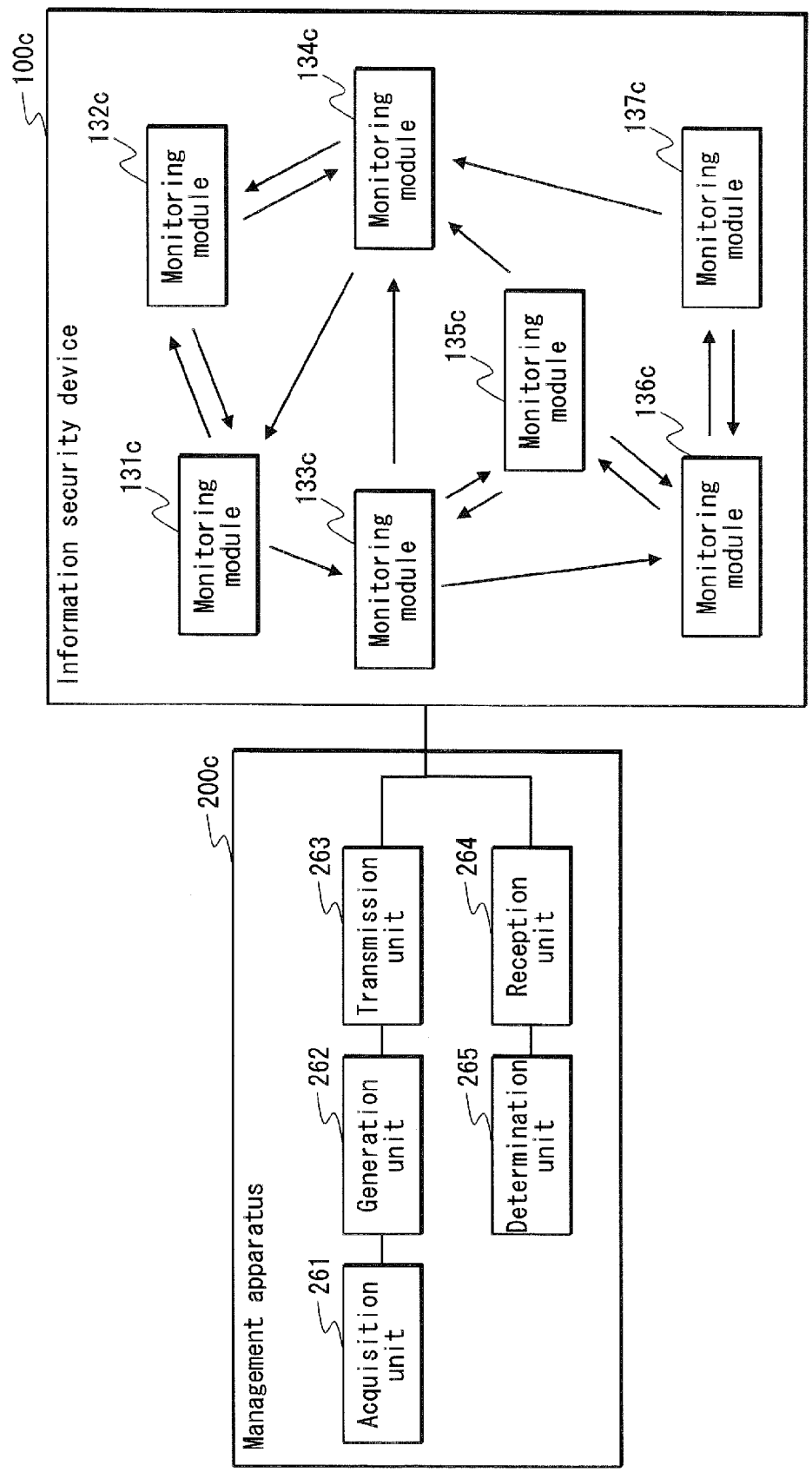
FIG. 64 is an overall structure diagram showing the structure of a tampering monitoring system 10*c*.

(a) As shown in FIG. 64, a tampering monitoring system 10c includes a management apparatus 200c and an information security apparatus 100c.

The information security apparatus 100c has a plurality of monitoring modules 131c, 132c, . . . , 137c that monitor for tampering, as shown in FIG. 64.

The management apparatus 200c manages the information security apparatus 100c.

As shown in FIG. 64, the management apparatus 200c is provided with an acquisition unit 261, a generation unit 262, a transmission unit 263, a reception unit 264, and a determination unit 265.

The acquisition unit 261 newly acquires a monitoring module that has not been tampered with.

The generation unit 262 generates a decoy monitoring module by modifying the acquired monitoring module.

The transmission unit 263 transmits the generated decoy monitoring module to the information security apparatus 100c and causes the information security apparatus 100c to install the decoy monitoring module therein.

After the decoy monitoring module has been installed, the reception unit 264 receives, from the information security apparatus 100c, monitoring results generated by the monitoring modules each monitoring one or more of the other monitoring modules.

The determination unit 265 identifies, by referring to the received monitoring results, a monitoring module that determines the decoy monitoring module to be valid and determines the identified monitoring module to be invalid.

(b) The tampering monitoring system 10c may operate as follows.

The generation unit 262 generates the decoy monitoring module to include an invalid verification certificate.

The transmission unit 263 transmits the decoy monitoring module that includes the invalid verification certificate to the information security apparatus 100c and causes the information security apparatus 100c to install the decoy monitoring module therein.

Each monitoring module in the information security apparatus 100c determines whether the decoy monitoring module has been tampered with by referring to the verification certificate included in the decoy monitoring module.

The following structure may also be adopted.

The monitoring module acquired by the acquisition unit 261 includes a verification certificate that certifies the authenticity of the monitoring module.

The generation unit 262 generates the decoy monitoring module to include a modified verification certificate by modifying the verification certificate included in the monitoring module.

The transmission unit 263 transmits the decoy monitoring module that includes the modified verification certificate to the information security apparatus 100c and causes the information security apparatus 100c to install the decoy monitoring module therein.

Each monitoring module in the information security apparatus 100c determines whether the decoy monitoring module has been tampered with by referring to the verification certificate included in the decoy monitoring module.

(c) The tampering monitoring system 10c may operate as follows.

The generation unit 262 generates random data and sets the modified verification certificate to be the generated random data.

(d) The tampering monitoring system 10c may operate as follows.

The generation unit 262 generates the modified verification certificate by generating random data and overwriting a part of the verification certificate included in the monitoring module acquired by the acquisition unit 261 with the generated random data.

(e) The tampering monitoring system 10c may operate as follows.

The management apparatus 200c may further include a detection unit, a first assumption unit, a second assumption unit, and a determination unit.

The detection unit detects whether any valid monitoring module that has not been tampered with exists by referring to received monitoring results.

The first assumption unit selects, when the detection unit detects existence, a monitoring module among the plurality of monitoring modules and assumes that the selected monitoring module has been tampered with.

The second assumption unit applies a procedure in a chained sequence to monitoring modules other than the selected monitoring module by referring to the monitoring results, starting from the selected monitoring module, the procedure being to assume that any monitoring module determining that a monitoring module assumed to have been tampered with is valid has also been tampered with.

The determination unit determines whether, as a result of the procedure by the second assumption unit, all of the monitoring modules are assumed to have been tampered with, and when determining positively, determines the selected monitoring module to be a valid monitoring module that has not been tampered with.

(f) The tampering monitoring system 10c may operate as follows.

The management apparatus 200c further includes a deactivation unit.

The deactivation unit outputs a deactivation instruction for a monitoring module identified as invalid.

(g) The tampering monitoring system 10c may operate as follows.

The management apparatus 200c is further provided with a storage unit. The storage unit pre-stores one or more monitoring modules that have not been tampered with. The acquisition unit 261 acquires a monitoring module by reading a monitoring module that has not been tampered with from the storage unit.

The following structure may also be adopted.

The management apparatus 200c is connected to a server device provided with a storage unit. The storage unit of the server device pre-stores a monitoring module that has not been tampered with. The acquisition unit 261 acquires the monitoring module from the server device.

(h) The management apparatus 200c corresponds to the management apparatus 200 and the information security apparatus 100c to the device 100 in Embodiment 1.

The management apparatus 200c also corresponds to the management apparatus 200a and the information security apparatus 100c to the device 100 in Embodiment 2.

Furthermore, the management apparatus 200c corresponds to the management apparatus 200b and the information security apparatus 100c to the device 100a in Embodiment 3.

(27) The following structure may be adopted.

An aspect of the present invention is a management apparatus for managing an information security apparatus that includes a plurality of monitoring modules that monitor for tampering, the management apparatus comprising: an acquisition circuit configured to acquire a new monitoring module that has not been tampered with; a generation circuit configured to generate a decoy monitoring module by modifying the acquired monitoring module; a transmission circuit configured to transmit the decoy monitoring module to the information security device and cause the information security device to install the decoy monitoring module therein; a reception circuit configured to receive from the information security device, after the decoy monitoring module has been installed, monitoring results generated by the monitoring modules monitoring other monitoring modules; and a determination circuit configured to identify, by referring to the received monitoring results, a monitoring module that determines the decoy monitoring module to be valid and to determine the identified monitoring module to be invalid.

An aspect of the present invention is an integrated circuit for managing an information security apparatus that includes a plurality of monitoring modules that monitor for tampering, the integrated circuit comprising: an acquisition circuit configured to acquire a new monitoring module that has not been tampered with; a generation circuit configured to generate a decoy monitoring module by modifying the acquired monitoring module; a transmission circuit configured to transmit the decoy monitoring module to the information security device and cause the information security device to install the decoy monitoring module therein; a reception circuit configured to receive from the information security device, after the decoy monitoring module has been installed, monitoring results generated by the monitoring modules monitoring other monitoring modules; and a determination circuit configured to identify, by referring to the received monitoring results, a monitoring module that determines the decoy monitoring module to be valid and to determine the identified monitoring module to be invalid.

An aspect of the present invention is a management apparatus for managing an information security apparatus that includes a plurality of monitoring modules that monitor for tampering, the management apparatus comprising: a memory unit storing a computer program composed of a combination of a plurality of computer commands; and a processor configured to read the computer commands from the computer program stored in the memory unit one at a time, interpret each computer command, and operate in response to the result of interpretation. The computer program causes a computer to perform the steps of: acquiring a new monitoring module that has not been tampered with; generating a decoy monitoring module by modifying the acquired monitoring module; transmitting the decoy monitoring module to the information security device and causing the information security device to install the decoy monitoring module therein; receiving from the information security device, after the decoy monitoring module has been installed, monitoring results generated by the monitoring modules monitoring other monitoring modules; and identifying, by referring to the received monitoring results, a monitoring module that determines the decoy monitoring module to be valid and determining the identified monitoring module to be invalid.

An aspect of the present invention is a computer-readable non-transitory recording medium having recorded thereon a computer program used in a management apparatus for managing an information security apparatus that includes a plurality of monitoring modules that monitor for tampering. The computer program causes a computer to perform the steps of: acquiring a new monitoring module that has not been tampered with; generating a decoy monitoring module by modifying the acquired monitoring module; transmitting the decoy monitoring module to the information security device and causing the information security device to install the decoy monitoring module therein; receiving from the information security device, after the decoy monitoring module has been installed, monitoring results generated by the monitoring modules monitoring other monitoring modules; and identifying, by referring to the received monitoring results, a monitoring module that determines the decoy monitoring module to be valid and determining the identified monitoring module to be invalid.

(28) The following structure may be adopted.

An aspect of the present invention is a management apparatus for identifying an invalid module among a plurality of detection modules operating on an information processing device connected to the management apparatus over a network, the management apparatus comprising: a transmission unit configured to transmit a detection target module and verification data for the detection target module; a reception unit configured to receive, from the plurality of detection modules, which verify the detection target module, results of verification of a correspondence relationship between the detection target module and the verification data for the detection target module; and an invalid-module identification unit configured to identify, as an invalid module, a detection module whose results of verification indicate that the correspondence relationship is valid, wherein the verification data is data that does not correspond to the detection target module.

With this structure, each detection module verifies the detection target module, and the management device can detect, by referring to the results, an invalid detection module, thus increasing reliability of the detection system.

The management apparatus may further comprise a deactivation unit configured to output an instruction to deactivate an identified invalid module.

By thus deactivating a detection module detected as being invalid, the information processing device operates without being obstructed by invalid detection modules, thus increasing reliability of the information processing device.

The verification data may be a verification certificate for the detection target module, and the management apparatus may further comprise a verification certificate generation unit configured to generate the verification certificate.

With this structure, the detection modules perform verification using the verification certificate generated by the management apparatus, thus increasing reliability of the information processing device that is managed by the management apparatus.

The verification certificate generation unit may generate the verification certificate by tampering with a valid certificate corresponding to the detection target module.

With this structure, the management apparatus can easily generate non-corresponding verification data.

The verification certificate generation unit may generate random data and as the verification certificate.

With this structure, the management apparatus can easily generate non-corresponding verification data.

The management apparatus may further comprise: an invalid module group storage unit for storing identifiers of identified invalid detection modules; and a valid module identification unit configured to assume that one of the plurality of detection modules is an invalid module and identify a valid detection module in the information processing device based on the assumption. The invalid module identification unit may identify all of the invalid detection modules in the information processing device and record identifiers of the identified modules in the invalid module group storage unit. The valid module identification unit may comprise: an assumed invalid module group storage unit for storing identifiers of detection modules assumed to be invalid; an assumption unit configured to select one of the plurality of detection modules, assume the selected detection module to be invalid, and record the identifier thereof in the assumed invalid module group storage unit; an assumed invalid module group generation unit configured to apply a procedure in a chained sequence by referring to the monitoring results, starting from the module assumed to be invalid by the assumption unit, the procedure being to assume that a module that determines any module assumed to be invalid to be valid is also invalid and recording the identifier of the module in the assumed invalid module group storage unit; a contradiction detection unit configured to determine whether a contradiction occurs whereby identifiers of all of the detection modules in the information processing device are included among the identifiers recorded in the invalid module group storage unit and the assumed invalid module group storage unit; and an identification unit configured to identify, when the contradiction is detected, the module assumed by the assumption unit to be invalid as a valid module.

With this structure, processing in the information processing device can be performed with a valid module, thus increasing reliability of the information processing device.

Another aspect of the present invention is a tampering monitoring system formed by an information processing device, which includes a plurality of monitoring modules that monitor for tampering, and a management apparatus that manages the information processing device. The management apparatus comprises: a transmission unit configured to transmit a detection target module and verification data for the detection target module; a reception unit configured to receive, from the plurality of detection modules, which verify the detection target module, results of verification of a correspondence relationship between the detection target module and the verification data for the detection target module; and an invalid-module identification unit configured to identify, as an invalid module, a detection module whose results of verification indicate that the correspondence relationship is valid, wherein the verification data is data that does not correspond to the detection target module.

The management apparatus may further comprise a deactivation unit configured to output an instruction to deactivate an identified invalid module.

The verification data may be a verification certificate for the detection target module, and the management apparatus may further comprise a verification certificate generation unit configured to generate the verification certificate.

The verification certificate generation unit may generate the verification certificate by tampering with a valid certificate corresponding to the detection target module.

The verification certificate generation unit may generate random data and as the verification certificate.

The management apparatus may further comprise: an invalid module group storage unit for storing identifiers of identified invalid detection modules; and a valid module identification unit configured to assume that one of the plurality of detection modules is an invalid module and identify a valid detection module in the information device based on the assumption. The invalid module identification unit may identify all of the invalid detection modules in the information processing device and record identifiers of the identified modules in the invalid module group storage unit. The valid module identification unit may comprise: an assumed invalid module group storage unit for storing identifiers of detection modules assumed to be invalid; an assumption unit configured to select one of the plurality of detection modules, assume the selected detection module to be invalid, and record the identifier thereof in the assumed invalid module group storage unit; an assumed invalid module group generation unit configured to apply a procedure in a chained sequence by referring to the monitoring results, starting from the module assumed to be invalid by the assumption unit, the procedure being to assume that a module that determines any module assumed to be invalid to be valid is also invalid and recording the identifier of the module in the assumed invalid module group storage unit; a contradiction detection unit configured to determine whether a contradiction occurs whereby identifiers of all of the detection modules in the information processing device are included among the identifiers recorded in the invalid module group storage unit and the assumed invalid module group storage unit; and an identification unit configured to identify, when the contradiction is detected, the module assumed by the assumption unit to be invalid as a valid module.

Another aspect of the present invention is an integrated circuit having a function to manage an information processing device that includes a plurality of monitoring modules that monitor for tampering, the integrated circuit comprising: a transmission unit configured to transmit a detection target module and verification data for the detection target module; a reception unit configured to receive, from the plurality of detection modules, which verify the detection target module, results of verification of a correspondence relationship between the detection target module and the verification data for the detection target module; and an invalid-module identification unit configured to identify, as an invalid module, a detection module whose results of verification indicate that the correspondence relationship is valid, wherein the verification data is data that does not correspond to the detection target module.

Another aspect of the present invention is a management method for managing an information processing device that includes a plurality of monitoring modules that monitor for tampering, the management method comprising the steps of: transmitting a detection target module and verification data for the detection target module; receiving, from the plurality of detection modules, which verify the detection target module, results of verification of a correspondence relationship between the detection target module and the verification data for the detection target module; and identifying, as an invalid module, a detection module whose results of verification indicate that the correspondence relationship is valid, wherein the verification data is data that does not correspond to the detection target module.

Another aspect of the present invention is a computer-readable recording medium having recorded thereon a computer program for managing an information security apparatus that includes a plurality of monitoring modules that monitor for tampering, the computer program causing a computer to perform the steps of: transmitting a detection target module and verification data for the detection target module; receiving, from the plurality of detection modules, which verify the detection target module, results of verification of a correspondence relationship between the detection target module and the verification data for the detection target module; and identifying, as an invalid module, a detection module whose results of verification indicate that the correspondence relationship is valid, wherein the verification data is data that does not correspond to the detection target module.

Another aspect of the present invention is a computer program for managing an information security apparatus that includes a plurality of monitoring modules that monitor for tampering, the computer program causing a computer to perform the steps of: transmitting a detection target module and verification data for the detection target module; receiving, from the plurality of detection modules, which verify the detection target module, results of verification of a correspondence relationship between the detection target module and the verification data for the detection target module; and identifying, as an invalid module, a detection module whose results of verification indicate that the correspondence relationship is valid, wherein the verification data is data that does not correspond to the detection target module.

(29) Each of the above modules may specifically be an individual computer program, a computer program embedded in the operating system, a driver program called by the operating system, or an application program.

(30) Each of the above devices is, specifically, a computer system composed of a microprocessor, ROM, RAM, hard disk unit, display unit, keyboard, mouse, etc. Computer programs are stored on the RAM or the hard disk unit. By operating in accordance with the computer programs, the microprocessor achieves the functions of each device. In order to achieve predetermined functions, the computer programs are composed of a combination of multiple command codes that indicate instructions for the computer.

(31) Part or all of the components comprising each of the above-described devices may be assembled as one system Large Scale Integration (LSI). A system LSI is an ultra-multifunctional LSI produced by integrating multiple components on one chip and, more specifically, is a computer system including a microprocessor, ROM, RAM, and the like. Computer programs are stored in the RAM. The microprocessor operates according to the computer programs, and thereby the system LSI accomplishes its functions.

Individual components comprising each of the above-described devices may respectively be made into discrete chips, or part or all of the components may be made into one chip.

Although referred to here as a system LSI, depending on the degree of integration, the terms IC, LSI, super LSI, or ultra LSI are also used. In addition, the method for assembling integrated circuits is not limited to LSI, and a dedicated communication circuit or a general-purpose processor may be used. A Field Programmable Gate Array (FPGA), which is programmable after the LSI is manufactured, or a reconfigurable processor, which allows reconfiguration of the connection and setting of circuit cells inside the LSI, may be used.

Furthermore, if technology for forming integrated circuits that replaces LSIs emerges, owing to advances in semiconductor technology or to another derivative technology, the integration of functional blocks may naturally be accomplished using such technology. The application of biotechnology or the like is possible.

(32) Part or all of the components comprising each of the above devices may be assembled as an IC card detachable from each device, or as a single module. The IC card/module is a computer system that includes a microprocessor, ROM, RAM, etc. The IC card/module may include therein the above-mentioned ultra-multifunctional LSI. The microprocessor operates according to computer programs, and the IC card/module thereby accomplishes its functions. The IC card/module may be tamper resistant.

(33) The present invention may be the above-described method. The present invention may be computer programs that achieve the method by a computer or may be a digital signal comprising the computer programs.

The present invention may also be a computer-readable recording medium, such as a flexible disk, hard disk, CD-ROM, MO, DVD, DVD-ROM, DVD-RAM, BD (Blu-ray Disc), or semiconductor memory, on which the above-mentioned computer program or digital signal is recorded. The present invention may also be the digital signal recorded on such a recording medium.

The present invention may also be the computer programs or digital signal to be transmitted via networks, of which telecommunications networks, wire/wireless communications networks, and the Internet are representative, or via data broadcasting.

The present invention may also be a computer system comprising a microprocessor and memory, the memory storing the computer programs, and the microprocessor operating in accordance with the computer programs.

Also, another independent computer system may implement the computer programs or digital signal after the computer programs or digital signal are transferred via being recorded on the recording medium, via one of the above-mentioned networks, etc.

(34) The above embodiments and modifications may be combined with one another.

Industrial Applicability

In the areas of manufacturing and selling management apparatuses that provide software for information processing devices, the present invention is useful as technology for the management apparatus to identify unauthorized software operating on the information processing device and to update the software securely.

Reference Signs List 10, 10a detection system
100, 100a device
110, 111 application
12 software updating system
120, 120a protection control module
130, 130a detection module group
131-137, 131a-137a detection module
140 access control module
150 OS
160 boot loader
171 CPU
172 EEPROM
173 RAM
174 NIC
200, 200a, 200b management apparatus
210, 210a determination unit
220, 220a detection target module distribution unit
230 module deactivation unit
240 communication unit
250 monitoring pattern update unit
301 reception unit
302 transmission unit
303 control unit
304 decryption loading unit
305 tampering detection unit
306 analysis tool detection unit
307 encryption/decryption key storage unit
308 encryption/decryption key sharing unit
309 certificate generation unit
310 encryption/decryption key reconstruction unit
401 reception unit
402 transmission unit
403 control unit
404 verification unit
405 MAC value generation unit
406 MAC value table updating unit
407 detection target module installation unit
408 updating unit
409 authentication unit
410 share storage unit
501 reception unit
502 transmission unit
503 access information storage unit
601 reception unit
602 transmission unit
603 instruction generation unit
604, 604a module identification unit
605 invalid-module identification unit
606 module identification information storage unit
607 valid-module identification unit
671 identification instruction reception unit
672 identification result transmission unit
673 invalid-module assumption unit
674 verification result judging unit
675 assumed invalid detection module group extraction unit
676 extraction result judging unit
677 second assumption unit
701 reception unit
702 transmission unit
703 control unit
704 certificate generation unit
705 signature private key storage unit
706 detection module selection unit
707 detection target module storage unit
708 encryption key generation unit
709 encryption unit
710 authentication unit
711 encryption key storage unit
712 updated software storage unit
801 reception unit
802 transmission unit
803 access information acquisition key storage unit
804 detection module selection unit
900, 900a detection target module
901 reception unit
902 transmission unit
903 monitoring pattern generation unit
904 monitoring pattern division unit
905 control unit

The invention claimed is:

1. A management apparatus for managing an information security device that includes a plurality of monitoring modules that monitor for tampering, the management apparatus comprising:
a non-transitory memory device that stores a program; and
a processing device that executes the program to cause the management apparatus to operate as:
an acquisition unit comprising logic configured to acquire a new monitoring module that has not been tampered with;
a generation unit comprising logic configured to generate a decoy monitoring module by modifying the acquired monitoring module;
a transmission unit comprising logic configured to transmit the decoy monitoring module to the information security device and cause the information security device to install the decoy monitoring module therein;
a reception unit comprising logic configured to receive from the information security device, after the decoy monitoring module has been installed, monitoring results generated by the monitoring modules monitoring other monitoring modules; and a determination unit comprising logic configured to identify, by referring to the received monitoring results, a monitoring module that determines the decoy monitoring module to be valid and to determine the identified monitoring module to be invalid, wherein the generation unit generates the decoy monitoring module to include an invalid verification certificate, wherein the transmission unit transmits the decoy monitoring module that includes the invalid verification certificate to the information security device and causes the information security device to install the decoy monitoring module therein, and wherein each monitoring module in the information security device determines whether the decoy monitoring module has been tampered with by referring to the verification certificate included in the decoy monitoring module.

2. The management apparatus of claim 1, wherein
the acquired monitoring module includes a verification certificate that certifies authenticity of the acquired monitoring module,
the generation unit generates the decoy monitoring module by modifying the verification certificate included in the acquired monitoring module to generate a modified verification certificate and including the modified verification certificate in the acquired monitoring module,
the transmission unit transmits the decoy monitoring module that includes the modified verification certificate to the information security device and causes the information security device to install the decoy monitoring module therein, and
each monitoring module in the information security device determines whether the decoy monitoring module has been tampered with by referring to the verification certificate included in the decoy monitoring module.

3. The management apparatus of claim 2, wherein the generation unit generates random data and sets the random data to be the modified verification certificate.

4. The management apparatus of claim 2, wherein the generation unit generates the modified verification certificate by generating random data and overwriting a part of the verification certificate included in the acquired monitoring module with the generated random data.

5. The management apparatus of claim 1, wherein the executed program further causes the management apparatus to function as:
a detection unit comprising logic configured to detect whether any valid monitoring module that has not been tampered with exists by referring to the received monitoring results;
a first assumption unit comprising logic configured to select, when the detection unit detects the existence, a monitoring module among the plurality of monitoring modules and to assume that the selected monitoring module has been tampered with; and
a second assumption unit comprising logic configured to apply a procedure in a chained sequence to monitoring modules other than the selected monitoring module by referring to the monitoring results, starting from the selected monitoring module, the procedure being to assume that any monitoring module determining that a monitoring module assumed to have been tampered with is valid has also been tampered with,
wherein the determination unit is configured to determine whether, as a result of the procedure by the second assumption unit, all of the monitoring modules are assumed to have been tampered with, and when determining that all of the monitoring modules are assumed to have been tampered with, to determine the selected monitoring module to be a valid monitoring module that has not been tampered with.

6. The management apparatus of claim 1, further comprising a deactivation unit comprising logic configured to output a deactivation instruction for the monitoring module determined to be invalid.

7. A tampering monitoring system formed by an information security device and a management apparatus, the information security device including a plurality of monitoring modules that monitor for tampering, and the management apparatus managing the information security device,
the management apparatus comprising:
a non-transitory memory device that stores a program; and
a processing device that executes the program to cause the management apparatus to operate as:
an acquisition unit comprising logic configured to acquire a new monitoring module that has not been tampered with;
a generation unit comprising logic configured to generate a decoy monitoring module by modifying the acquired monitoring module;
a transmission unit comprising logic configured to transmit the decoy monitoring module to the information security device and cause the information security device to install the decoy monitoring module therein;
a reception unit comprising logic configured to receive from the information security device, after the decoy monitoring module has been installed, monitoring results generated by the monitoring modules monitoring other monitoring modules; and
a determination unit comprising logic configured to identify, by referring to the received monitoring results, a monitoring module that determines the decoy monitoring module to be valid and to determine the identified monitoring module to be invalid,
wherein the generation unit generates the decoy monitoring module to include an invalid verification certificate,
wherein the transmission unit transmits the decoy monitoring module that includes the invalid verification certificate to the information security device and causes the information security device to install the decoy monitoring module therein, and
wherein each monitoring module in the information security device determines whether the decoy monitoring module has been tampered with by referring to the verification certificate included in the decoy monitoring module.

8. An integrated circuit for managing an information security device that includes a plurality of monitoring modules that monitor for tampering, the integrated circuit comprising:
a non-transitory memory device that stores a program; and
a processing device that executes the program to cause the integrated circuit to operate as:
an acquisition unit comprising logic configured to acquire a new monitoring module that has not been tampered with;
a generation unit comprising logic configured to generate a decoy monitoring module by modifying the acquired monitoring module;
a transmission unit comprising logic configured to transmit the decoy monitoring module to the information security device and cause the information security device to install the decoy monitoring module therein;

a reception unit comprising logic configured to receive from the information security device, after the decoy monitoring module has been installed, monitoring results generated by the monitoring modules monitoring other monitoring modules; and a determination unit comprising logic configured to identify, by referring to the received monitoring results, a monitoring module that determines the decoy monitoring module to be valid and to determine the identified monitoring module to be invalid, wherein the generation unit generates the decoy monitoring module to include an invalid verification certificate, wherein the transmission unit transmits the decoy monitoring module that includes the invalid verification certificate to the information security device and causes the information security device to install the decoy monitoring module therein, and wherein each monitoring module in the information security device determines whether the decoy monitoring module has been tampered with by referring to the verification certificate included in the decoy monitoring module.

9. A management method used in a management apparatus for managing an information security device that includes a plurality of monitoring modules that monitor for tampering, the management method comprising the steps of:

acquiring a new monitoring module that has not been tampered with;

generating a decoy monitoring module by modifying the acquired monitoring module;

transmitting the decoy monitoring module to the information security device and causing the information security device to install the decoy monitoring module therein;

receiving from the information security device, after the decoy monitoring module has been installed, monitoring results generated by the monitoring modules monitoring other monitoring modules; and identifying, by referring to the received monitoring results, a monitoring module that determines the decoy monitoring module to be valid and to determine the identified monitoring module to be invalid, wherein the generating generates the decoy monitoring module to include an invalid verification certificate, wherein the transmitting transmits the decoy monitoring module that includes the invalid verification certificate to the information security device and causes the information security device to install the decoy monitoring module therein, and wherein each monitoring module in the information security device determines whether the decoy monitoring module has been tampered with by referring to the verification certificate included in the decoy monitoring module.

10. A non-transitory computer-readable recording medium having a computer program recorded thereon, the computer program being used in a management apparatus for managing an information security device that includes a plurality of monitoring modules that monitor for tampering, and the computer program causing a computer, which is the management apparatus, to execute a method comprising the steps of:

acquiring a new monitoring module that has not been tampered with;

generating a decoy monitoring module by modifying the acquired monitoring module;

transmitting the decoy monitoring module to the information security device and causing the information security device to install the decoy monitoring module therein;

receiving from the information security device, after the decoy monitoring module has been installed, monitoring results generated by the monitoring modules monitoring other monitoring modules; and identifying, by referring to the received monitoring results, a monitoring module that determines the decoy monitoring module to be valid and to determine the identified monitoring module to be invalid, wherein the generating generates the decoy monitoring module to include an invalid verification certificate, wherein the transmitting transmits the decoy monitoring module that includes the invalid verification certificate to the information security device and causes the information security device to install the decoy monitoring module therein, and wherein each monitoring module in the information security device determines whether the decoy monitoring module has been tampered with by referring to the verification certificate included in the decoy monitoring module.

* * * * *